(12) United States Patent
Chaji et al.

(10) Patent No.: US 10,796,622 B2
(45) Date of Patent: Oct. 6, 2020

(54) DISPLAY SYSTEM WITH COMPENSATION TECHNIQUES AND/OR SHARED LEVEL RESOURCES

(71) Applicant: Ignis Innovation Inc., Waterloo (CA)

(72) Inventors: Gholamreza Chaji, Waterloo (CA); Nino Zahirovic, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

(21) Appl. No.: 16/400,239

(22) Filed: May 1, 2019

(65) Prior Publication Data

US 2019/0259325 A1 Aug. 22, 2019

Related U.S. Application Data

(63) Continuation of application No. 14/775,450, filed on Sep. 11, 2015, now Pat. No. 10,319,307, which is a continuation-in-part of application No. 14/797,278, filed as application No. PCT/IB2014/060959 on Apr. 23, 2014, now Pat. No. 9,418,587, application No.
(Continued)

(30) Foreign Application Priority Data

Jun. 16, 2009 (CA) .................................... 2669367
Nov. 30, 2009 (CA) .................................... 2688870

(51) Int. Cl.
G09G 3/32 (2016.01)
G09G 3/20 (2006.01)
G06T 7/90 (2017.01)
G09G 3/3208 (2016.01)
(Continued)

(52) U.S. Cl.
CPC ............. *G09G 3/2003* (2013.01); *G06T 7/90* (2017.01); *G09G 3/2074* (2013.01); *G09G 3/3208* (2013.01); *H04N 9/64* (2013.01); *G09G 5/026* (2013.01); *G09G 2300/0452* (2013.01); *G09G 2320/0242* (2013.01);
(Continued)

(58) Field of Classification Search
CPC ........ G09G 3/006; G09G 3/32; G09G 3/3291; G09G 3/3233
See application file for complete search history.

(56) References Cited

U.S. PATENT DOCUMENTS 5,754,150 A * 5/1998 Matsui ................ G09G 3/3648
345/207
7,233,302 B2 * 6/2007 Ishizuka .............. G09G 3/3233
345/100
(Continued)

*Primary Examiner* — Vijay Shankar
(74) *Attorney, Agent, or Firm* — Stratford Managers Corporation

(57) ABSTRACT

A voltage-programmed display system allows measurement of effects on pixels in a panel that includes both active pixels and reference pixels coupled to a supply line and a programming line. The reference pixels are controlled so that they are not subject to substantial changes due to aging and operating conditions over time. A readout circuit is coupled to the active pixels and the reference pixels for reading at least one of current, voltage or charge from the pixels when they are supplied with known input signals. The readout circuit is subject to changes due to aging and operating conditions over time, but the readout values from the reference pixels are used to adjust the readout values from the active pixels to compensate for the unwanted effects.

14 Claims, 29 Drawing Sheets

Related U.S. Application Data

14/775,450, which is a continuation-in-part of application No. PCT/IB2014/059753, filed on Mar. 13, 2014, and a continuation-in-part of application No. 13/890,926, filed on May 9, 2013, now Pat. No. 9,311,859, which is a continuation-in-part of application No. 13/869,399, filed on Apr. 24, 2013, now Pat. No. 9,384,698, application No. 14/797,278, which is a continuation of application No. 13/844,856, filed on Mar. 16, 2013, now Pat. No. 9,111,485, application No. 13/869,399, which is a continuation-in-part of application No. 12/956,842, filed on Nov. 30, 2010, now Pat. No. 8,914,246, application No. 13/844,856, which is a continuation of application No. 12/816,856, filed on Jun. 16, 2010, now Pat. No. 9,117,400.

(60) Provisional application No. 61/976,910, filed on Apr. 8, 2014, provisional application No. 61/827,404, filed on May 24, 2013, provisional application No. 61/779,776, filed on Mar. 13, 2013.

(51) Int. Cl.
*H04N 9/64* (2006.01)
*G09G 5/02* (2006.01)

(52) U.S. Cl.
CPC .............. *G09G 2320/043* (2013.01); *G09G 2320/0626* (2013.01); *G09G 2320/0666* (2013.01)

(56) References Cited

U.S. PATENT DOCUMENTS

| | | | |
|---|---|---|---|
| 8,130,182 B2* | 3/2012 | Levey | G09G 3/3233 345/76 |
| 8,264,547 B1* | 9/2012 | Sayre | H04N 9/69 348/177 |
| 10,319,307 B2* | 6/2019 | Chaji | G09G 3/006 |

* cited by examiner

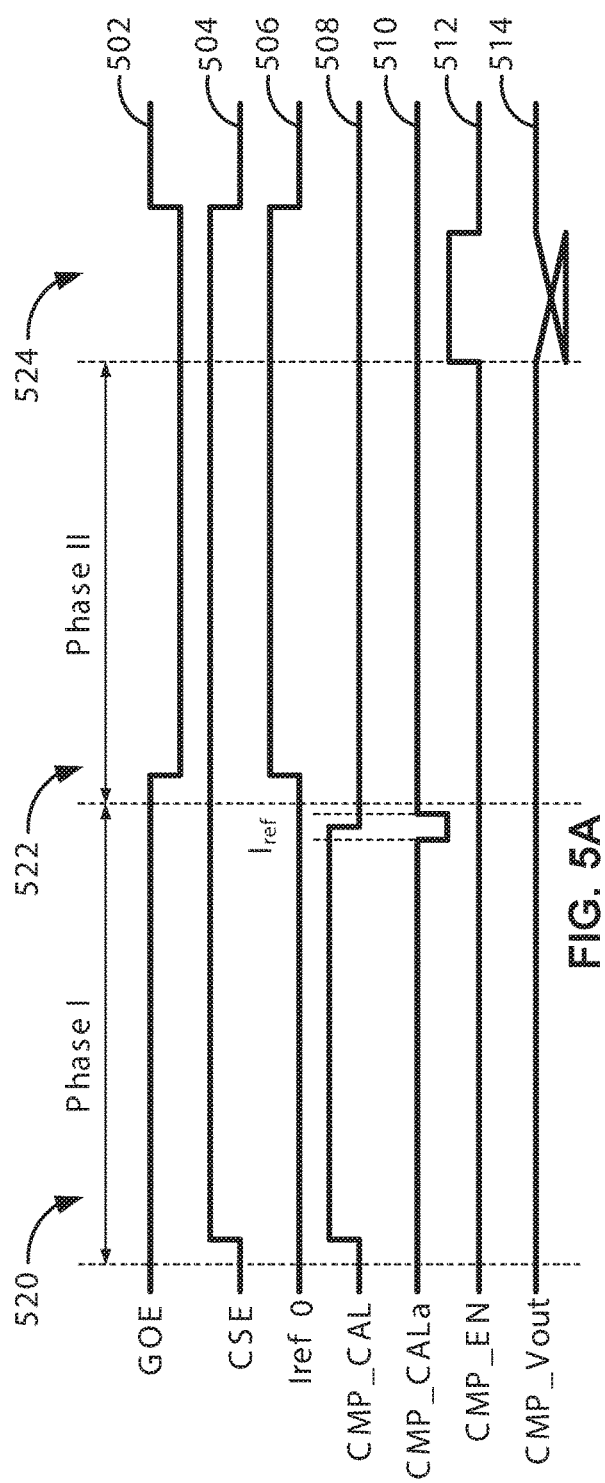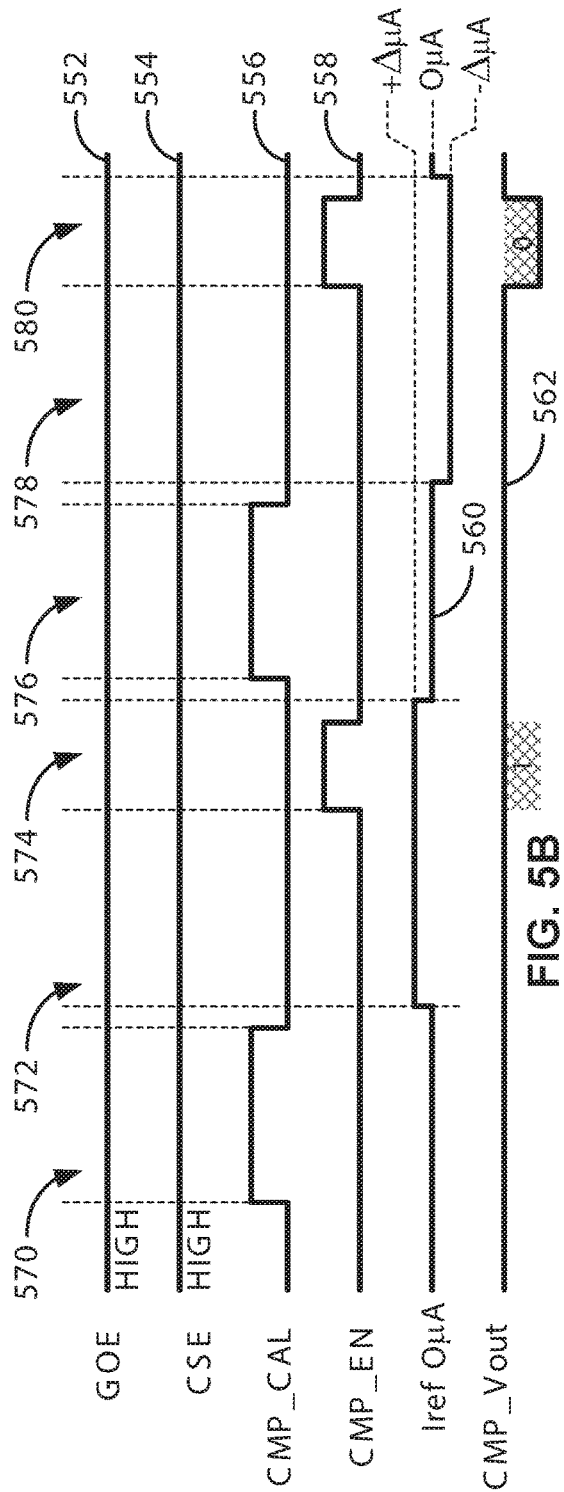
FIG. 5A
FIG. 5B

FIG. 17
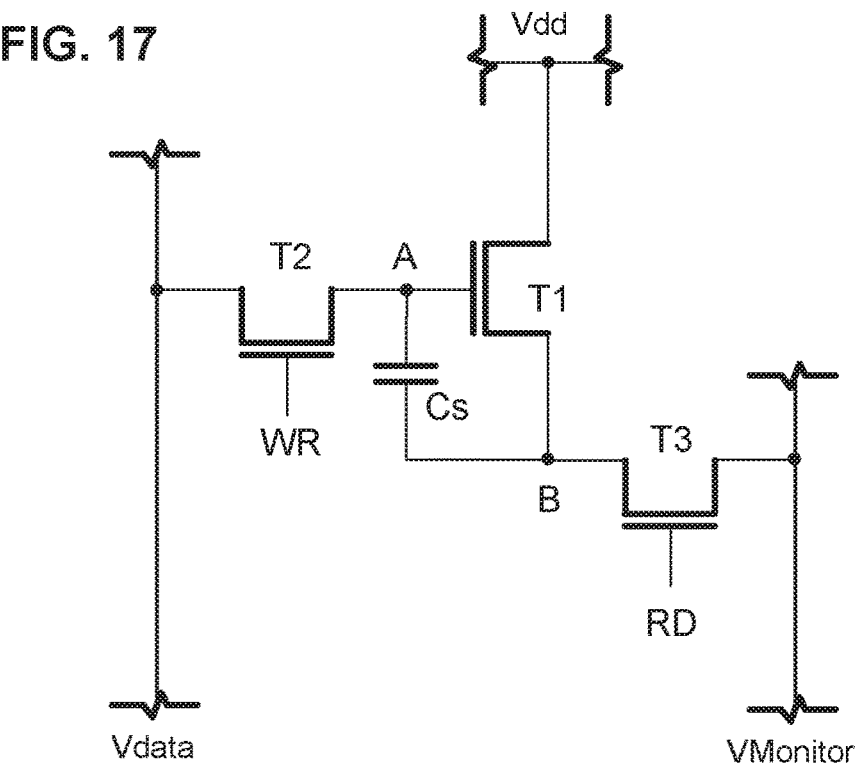
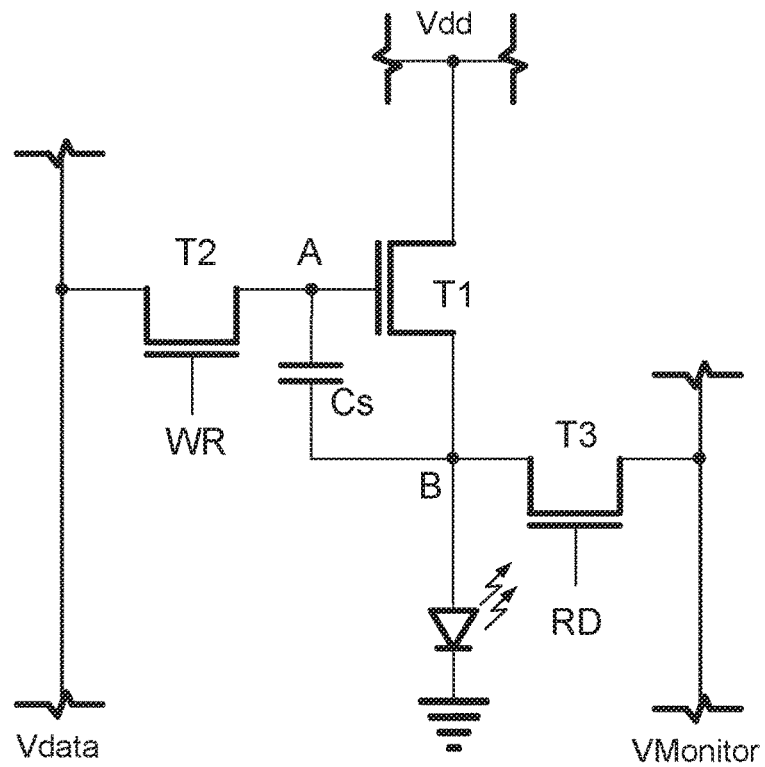
FIG. 18

DISPLAY SYSTEM WITH COMPENSATION TECHNIQUES AND/OR SHARED LEVEL RESOURCES

CROSS-REFERENCE TO RELATED APPLICATIONS

This application:
(1) is a continuation of U.S. application Ser. No. 14/775,450, filed Sep. 11, 2015, now allowed, which is a U.S. National Stage of International Application No. PCT/M2014/060959, filed Apr. 23, 2014, which claims the benefit of U.S. Provisional Application No. 61/827,404, filed May 24, 2013 and U.S. Provisional Application No. 61/976,910, filed Apr. 8, 2014, and is a continuation-in-part of Ser. No. 13/890,926, filed May 9, 2013, now U.S. Pat. No. 9,311,859, which is a continuation-in-part of U.S. patent application Ser. No. 13/869,399, filed Apr. 24, 2013, now U.S. Pat. No. 9,384,698, which is a continuation-in-part of U.S. patent application Ser. No. 12/956,842, filed Nov. 30, 2010, now U.S. Pat. No. 8,914,246;
(2) is also a continuation-in-part of U.S. patent application Ser. No. 14/797,278, filed Jul. 13, 2015, now U.S. Pat. No. 9,418,587, which is a continuation of U.S. patent application Ser. No. 13/844,856, filed Mar. 16, 2013, now U.S. Pat. No. 9,111,485, which is a continuation of U.S. patent application Ser. No. 12/816,856, filed Jun. 16, 2010, no U.S. Pat. No. 9,117,400, which claims the benefit of Canadian Application No. 2,669,367, filed Jun. 16, 2009;
(3) is also a continuation in part of PCT/IB2014/059753, filed Mar. 13, 2014, which claims the benefit of U.S. Provisional Application No. 61/779,776, filed Mar. 13, 2013 and Canadian Application No. 2,688,870, filed Nov. 30, 2009;
each of which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present disclosure generally relates to active matrix organic light emitting device (AMOLED) displays, and particularly determining aging conditions requiring compensation for the pixels of such displays.

BACKGROUND

Currently, active matrix organic light emitting device ("AMOLED") displays are being introduced. The advantages of such displays include lower power consumption, manufacturing flexibility and faster refresh rate over conventional liquid crystal displays. In contrast to conventional liquid crystal displays, there is no backlighting in an AMOLED display as each pixel consists of different colored OLEDs emitting light independently. The OLEDs emit light based on current supplied through a drive transistor. The drive transistor is typically a thin film transistor (TFT). The power consumed in each pixel has a direct relation with the magnitude of the generated light in that pixel.

The drive-in current of the drive transistor determines the pixel's OLED luminance. Since the pixel circuits are voltage programmable, the spatial-temporal thermal profile of the display surface changing the voltage-current characteristic of the drive transistor impacts the quality of the display. The rate of the short-time aging of the thin film transistor devices is also temperature dependent. Further the output of the pixel is affected by long term aging of the drive transistor. Proper corrections can be applied to the video stream in order to compensate for the unwanted thermal-driven visual effects. Long term aging of the drive transistor may be properly determined via calibrating the pixel against stored data of the pixel to determine the aging effects. Accurate aging data is therefore necessary throughout the lifetime of the display device.

Currently, displays having pixels are tested prior to shipping by powering all the pixels at full brightness. The array of pixels is then optically inspected to determine whether all of the pixels are functioning. However, optical inspection fails to detect electrical faults that may not manifest themselves in the output of the pixel. The baseline data for pixels is based on design parameters and characteristics of the pixels determined prior to leaving the factory but this does not account for the actual physical characteristics of the pixels in themselves.

Various compensation systems use a normal driving scheme where a video frame is always shown on the panel and the OLED and TFT circuitries are constantly under electrical stress. Moreover, pixel calibration (data replacement and measurement) of each sub-pixel occurs during each video frame by changing the grayscale value of the active sub-pixel to a desired value. This causes a visual artifact of seeing the measured sub-pixel during the calibration. It may also worsen the aging of the measured sub-pixel, since the modified grayscale level is kept on the sub-pixel for the duration of the entire frame.

Additionally, previous compensation technique for OLED displays considered backplane aging and OLED efficiency lost. The aging (and/or uniformity) of the panel was extracted and stored in lookup tables as raw or processed data. Then a compensation block used the stored data to compensate for any shift in the electrical parameters of the backplane (e.g., threshold voltage shift) or the OLED (e.g., shift in the OLED operating voltage). Such techniques can be used to compensate for OLED efficiency losses as well. These techniques are based on the assumption that the OLED color coordinates are stable despite reductions in the OLED efficiency. Depending on the OLED material and the required device lifetime, this can be a valid assumption. However, for OLED materials with low stability in color coordinates, this can result in excessive display color shifts and image sticking issues.

The color coordinates (i.e., chromaticity) of an OLED shift over time. These shifts are more pronounced in white OLEDs since the different color components that are combined in an OLED structure used to create white light can shift differently (e.g., the blue portion may age faster than the red or green portion of the combined OLED stack), leading to undesirable shifts in the display white point, which in turn lead to artifacts such as image sticking. Moreover, this phenomenon is applicable to other OLEDs as well, such as OLEds that consist of only single color components in a stack (i.e., single Red OLED stack, single GREEN OLED stack, etc.). As a result, color shifts that occur in the display can cause severe image sticking issues.

Furthermore, as discussed in previous documents and patents, IGNIS Maxlife™ can compensate for both OLED and backplane issues including aging, non-uniformity, temperature, and so on. Calculations of compensation factors is performed with dedicated resources of a display.

Therefore, there is a need for techniques to provide accurate measurement of the display temporal and spatial information and ways of applying this information to improve display uniformity in an AMOLED display. There is also a need to determine baseline measurements of pixel characteristics accurately for aging compensation purposes.

SUMMARY

A voltage-programmed display system allowing measurement of effects on pixels in a panel that includes a plurality of active pixels forming the display panel to display an image under an operating condition, the active pixels each being coupled to a supply line and a programming line, and a plurality of reference pixels included in the display area. Both the active pixels and the reference pixels are coupled to the supply line and the programming line. The reference pixels are controlled so that they are not subject to substantial changes due to aging and operating conditions over time. A readout circuit is coupled to the active pixels and the reference pixels for reading at least one of current, voltage or charge from the pixels when they are supplied with known input signals. The readout circuit is subject to changes due to aging and operating conditions over time, but the readout values from the reference pixels are used to adjust the readout values from the active pixels to compensate for the unwanted effects.

In accordance with another implementation, a system is provided for maintaining a substantially constant display white point over an extended period of operation of a color display formed by an array of multiple pixels in which each of the pixels includes multiple subpixels having different colors, and each of the subpixels includes a light emissive device. The display is generated by energizing the subpixels of successively selected pixels, and the color of each selected pixel is controlled by the relative levels of energization of the subpixels in the selected pixel. The degradation behavior of the subpixels in each pixel is determined, and the relative levels of energization of the subpixels in each pixel are adjusted to adjust the brightness shares of the subpixels to compensate for the degradation behavior of the subpixels. The brightness shares are preferably adjusted to maintain a substantially constant display white point.

In accordance with yet another implementation, the light emissive devices are OLEDs, and the degradation behavior used is a shift in the chromaticity coordinates of the subpixels of a selected pixel, such as a white pixel in an RGBW display. The voltage at a current input to each OLED is measured and used in the determining the shift in the chromaticity coordinates.

In accordance with yet another implementation, color displays use light emissive devices such as OLEDs and, in a more specific example, color shifts are compensated in such displays as the light emissive devices age.

In accordance with yet another implementation, a system maintains a substantially constant display white point over an extended period of operation of a color display formed by an array of multiple pixels in which each of the pixels includes multiple subpixels having different colors, and each of the subpixels includes a light emissive device. The display is generated by energizing the subpixels of successively selected pixels, and the color of each selected pixel is controlled by the relative levels of energization of the subpixels in the selected pixel. The degradation behavior of the subpixels in each pixel is determined, and the relative levels of energization of the subpixels in each pixel are adjusted to adjust the brightness shares of the subpixels to compensate for the degradation behavior of the subpixels. The brightness shares are preferably adjusted to maintain a substantially constant display white point.

In accordance with yet another implementation, an implementation feature is directed to circuits for use in displays, and, more specifically, to compensation for multiple degradation phenomena.

In accordance with yet another implementation, a method is directed to compensating for multiple degradation phenomena simultaneously, where the degradation phenomena adversely affect a luminance performance of current-driven pixels in an active matrix display. Each of the pixel circuits includes a light emitting device (such as an organic light-emitting diode or OLED) driven by a driving transistor. Degradation phenomena include a non-uniformity phenomenon (caused by process non-uniformities), a time-depending aging phenomenon, and a dynamic effect phenomenon, which can be caused by a shift in a threshold voltage of a driving transistor of a pixel circuit.

In accordance with yet another implementation, instead of using discrete steps for each compensation stage, an integrated compensation results in a more efficient implementation. Accordingly, an aspect of the present disclosure is directed to a method for compensating for a plurality of degradation phenomena adversely affecting luminance performance of current-driven pixel circuits in an active matrix display. Each of the pixel circuits includes a light emitting device driven by a driving transistor. The method includes storing, using one or more controllers, in a first table a plurality of first factors to compensate for a first phenomenon of the degradation phenomena, and in a second table a plurality of second factors to compensate a second phenomenon of the degradation phenomena. The method further includes measuring, using at least one of the controllers, a characteristic of a selected one of the pixel circuits affected by a detected one of the first phenomenon and the second phenomenon, and, responsive to the measuring, determining, using at least one of the controllers, a new value for a corresponding first factor and second factor for the detected phenomenon to produce a first adjusted value. The method further includes, responsive to determining the new value, automatically calculating, using at least one of the controllers, the other one of the first factor and the second factor to produce a second adjusted value, and storing, using at least one of the controllers, the first adjusted value and the second adjusted value in corresponding ones of the first table and the second table. The method further includes, responsive to the storing the first adjusted value and the second adjusted value, subsequently driving, using at least one of the controllers, the selected pixel circuit according to a pixel circuit characteristic that is based on the first adjusted value and the second adjusted value. These foregoing acts can be carried out in any order and can compensate for any combination of one or more phenomena.

In accordance with yet another implementation, a method is directed to compensating for a plurality of degradation phenomena adversely affecting luminance performance of current-driven pixel circuits in an active matrix display. Each of the pixel circuits includes a light emitting device driven by a driving transistor. The method includes storing, using one or more controllers, in a power factor table a plurality of power factors to compensate for a non-uniformity phenomenon of the degradation phenomena at each of the pixel circuits, the non-uniformity phenomenon relating to process non-uniformities in fabrication of the active matrix display. The method further includes storing, using at least one of the controllers, in a scaling factor table a plurality of scaling factors to compensate for at least a time-dependent aging phenomenon of the degradation phenomena of one or more of each of the light emitting device or the driving transistor of the pixel circuits. The method further includes storing, using at least one of the controllers, in an offset factor table a plurality of offset factors to compensate for at least a dynamic effect phenomenon of the degradation phenomena caused by at least a shift in a threshold voltage of the driving transistor of each of the pixel circuits. The method further includes measuring, using at least one of the controllers, a characteristic of a selected one of the pixel circuits affected by a detected one of the non-uniformity phenomenon, the aging phenomenon, or the dynamic effect phenomenon. The method further includes, responsive to the measuring, determining, using at least one of the controllers, a new value for a corresponding power factor, scaling factor, or offset factor for the detected phenomenon to produce a first adjusted value. The method further includes, responsive to determining the new value, automatically calculating, using at least one of the controllers, the other two of the power factor, the scaling factor, and the offset factor to produce a second adjusted value and a third adjusted value. The method further includes storing, using at least one of the controllers, the first, second, and third adjusted values in corresponding ones of the power factor table, the scaling factor table, and the offset factor table. The method further includes, responsive to the storing the first, second, and third adjusted values, subsequently driving, using at least one of the controllers, the selected pixel circuit according to a current that is based on the first, second, and third adjusted values. These foregoing acts can be carried out in any order and can compensate for any combination of one or more phenomena.

In accordance with yet another implementation, a display system is directed to compensating for degradation phenomena adversely affecting luminance performance. The system includes an active matrix with current-driven pixel circuits, each of the pixel circuit including a light emitting device driven by a driving transistor, a processor, and a memory device. The memory device has stored instructions that, when executed by the processor, cause the system to store in a first table a plurality of first factors to compensate for a first phenomenon of the degradation phenomena, and store in a second table a plurality of second factors to compensate a second phenomenon of the degradation phenomena. The stored instructions further cause the system, when executed by the processor, to measure a characteristic of a selected one of the pixel circuits affected by a detected one of the first phenomenon and the second phenomenon, and, responsive to the measuring, determine a new value for a corresponding first factor and second factor for the detected phenomenon to produce a first adjusted value. The stored instructions further cause the system, when executed by the processor and responsive to determining the new value, to automatically calculate the other one of the first factor and the second factor to produce a second adjusted value. The stored instructions further cause the system, when executed by the processor, to store the first adjusted value and the second adjusted value in corresponding ones of the first table and the second table, and, responsive to the storing the first adjusted value and the second adjusted value, subsequently drive the selected pixel circuit according to a pixel circuit characteristic that is based on the first adjusted value and the second adjusted value. These foregoing acts can be carried out in any order and can compensate for any combination of one or more phenomena.

In accordance with yet another implementation, and to bring MaxLife™ complexity to a comfort level of portable applications, measurement of a panel is moved to an offline stage. Accordingly, such a timing controller ("TCON"), a measurement scheduler, a calculation module, a driver circuitry, and a memory interface become much simpler.

In accordance with yet another implementation, a system includes a display module and a system module. The display module is integrated in a portable device with a display communicatively coupled to one or more of a driver unit, a measurement unit, a timing controller, a compensation sub-module, and a display memory unit. The system module is communicatively coupled to the display module and has one or more interface modules, one or more processing units, and one or more system memory units. At least one of the processing units and the system memory units is programmable to calculate new compensation parameters for the display module during an offline operation.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 5A is a signal timing diagram of the signals for the current comparator in FIGS. 3-4 in the process of determining the current output of a device under test;

FIG. 5B is a signal timing diagram of the signals for calibrating the bias current for the current comparator in FIGS. 3-4;

FIG. 17 is a circuit diagram of a pixel circuit used for backplane testing.

FIG. 18 is a circuit diagram of a pixel circuit used for full-display testing.

Figure 1:
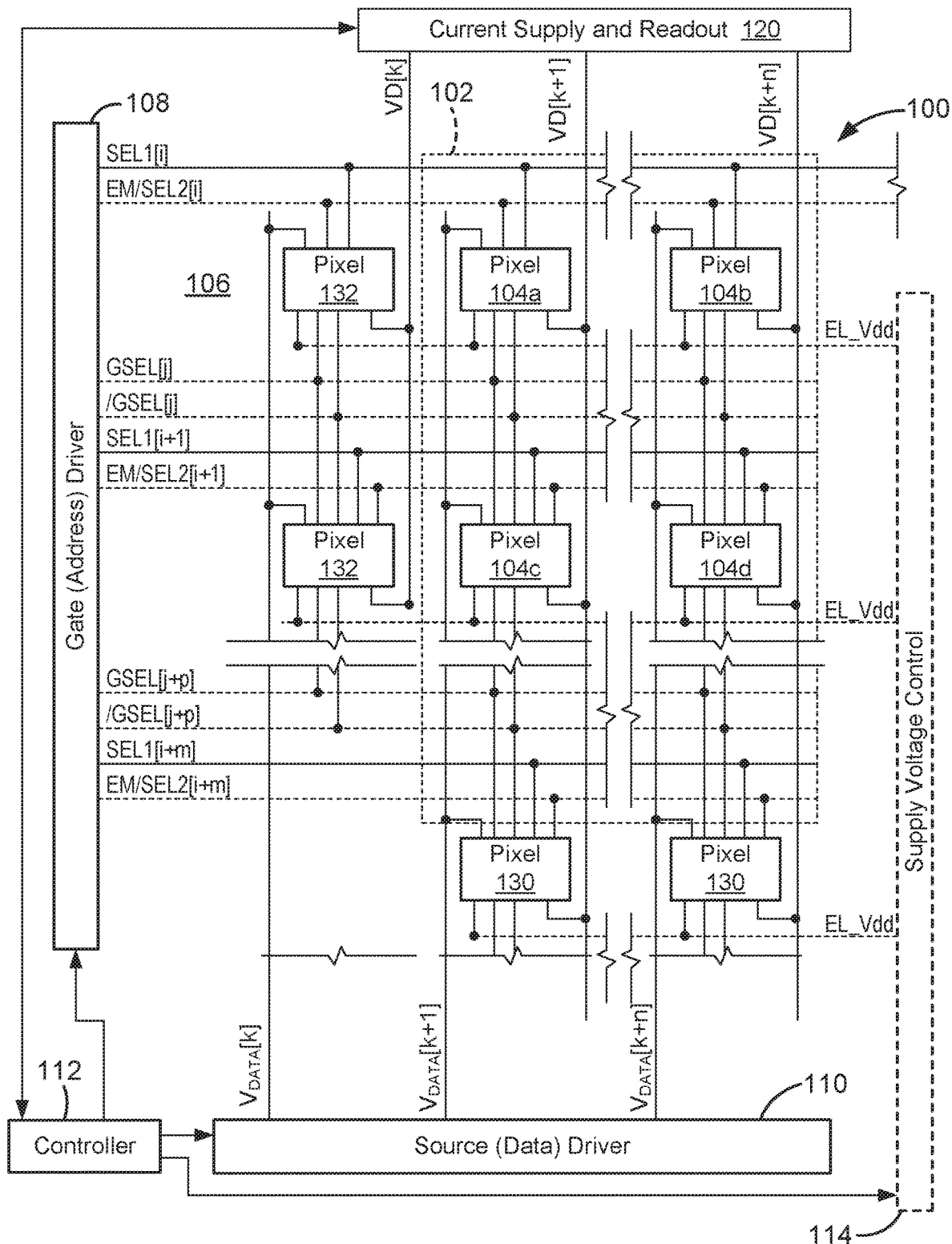
FIG. 1 is a block diagram of a AMOLED display with reference pixels to correct data for parameter compensation control.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the invention as defined by the appended claims.

DETAILED DESCRIPTION

FIG. 1 is an electronic display system 100 having an active matrix area or pixel array 102 in which an array of active pixels 104a-d are arranged in a row and column configuration. For ease of illustration, only two rows and columns are shown. External to the active matrix area which is the pixel array 102 is a peripheral area 106 where peripheral circuitry for driving and controlling the area of the pixel array 102 are disposed. The peripheral circuitry includes a gate or address driver circuit 108, a source or data driver circuit 110, a controller 112, and an optional supply voltage (e.g., Vdd) driver 114. The controller 112 controls the gate, source, and supply voltage drivers 108, 110, 114. The gate driver 108, under control of the controller 112, operates on address or select lines SEL[i], SEL[i+1], and so forth, one for each row of pixels 104 in the pixel array 102. In pixel sharing configurations described below, the gate or address driver circuit 108 can also optionally operate on global select lines GSEL[j] and optionally/GSEL[j], which operate on multiple rows of pixels 104a-d in the pixel array 102, such as every two rows of pixels 104a-d. The source driver circuit 110, under control of the controller 112, operates on voltage data lines Vdata[k], Vdata[k+1], and so forth, one for each column of pixels 104a-d in the pixel array 102. The voltage data lines carry voltage programming information to each pixel 104 indicative of brightness of each light emitting device in the pixel 104. A storage element, such as a capacitor, in each pixel 104 stores the voltage programming information until an emission or driving cycle turns on the light emitting device. The optional supply voltage driver 114, under control of the controller 112, controls a supply voltage (EL Vdd) line, one for each row of pixels 104a-d in the pixel array 102.

The display system 100 may also include a current source circuit, which supplies a fixed current on current bias lines. In some configurations, a reference current can be supplied to the current source circuit. In such configurations, a current source control controls the timing of the application of a bias current on the current bias lines. In configurations in which the reference current is not supplied to the current source circuit, a current source address driver controls the timing of the application of a bias current on the current bias lines.

As is known, each pixel 104a-d in the display system 100 needs to be programmed with information indicating the brightness of the light emitting device in the pixel 104a-d. A frame defines the time period that includes a programming cycle or phase during which each and every pixel in the display system 100 is programmed with a programming voltage indicative of a brightness and a driving or emission cycle or phase during which each light emitting device in each pixel is turned on to emit light at a brightness commensurate with the programming voltage stored in a storage element. A frame is thus one of many still images that compose a complete moving picture displayed on the display system 100. There are at least two schemes for programming and driving the pixels: row-by-row, or frame-by-frame. In row-by-row programming, a row of pixels is programmed and then driven before the next row of pixels is programmed and driven. In frame-by-frame programming, all rows of pixels in the display system 100 are programmed first, and all of the frames are driven row-by-row. Either scheme can employ a brief vertical blanking time at the beginning or end of each frame during which the pixels are neither programmed nor driven.

The components located outside of the pixel array 102 may be disposed in a peripheral area 106 around the pixel array 102 on the same physical substrate on which the pixel array 102 is disposed. These components include the gate driver 108, the source driver 110 and the optional supply voltage control 114. Alternately, some of the components in the peripheral area can be disposed on the same substrate as the pixel array 102 while other components are disposed on a different substrate, or all of the components in the peripheral area can be disposed on a substrate different from the substrate on which the pixel array 102 is disposed. Together, the gate driver 108, the source driver 110, and the supply voltage control 114 make up a display driver circuit. The display driver circuit in some configurations may include the gate driver 108 and the source driver 110 but not the supply voltage control 114.

The display system 100 further includes a current supply and readout circuit 120, which reads output data from data output lines, VD [k], VD [k+1], and so forth, one for each column of pixels 104a, 104c in the pixel array 102. A set of column reference pixels 130 is fabricated on the edge of the pixel array 102 at the end of each column such as the column of pixels 104a and 104c. The column reference pixels 130 also may receive input signals from the controller 112 and output data signals to the current supply and readout circuit 120. The column reference pixels 130 include the drive transistor and an OLED but are not part of the pixel array 102 that displays images. As will be explained below, the column reference pixels 130 are not driven for most of the programming cycle because they are not part of the pixel array 102 to display images and therefore do not age from the constant application of programming voltages as compared to the pixels 104a and 104c. Although only one column reference pixel 130 is shown in FIG. 1, it is to be understood that there may be any number of column reference pixels although two to five such reference pixels may be used for each column of pixels in this example. Each row of pixels in the array 102 also includes row reference pixels 132 at the ends of each row of pixels 104a-d such as the pixels 104a and 104b. The row reference pixels 132 include the drive transistor and an OLED but are not part of the pixel array 102 that displays images. As will be explained the row reference pixels 132 have the function of providing a reference check for luminance curves for the pixels which were determined at the time of production.

Figure 2A:
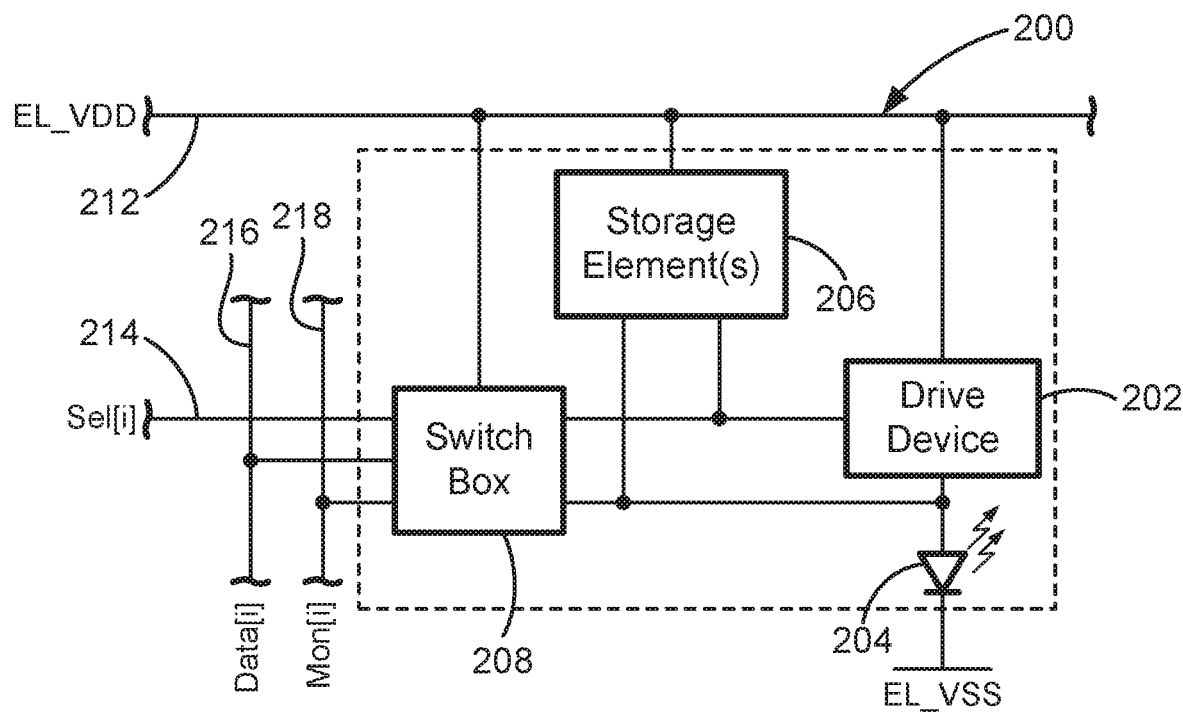
FIG. 2A is a block diagram of a driver circuit of one of the pixels of the AMOLED that may be tested for aging parameters.

FIG. 2A shows a block diagram of a driver circuit 200 for the pixel 104 in FIG. 1. The driver circuit 200 includes a drive device 202, an organic light emitting device ("OLED") 204, a storage element 206, and a switching device 208. A voltage source 212 is coupled to the drive transistor 206. A select line 214 is coupled to the switching device to activate the driver circuit 200. A data line 216 allows a programming voltage to be applied to the drive device 202. A monitoring line 218 allows outputs of the OLED 204 and or the drive device 202 to be monitored. Alternatively, the monitor line 218 and the data line 216 may be merged into one line (i.e. Data/Mon) to carry out both the programming and monitoring functions through that single line.

Figure 2B:
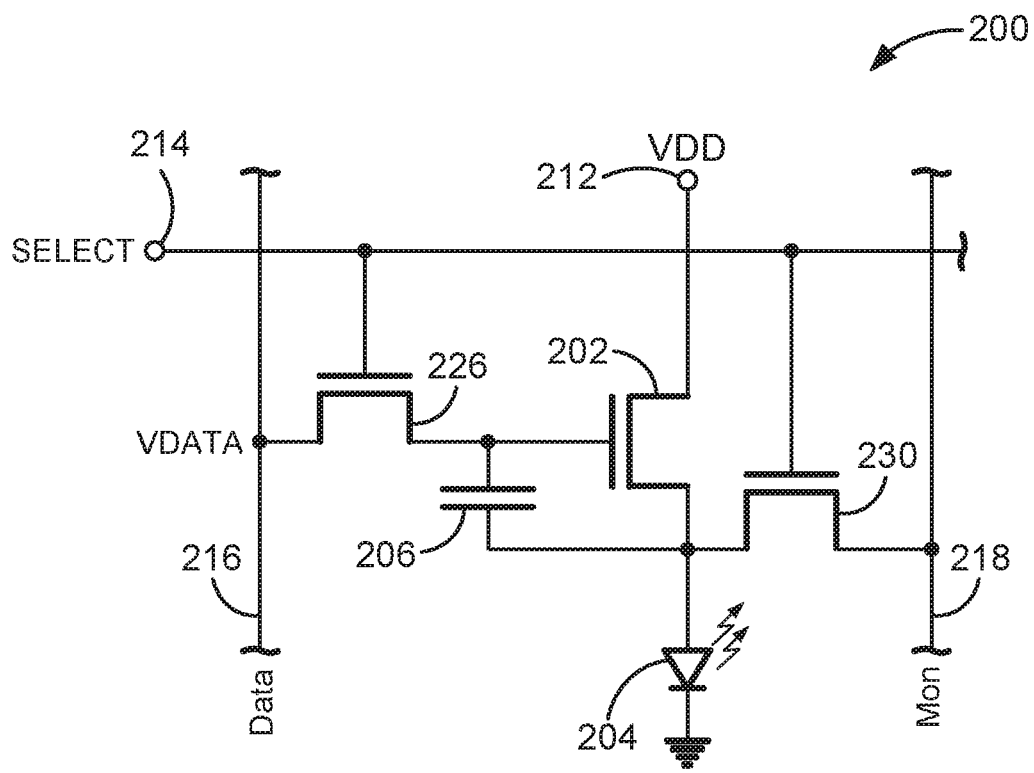
FIG. 2B is a circuit diagram of a driver circuit of one of the pixels of the AMOLED.

FIG. 2B shows one example of a circuit to implement the driver circuit 200 in FIG. 2A. As shown in FIG. 2B, the drive device 202 is a drive transistor which is a thin film transistor in this example that is fabricated from amorphous silicon. The storage element 206 is a capacitor in this example. The switching device 208 includes a select transistor 226 and a monitoring transistor 230 that switch the different signals to the drive circuit 200. The select line 214 is coupled to the select transistor 226 and the monitoring transistor 230. During the readout time, the select line 214 is pulled high. A programming voltage may be applied via the programming voltage input line 216. A monitoring voltage may be read from the monitoring line 218 that is coupled to the monitoring transistor 230. The signal to the select line 214 may be sent in parallel with the pixel programming cycle. As will be explained below, the driver circuit 200 may be periodically tested by applying reference voltage to the gate of the drive transistor.

There are several techniques for extracting electrical characteristics data from a device under test (DUT) such as the display system 100. The device under test (DUT) can be any material (or device) including (but not limited to) a light emitting diode (LED), or OLED. This measurement may be effective in determining the aging (and/or uniformity) of an OLED in a panel composed of an array of pixels such as the array 102 in FIG. 1. This extracted data can be stored in lookup tables as raw or processed data in memory in the controller 112 in FIG. 1. The lookup tables may be used to compensate for any shift in the electrical parameters of the backplane (e.g., threshold voltage shift) or OLED (e.g., shift in the OLED operating voltage). Despite using an OLED display in FIG. 1 in these examples, the techniques described herein may be applied to any display technology including but not limited to OLED, liquid crystal displays (LCD), light emitting diode displays, or plasma displays. In the case of OLED, the electrical information measured may provide an indication of any aging that may have occurred.

Current may be applied to the device under test and the output voltage may be measured. In this example, the voltage is measured with an analog to digital converter (ADC). A higher programming voltage is necessary for a device such as an OLED that ages as compared to the programming voltage for a new OLED for the same output. This method gives a direct measurement of that voltage change for the device under test. Current flow can be in any direction but the current is generally fed into the device under test (DUT) for illustration purposes.

Figure 3:
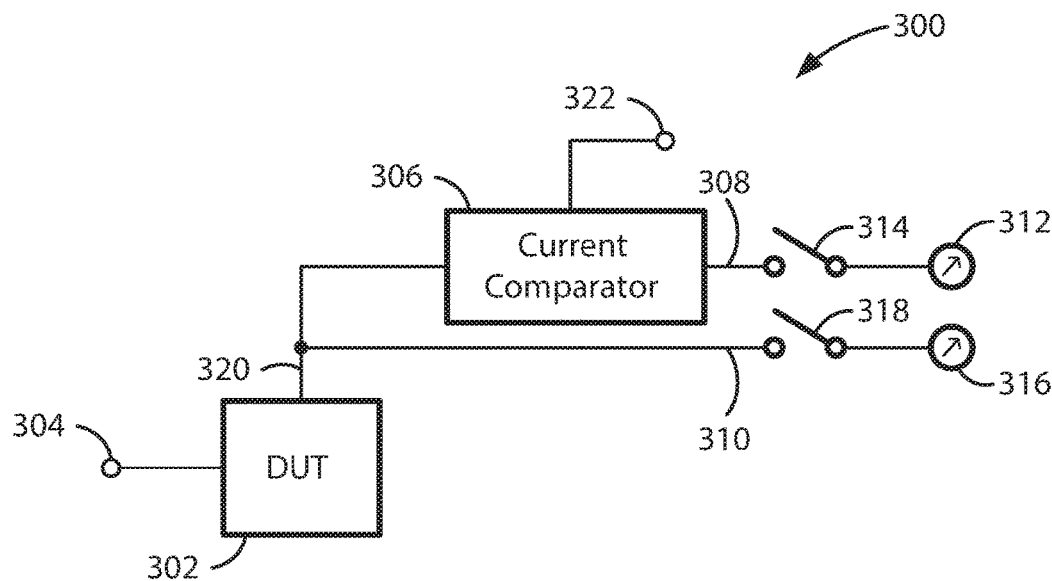
FIG. 3 is a block diagram for a system to determine one of the baseline aging parameters for a device under test.

FIG. 3 is a block diagram of a comparison system 300 that may be used to determine a baseline value for a device under test 302 to determine the effects of aging on the device under test 302. The comparison system uses two reference currents to determine the baseline current output of the device under test 302. The device under test 302 may be either the drive transistor such as the drive transistor 202 in FIG. 2B or an OLED such as the OLED 204 in FIG. 2B. Of course other types of display devices may also be tested using the system shown in FIG. 3. The device under test 302 has a programming voltage input 304 that is held at a constant level to output a current. A current comparator 306 has a first reference current input 308 and a second reference current input 310. The reference current input 308 is coupled to a first reference current source 312 via a switch 314. The second current input 310 of the comparator 306 is coupled to a second reference current source 316 via a switch 318.

An output 320 of the device under test 302 is also coupled to the second current input 310. The current comparator 306 includes a comparison output 322.

By keeping the voltage to the input 304 constant, the output current of the device under test 302 is also constant. This current depends on the characteristics of the device under test 302. A constant current is established for the first reference current from the first reference current source 312 and via the switch 314 the first reference current is applied to the first input 308 of the current comparator 306. The second reference current is adjusted to different levels with each level being connected via the switch 318 to the second input 310 of the comparator 306. The second reference current is combined with the output current of the device under test 302. Since the first and second reference current levels are known, the difference between the two reference current levels from the output 322 of the current comparator 306 is the current level of the device under test 302. The resulting output current is stored for the device under test 302 and compared with the current measured based on the same programming voltage level periodically during the lifetime operation of the device under test 302 to determine the effects of aging.

The resulting determined device current may be stored in look up tables for each device in the display. As the device under test 302 ages, the current will change from the expected level and therefore the programming voltage may be changed to compensate for the effects of aging based on the base line current determined through the calibration process in FIG. 3.

Figure 4A:
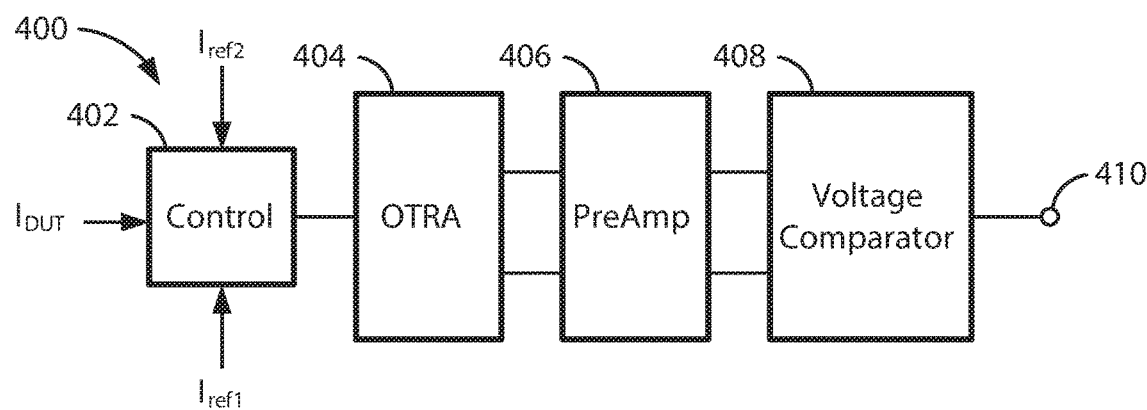
FIG. 4A is a block diagram of the current comparator in FIG. 3 for comparison of a reference current level to the device under test for use in aging compensation.

FIG. 4A is a block diagram of a current comparator circuit 400 that may be used to compare reference currents with a device under test 302 such as in FIG. 3. The current comparator circuit 400 has a control junction 402 that allows various current inputs such as two reference currents and the current of the device under test such as the pixel driver circuit 200 in FIG. 1. The current may be a positive current when the current of the drive transistor 202 is compared or negative when the current of the OLED 204 is compared. The current comparator circuit 400 also includes an operational trans-resistance amplifier circuit 404, a preamplifier 406 and a voltage comparator circuit 408 that produces a voltage output 410. The combined currents are input to the operational trans-resistance amplifier circuit 404 and converted to a voltage. The voltage is fed to the preamplifier and the voltage comparator circuit 408 determines whether the difference in currents is positive or negative and outputs a respective one or a zero value.

Figure 4B:
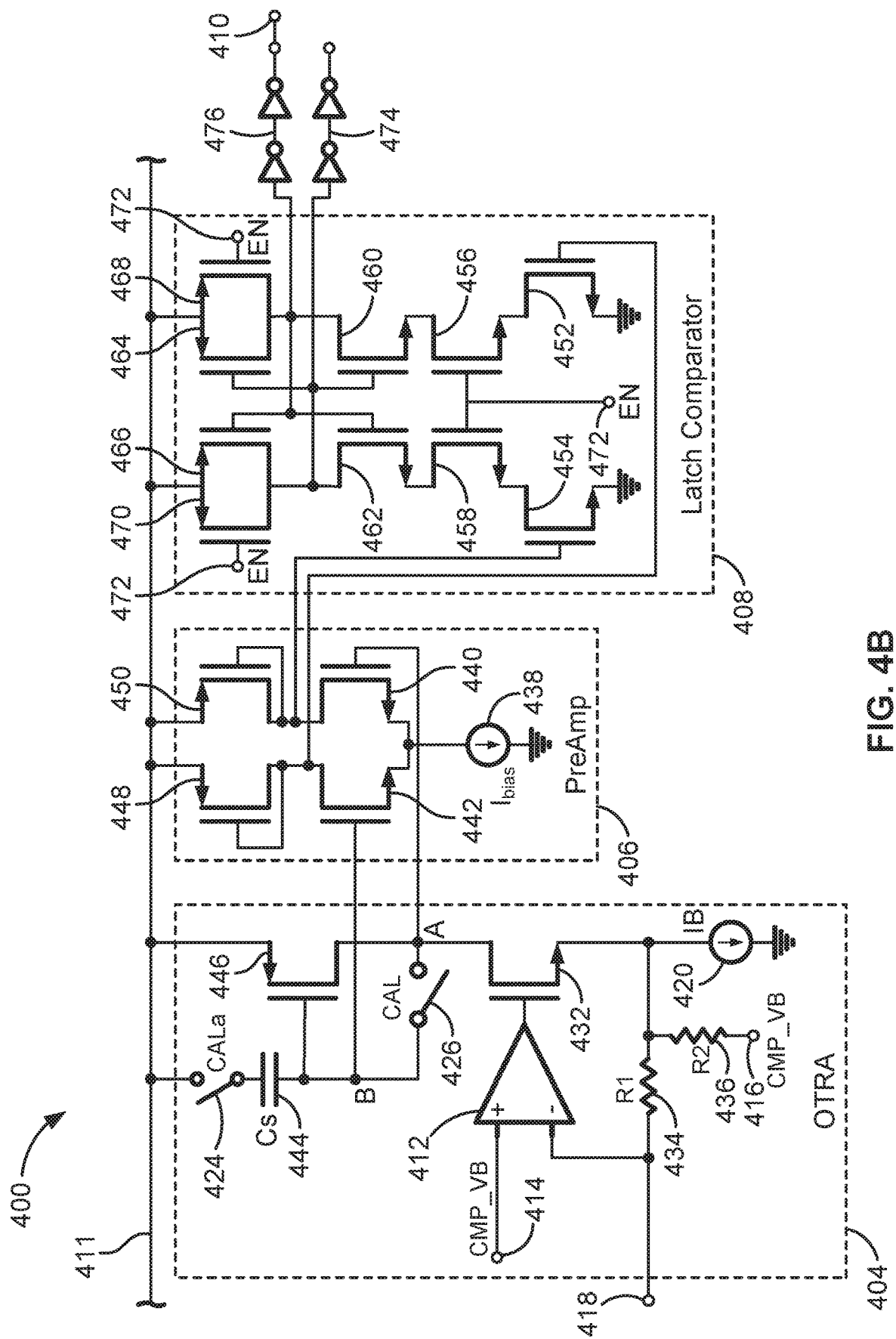
FIG. 4B is a detailed circuit diagram of the current comparator in FIG. 4A.

FIG. 4B is a circuit diagram of the components of the example current comparator system 400 in FIG. 4A that may be used to compare the currents as described in the process in FIG. 3 for a device under test such as the device 302. The operational trans-resistance amplifier circuit 404 includes an operational amplifier 412, a first voltage input 414 (CMP_VB), a second voltage input 416 (CMP_VB), a current input 418, and a bias current source 420. The operational trans-resistance amplifier circuit 404 also includes two calibration switches 424 and 426. As will be explained below, various currents such as the current of the device under test 302, a variable first reference current and a fixed second reference current as shown in FIG. 3 are coupled to the current input 418 in this example. Of course, the fixed second reference current may be set to zero if desired.

The first reference current input is coupled to the negative input of the operational amplifier 412. The negative input of the operational amplifier 412 is therefore coupled to the output current of the device under test 302 in FIG. 3 as well as one or two reference currents. The positive input of the operational amplifier 412 is coupled to the first voltage input 414. The output of the operational amplifier 412 is coupled to the gate of a transistor 432. A resistor 434 is coupled between the negative input of the operational amplifier 412 and the source of the transistor 432. A resistor 436 is coupled between the source of the transistor 432 and the second voltage input 416.

The drain of the transistor 432 is coupled directly to the drain of a transistor 446 and via the calibration switch 426 to the gate. A sampling capacitor 444 is coupled between the gate of the transistor 446 and a voltage supply rail 411 through a switch 424. The source of the 446 is also coupled to the supply rail 411. The drain and gate of the transistor 446 are coupled to the gate terminals of transistors 440 and 442, respectively. The sources of the transistors 440 and 442 are tied together and coupled to a bias current source 438. The drains of the transistors 442 and 440 are coupled to respective transistors 448 and 450 which are wired in diode-connected configuration to the supply voltage rail 411. As shown in FIG. 4B, the transistors 440, 442, 448 and 450 and the bias current source 438 are parts of the preamplifier 406

The drains of the transistors 442 and 440 are coupled to the gates of the respective transistors 452 and 454. The drains of the transistors 452 and 454 are coupled to the transistors 456 and 458. The drains of the transistors 456 and 458 are coupled to the respective sources of the transistors 460 and 462. The drain and gate terminals of the transistors 460 and 462 are coupled to the respective drain and gate terminals of the transistors 464 and 466. The source terminals of the transistors 464 and 466 are coupled to the supply voltage rail 411. The sources and drains of the transistors 464 and 466 are tied to the respective sources and drains of transistors 468 and 470. The gates of the transistors 456 and 458 are tied to an enable input 472. The enable input 472 is also tied to the gates of dual transistors 468 and 470.

A buffer circuit 474 is coupled to the drain of the transistor 462 and the gate of the transistor 460. The output voltage 410 is coupled to a buffer circuit 476 which is coupled to the drain of the transistor 460 and the gate of the transistor 462. The buffer circuit 474 is used to balance the buffer 476. The transistors 452, 454, 456, 458, 460, 462, 464, 466, 468 and 470 and the buffer circuits 474 and 476 make up the voltage comparator circuit 408.

The current comparator system 400 may be based on any integrated circuit technology including but not limited to CMOS semiconductor fabrication. The components of the current comparator system 400 are CMOS devices in this example. The values for the input voltages 414 and 416 are determined for a given reference current level from the first current input 418 ($I_{ref}$). In this example, the voltage levels for both the input voltages 414 and 416 are the same. The voltage inputs 414 and 416 to the operational amplifier 412 may be controlled using a digital to analog converter (DAC) device which is not shown in FIG. 4. Level shifters can also be added if the voltage ranges of the DACs are insufficient. The bias current may originate from a voltage controlled current source such as a transimpedance amplifier circuit or a transistor such as a thin film transistor.

Figure 4C:
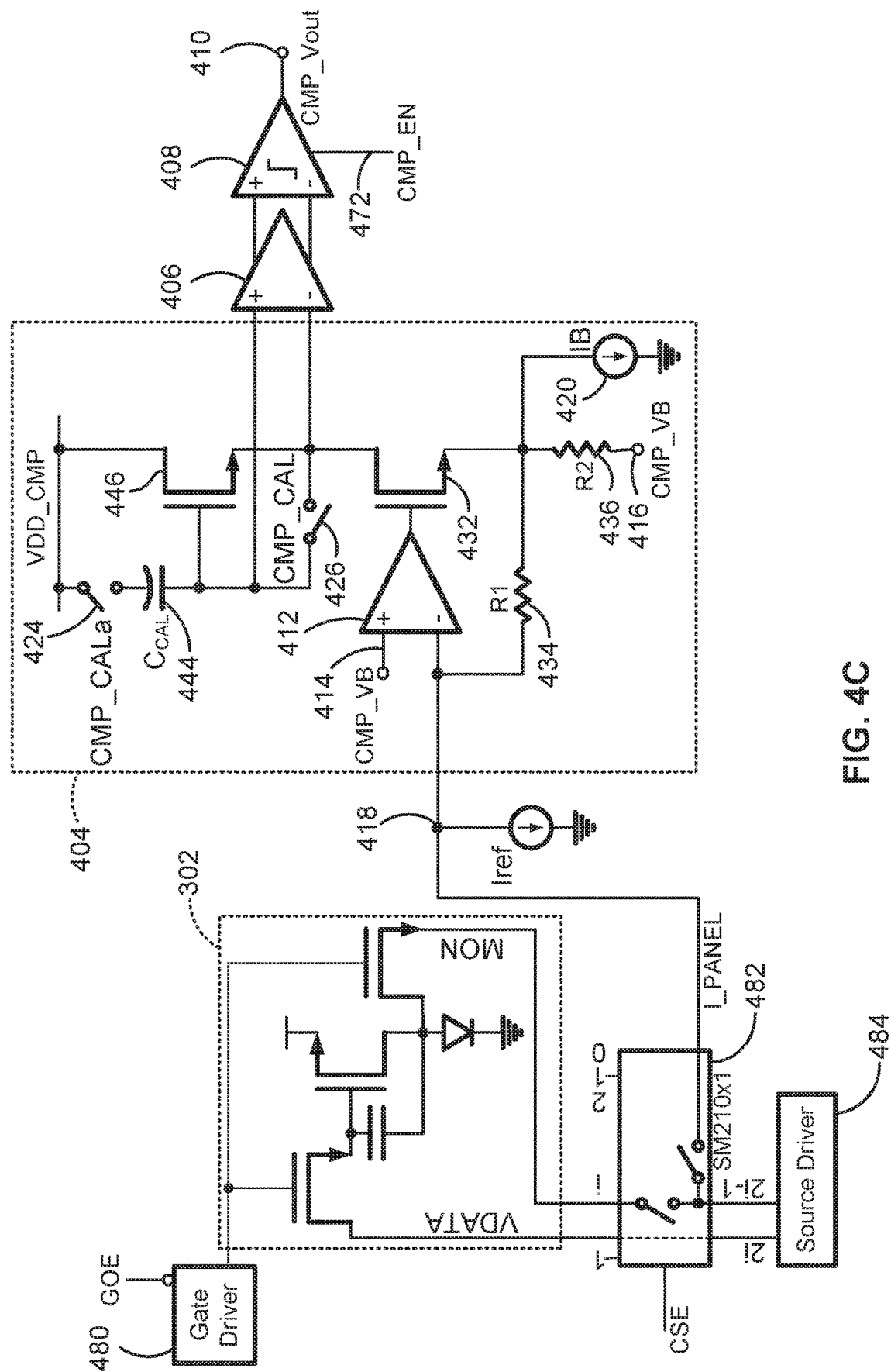
FIG. 4C is a detailed block diagram of the device under test in FIG. 3 coupled to the current comparator in FIG. 4A.

FIG. 4C shows a detailed block diagram of one example of a test system such as the system 300 shown in FIG. 3. The test system in FIG. 4C is coupled to a device under test 302 which may be a pixel driver circuit such as the pixel driver circuit 200 shown in FIG. 2. In this example, all of the driver circuits for a panel display are tested. A gate driver circuit 480 is coupled to the select lines of all of the driver circuits. The gate driver circuit 480 includes an enable input, which in this example enables the device under test 302 when the signal on the input is low.

The device under test 302 receives a data signal from a source driver circuit 484. The source circuit 484 may be a source driver such as the source driver 120 in FIG. 1. The data signal is a programming voltage of a predetermined value. The device under test 302 outputs a current on a monitoring line when the gate driver circuit 480 enables the device. The output of the monitoring line from the device under test 302 is coupled to an analog multiplexer circuit 482 that allows multiple devices to be tested. In this example, the analog multiplexer circuit 482 allows multiplexing of 210 inputs, but of course any number of inputs may be multiplexed.

The signal output from the device under test 302 is coupled to the reference current input 418 of the operational trans-resistance amplifier circuit 404. In this example a variable reference current source is coupled to the current input 418 as described in FIG. 3. In this example, there is no fixed reference current such as the first reference current source in FIG. 3. The value of first reference current source in FIG. 3 in this example is therefore considered to be zero.

FIG. 5A is a timing diagram of the signals for the current comparator shown in FIGS. 4A-4C. The timing diagram in FIG. 5A shows a gate enable signal 502 to the gate driver 480 in FIG. 4C, a CSE enable signal 504 that is coupled to the analog multiplexer 482, a current reference signal 506 that is produced by a variable reference current source that is set at a predetermined level for each iteration of the test process and coupled to the current input 418, a calibration signal 508 that controls the calibration switch 426, a calibration signal 510 that controls the calibration switch 424, a comparator enable signal 512 that is coupled to the enable input 472, and the output voltage 514 over the output 410. The CSE enable signal 504 is kept high to ensure that any leakage on the monitoring line of the device under test 302 is eliminated in the final current comparison.

In a first phase 520, the gate enable signal 502 is pulled high and therefore the output of the device under test 302 in FIG. 4C is zero. The only currents that are input to the current comparator 400 are therefore leakage currents from the monitoring line of the device under test 302. The output of the reference current 506 is also set to zero such that the optimum quiescent condition of the transistors 432 and 436 in FIGS. 4B and 4C is minimally affected only by line leakage or the offset of the readout circuitry. The calibration signal 508 is set high causing the calibration switch 426 to close. The calibration signal 510 is set high to cause the calibration switch 424 to close. The comparator enable signal 512 is set low and therefore the output from the voltage comparator circuit 408 is reset to a logical one. The leakage current is therefore input to the current input 418 and a voltage representing the leakage current of the monitoring line on the panel is stored on the capacitor 444.

In a second phase 522, the gate enable signal 502 is pulled low and therefore the output of the device under test 302 produces an unknown current at a set programming voltage input from the source circuit 484. The current from the device under test 302 is input through the current input 418 along with the reference current 506 which is set at a first predetermined value and opposite the direction of the current of the device under test. The current input 418 therefore is the difference between the reference current 506 and the current from the device under test 302. The calibration signal 510 is momentarily set low to open the switch 424.

The calibration signal 508 is then set low and therefore the switch 426 is opened. The calibration signal 510 to the switch 424 is then set high to close the switch 424 to stabilize the voltage on the gate terminal of the transistor 446. The comparator enable signal 512 remains low and therefore there is no output from the voltage comparator circuit 408.

In a third phase 524, the comparator enable signal 512 is pulled high and the voltage comparator 408 produces an output on the voltage output 410. In this example, a positive voltage output logical one for the output voltage signal 514 indicates a positive current therefore showing that the current of the device under test 302 is greater than the predetermined reference current. A zero voltage on the voltage output 410 indicates a negative current showing that the current of the device under test 302 is less than the predetermined level of the reference current. In this manner, any difference between the current of the device under test and the reference current is amplified and detected by the current comparator circuit 400. The value of the reference current is then shifted based on the result to a second predetermined level and the phases 520, 522 and 524 are repeated. Adjusting the reference current allows the comparator circuit 400 to be used by the test system to determine the current output by the device under test 302.

FIG. 5B is a timing diagram of the signals applied to the test system shown in FIG. 4C in order to determine an optimal bias current value for the bias current source 420 in FIG. 4B for the operational trans-resistance amplifier circuit 404. In order to achieve the maximum signal-to-noise ratio (SNR) for the current comparator circuit 400 it is essential to calibrate the current comparator. The calibration is achieved by means of fine tuning of the bias current source 420. The optimum bias current level for the bias current source 420 minimizes the noise power during the measurement of a pixel which is also a function of the line leakage. Accordingly, it is required to capture the line leakage during the calibration of the current comparator.

The timing diagram in FIG. 5B shows a gate enable signal 552 to the gate driver 480 in FIG. 4C, a CSE enable signal 554 that is coupled to the analog multiplexer 482, a current reference signal 556 that is produced by a variable reference current source that is set at a predetermined level for each iteration of the calibration process and coupled to the current input 418, a calibration signal 558 that controls the calibration switch 426, a comparator enable signal 560 that is coupled to the enable input 472, and the output voltage 562 over the output 410.

The CSE enable signal 554 is kept high to ensure that any leakage on the line is included in the calibration process. The gate enable signal 552 is also kept high in order to prevent the device under test 302 from outputting current from any data inputs. In a first phase 570, the calibration signal 556 is pulled high thereby closing the calibration switch 426. Another calibration signal is pulled high to close the calibration switch 424. The comparator enable signal 558 is pulled low in order to reset the voltage output from the voltage comparator circuit 408. Any leakage current from the monitoring line of the device under test 302 is converted to a voltage which is stored on the capacitor 444.

A second phase 572 occurs when the calibration signal to the switch 424 is pulled low and then the calibration signal 556 is pulled low thereby opening the switch 426. The signal to the switch 424 is then pulled high closing the switch 424. A small current is output from the reference current source to the current input 418. The small current value is a minimum value corresponding to the minimum detectable signal (MDS) range of the current comparator 400.

A third phase 574 occurs when the comparator enable signal 560 is pulled high thereby allowing the voltage comparator circuit 408 to read the inputs. The output of the voltage comparator circuit 408 on the output 410 should be positive indicating a positive current comparison with the leakage current.

A fourth phase 576 occurs when the calibration signal 556 is pulled high again thereby closing the calibration switch 426. The comparator enable signal 558 is pulled low in order to reset the voltage output from the voltage comparator circuit 408. Any leakage current from the monitoring line of the device under test 302 is converted to a voltage which is stored on the capacitor 444.

A fifth phase 578 occurs when the calibration signal to the switch 424 is pulled low and then the calibration signal 556 is pulled low thereby opening the switch 426. The signal to the switch 424 is then pulled high closing the switch 424. A small current is output from the reference current source to the current input 418. The small current value is a minimum value corresponding to the minimum detectable signal (MDS) range of the current comparator 400 but is a negative current as opposed to the positive current in the second phase 572.

A sixth phase 580 occurs when the comparator enable signal 560 is pulled high thereby allowing the voltage comparator circuit 408 to read the inputs. The output of the voltage comparator circuit 408 on the output 410 should be zero indicating a negative current comparison with the leakage current.

The phases 570, 572, 574, 576, 578 and 580 are repeated. By adjusting the value of the bias current, eventually the rate of the valid output voltage toggles between a one and a zero will maximize indicating an optimal bias current value.

Figure 6:
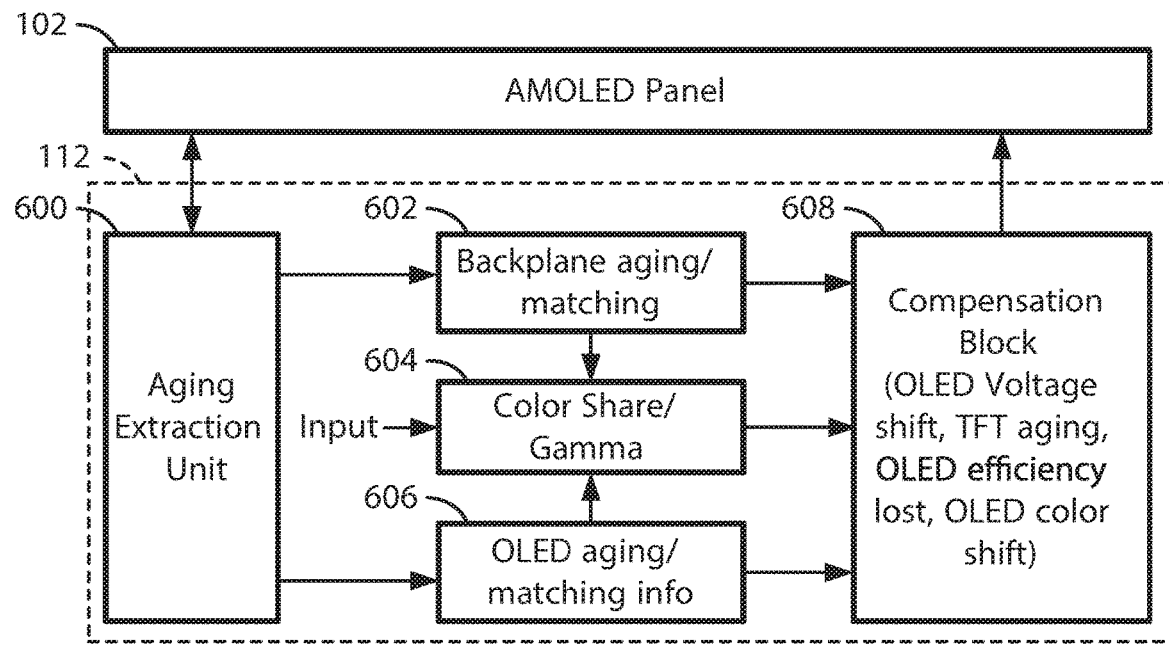
FIG. 6 is a block diagram of a reference current system to compensate for the aging of the AMOLED display in FIG. 1.

FIG. 6 is a block diagram of the compensation components of the controller 112 of the display system 100 in FIG. 1. The compensation components include an aging extraction unit 600, a backplane aging/matching module 602, a color/share gamma correction module 604, an OLED aging memory 606, and a compensation module 608. The backplane with the electronic components for driving the display system 100 may be any technology including (but not limited to) amorphous silicon, poly silicon, crystalline silicon, organic semiconductors, oxide semiconductors. Also, the display system 100 may be any display material (or device) including (but not limited to) LEDs, or OLEDs.

The aging extraction unit 600 is coupled to receive output data from the array 102 based on inputs to the pixels of the array and corresponding outputs for testing the effects of aging on the array 102. The aging extraction unit 600 uses the output of the column reference pixels 130 as a baseline for comparison with the output of the active pixels 104a-d in order to determine the aging effects on each of the pixels 104a-d on each of the columns that include the respective column reference pixels 130. Alternatively, the average value of the pixels in the column may be calculated and compared to the value of the reference pixel. The color/share gamma correction module 604 also takes data from the column reference pixels 130 to determine appropriate color corrections to compensate from aging effects on the pixels. The baseline to compare the measurements for the comparison may be stored in lookup tables on the memory 606. The backplane aging/matching module 602 calculates adjustments for the components of the backplane and electronics of the display. The compensation module 608 is provided inputs from the extraction unit 600 the backplane/matching module 602 and the color/share gamma correction module 604 in order to modify programming voltages to the pixels 104a-d in FIG. 1 to compensate for aging effects. The compensation module 608 accesses the look up table for the base data for each of the pixels 104a-d on the array 102 to be used in conjunction with calibration data. The compensation module 608 modifies the programming voltages to the pixels 104a-d accordingly based on the values in the look up table and the data obtained from the pixels in the display array 102.

The controller 112 in FIG. 2 measures the data from the pixels 104a-d in the display array 102 in FIG. 1 to correctly normalize the data collected during measurement. The column reference pixels 130 assist in these functions for the pixels on each of the columns. The column reference pixels 130 may be located outside the active viewing area represented by the pixels 104a-d in FIG. 1, but such reference pixels may also be embedded within the active viewing areas. The column reference pixels 130 are preserved with a controlled condition such as being un-aged, or aged in a predetermined fashion, to provide offset and cancellation information for measurement data of the pixels 104a-d in the display array 102. This information helps the controller 112 cancel out common mode noise from external sources such as room temperature, or within the system itself such as leakage currents from other pixels 104a-d. Using a weighted average from several pixels on the array 102 may also provide information on panel-wide characteristics to address problems such as voltage drops due to the resistance across the panel, i.e. current/resistance (IR) drop. Information from the column reference pixels 130 being stressed by a known and controlled source may be used in a compensation algorithm run by the compensation module 608 to reduce compensation errors occurring from any divergence. Various column reference pixels 130 may be selected using the data collected from the initial baseline measurement of the panel. Bad reference pixels are identified, and alternate reference pixels 130 may be chosen to insure further reliability. Of course it is to be understood that the row reference pixels 132 may be used instead of the column reference pixels 130 and the row may be used instead of columns for the calibration and measurement.

Figure 10:
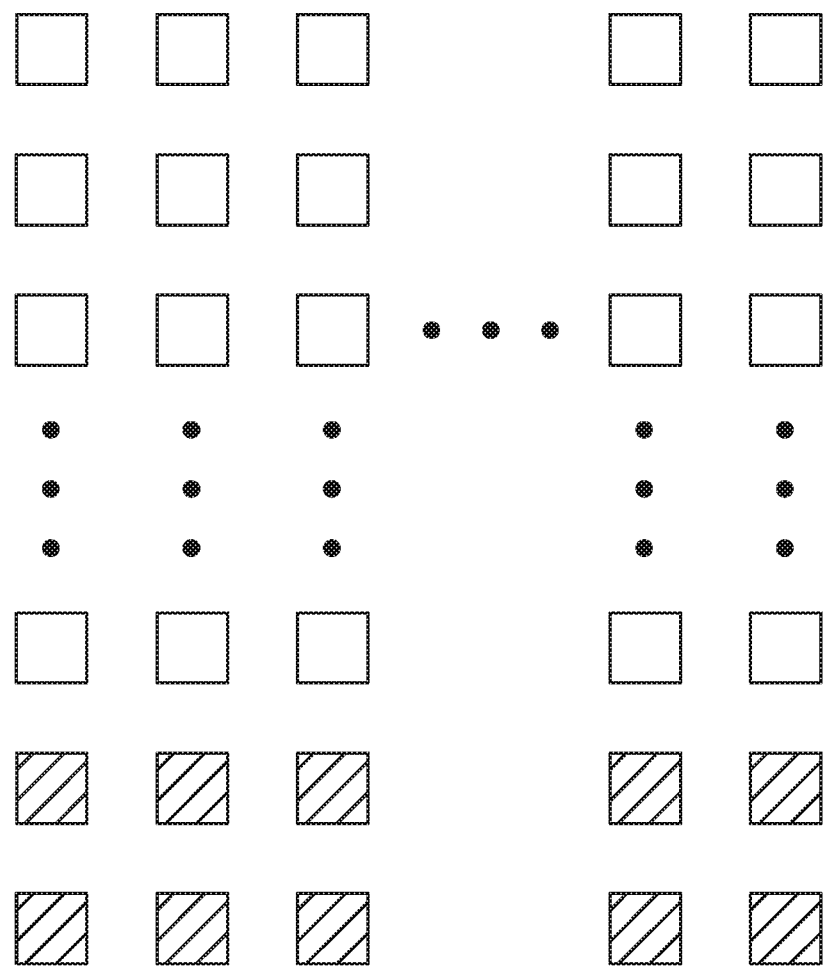
FIG. 10 is a diagrammatic illustration of a display having a matrix of pixels that includes rows of reference pixels.

In displays that use external readout circuits to compensate the drift in pixel characteristics, the readout circuits read at least one of current, voltage and charge from the pixels when the pixels are supplied with known input signals over time. The readout signals are translated into the pixel parameters' drift and used to compensate for the pixel characteristics change. These systems are mainly prone to the shift in the readout circuitry changes due to different phenomena such as temperature variation, aging, leakage and more. As depicted in FIG. 10, rows of reference pixels (the cross hatched pixels in FIG. 10) may be used to remove these effects from the readout circuit, and these reference rows may be used in the display array. These rows of reference pixels are biased in a way that they are substantially immune to aging. The readout circuits read these rows as well as normal display rows. After that, the readout values of the normal rows are trimmed by the reference values to eliminate the unwanted effects. Since each column is connected to one readout circuit, a practical way is to use the reference pixels in a column to tune its normal pixels.

The major change will be the global effects on the panel such as temperature which affects both reference pixel and normal pixel circuits. In this case, this effect will be eliminated from the compensation value and so there will be a separated compensation for such phenomena.

To provide compensation for global phenomena without extra compensation factors or sensors, the effect of global phenomena is subtracted from the reference pixels. There are different methods to calculate the effect of the global phenomena. However, the direct effects are:

Average reference value: here, the average value of the reference pixel values is used as effect of global phenomena. Then this value can be subtracted from all the reference pixels. As a result, if the reference values are modified with a global phenomenon it will be subtracted from them. Thus, when the pixel measured values are being trimmed by the reference values, the global effect in the pixel values will stay intact. Therefore, it will be able to compensate for such an effect.

Master reference pixels: another method is to use master reference pixels (the master references can be a subset of the reference pixels or completely different ones). Similar to the pervious method, the average value of master references is subtracted from the reference pixel circuits resulting in leaving the effect of global phenomena in the pixel measured values.

There are various compensation methods that may make use of the column reference pixels 130 in FIG. 1. For example in thin film transistor measurement, the data value required for the column reference pixel 130 to output a current is subtracted from the data value of a pixel 104a-d in the same column of pixels in the active area (the pixel array 102) to output the same current. The measurement of both the column reference pixels 130 and pixels 104a-d may occur very close in time, e.g. during the same video frame. Any difference in current indicates the effects of aging on the pixels 104a-d. The resulting value may be used by the controller 112 to calculate the appropriate adjustment to programming voltage to the pixels 104a-d to maintain the same luminance during the lifetime of the display. Another use of a column reference pixel 130 is to provide a reference current for the other pixels 104 to serve as a baseline and determine the aging effects on the current output of those pixels. The reference pixels 130 may simplify the data manipulation since some of the common mode noise cancellation is inherent in the measurement because the reference pixels 130 have common data and supply lines as the active pixels 104. The row reference pixels 132 may be measured periodically for the purpose of verifying that luminance curves for the pixels that are stored for use of the controller for compensation during display production are correct.

A measurement of the drive transistors and OLEDs of all of the driver circuits such as the driver circuit 200 in FIG. 2 on a display before shipping the display take 60-120 seconds for a 1080p display, and will detect any shorted and open drive transistors and OLEDs (which result in stuck or unlit pixels). It will also detect non-uniformities in drive transistor or OLED performance (which result in luminance non-uniformities). This technique may replace optical inspection by a digital camera, removing the need for this expensive component in the production facility. AMOLEDs that use color filters cannot be fully inspected electrically, since color filters are a purely optical component. In this case, technology that compensates for aging such as MAXLIFE™ from Ignis may be useful in combination with an optical inspection step, by providing extra diagnostic information and potentially reducing the complexity of optical inspection.

These measurements provide more data than an optical inspection may provide. Knowing whether a point defect is due to a short or open driver transistor or a short or open OLED may help to identify the root cause or flaw in the production process. For example, the most common cause for a short circuit OLED is particulate contamination that lands on the glass during processing, shorting the anode and cathode of the OLED. An increase in OLED short circuits could indicate that the production line should be shut down for chamber cleaning, or searches could be initiated for new sources of particles (changes in processes, or equipment, or personnel, or materials).

A relaxation system for compensating for aging effects such as the MAXLIFE™ system may correct for process non-uniformities, which increases yield of the display. However the measured current and voltage relationships or characteristics in the TFT or OLED are useful for diagnostics as well. For example, the shape of an OLED current-voltage characteristic may reveal increased resistance. A likely cause might be variations in the contact resistance between the transistor source/drain metal and the ITO (in a bottom emission AMOLED). If OLEDs in a corner of a display showed a different current-voltage characteristic, a likely cause could be mask misalignment in the fabrication process.

A streak or circular area on the display with different OLED current-voltage characteristics could be due to defects in the manifolds used to disperse the organic vapor in the fabrication process. In one possible scenario, a small particle of OLED material may flake from an overhead shield and land on the manifold, partially obstructing the orifice. The measurement data would show the differing OLED current-voltage characteristics in a specific pattern which would help to quickly diagnose the issue. Due to the accuracy of the measurements (for example, the 4.8 inch display measures current with a resolution of 100 nA), and the measurement of the OLED current-voltage characteristic itself (instead of the luminance), variations can be detected that are not visible with optical inspection.

This high-accuracy data may be used for statistical process control, identifying when a process has started to drift outside of its control limits. This may allow corrective action to be taken early (in either the OLED or drive transistor (TFT) fabrication process), before defects are detected in the finished product. The measurement sample is maximized since every TFT and OLED on every display is sampled.

If the drive transistor and the OLED are both functioning properly, a reading in the expected range will be returned for the components. The pixel driver circuit requires that the OLED be off when the drive transistor is measured (and vice-versa), so if the drive transistor or OLED is in a short circuit, it will obscure the measurement of the other. If the OLED is a short circuit (so the current reading is MAX), the data will show the drive transistor is an open circuit (current reading MIN) but in reality, the drive transistor could be operational or an open circuit. If extra data about the drive transistor is needed, temporarily disconnecting the supply voltage (EL VSS) and allowing it to float will yield a correct drive transistor measurement indicating whether the TFT is actually operational or in an open circuit.

In the same way, if the drive transistor is a short circuit, the data will show the OLED is an open circuit (but the OLED could be operational or an open circuit). If extra data about the OLED is needed, disconnecting the supply voltage (EL VDD) and allowing it to float will yield a correct OLED measurement indicating whether the OLED is actually operational or in an open circuit.

If both the OLED and TFT in a pixel behave as a short circuit, one of the elements in the pixel (likely the contact between TFT and OLED) will quickly burn out during the measurement, causing an open circuit, and moving to a different state. These results are summarized in Table 1 below.

TABLE 1

|  |  | OLED | | |
| --- | --- | --- | --- | --- |
|  |  | Short | OK | Open |
| Drive transistor (TFT) | Short | n/a | TFT max OLED min | TFT max OLED min |
|  | OK | TFT min OLED max | TFT OK OLED OK | TFT OK OLED min |
|  | Open | TFT min OLED max | TFT min OLED OK | TFT min OLED min |

Figure 7:
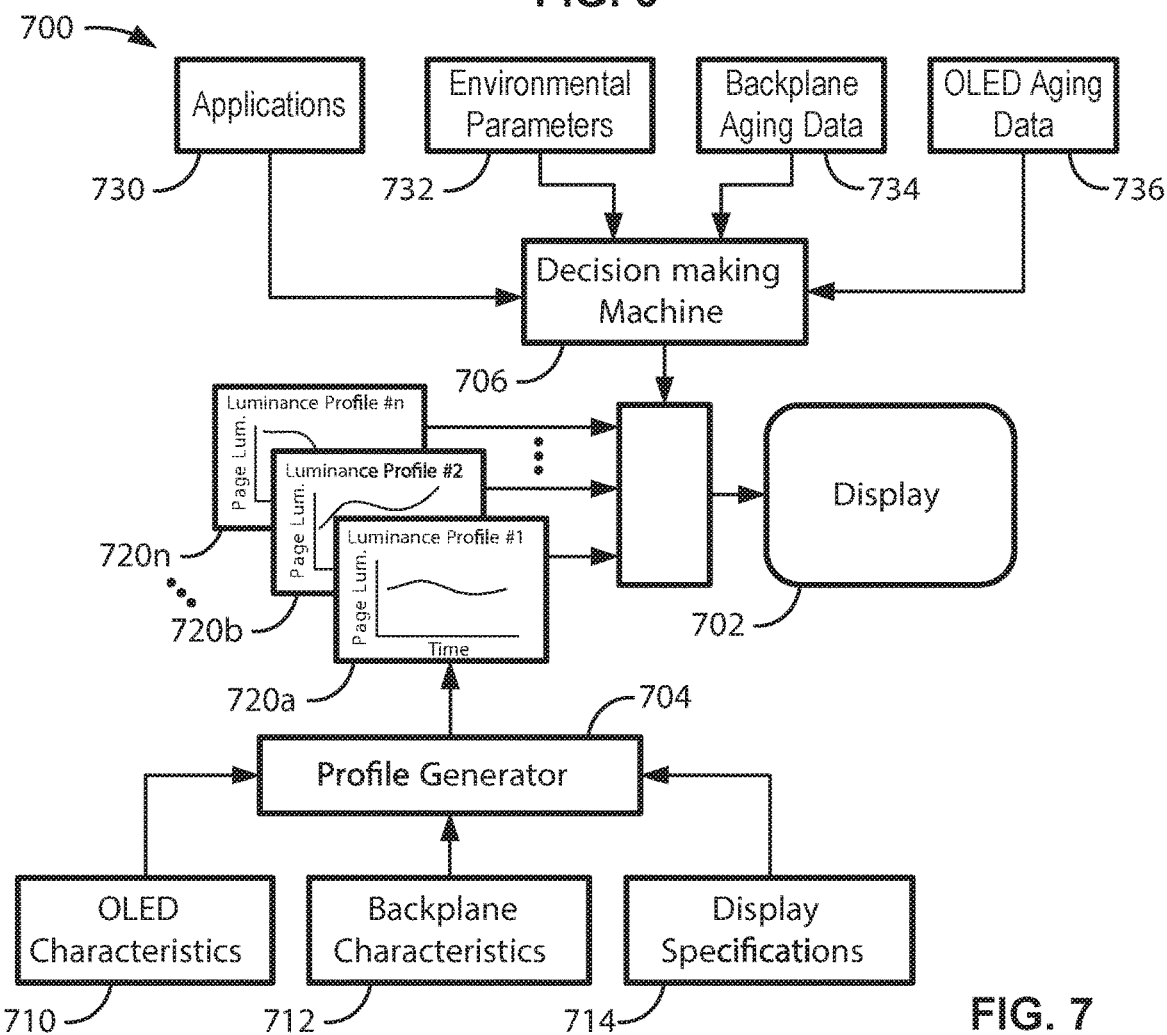
FIG. 7 is a block diagram of a system for the use of multiple luminance profiles for adjustment of a display in different circumstances.

FIG. 7 shows a system diagram of a control system 700 for controlling the brightness of a display 702 over time based on different aspects. The display 702 may be composed of an array of OLEDs or other pixel based display devices. The system 700 includes a profile generator 704 and a decision making machine 706. The profile generator 704 receives characteristics data from an OLED characteristics table 710, a backplane characteristics table 712 and a display specifications file 714. The profile generator 704 generates different luminance profiles 720a, 720b . . . 720n for different conditions. Here, to improve the power consumption, display lifetime, and image quality, the different brightness profiles 720a, 720b . . . 720n may be defined based on OLED and backplane information. Also, based on different applications, one can select different profiles from the luminance profiles 720a, 720b . . . 720n. For example, a flat brightness vs. time profile can be used for displaying video outputs such as movies whereas for brighter applications, the brightness can be drop at a defined rate. The decision making machine 706 may be software or hardware based and includes applications inputs 730, environmental parameter inputs 732, backplane aging data inputs 734 and OLED aging data inputs 736 that are factors in making adjustments in programming voltage to insure the proper brightness of the display 702.

To compensate for display aging perfectly, the short term and long term changes are separated in the display characteristics. One way is to measure a few points across the display with faster times between the measurements. As a result, the fast scan can reveal the short term effects while the normal aging extraction can reveal the long term effects.

Figure 8:
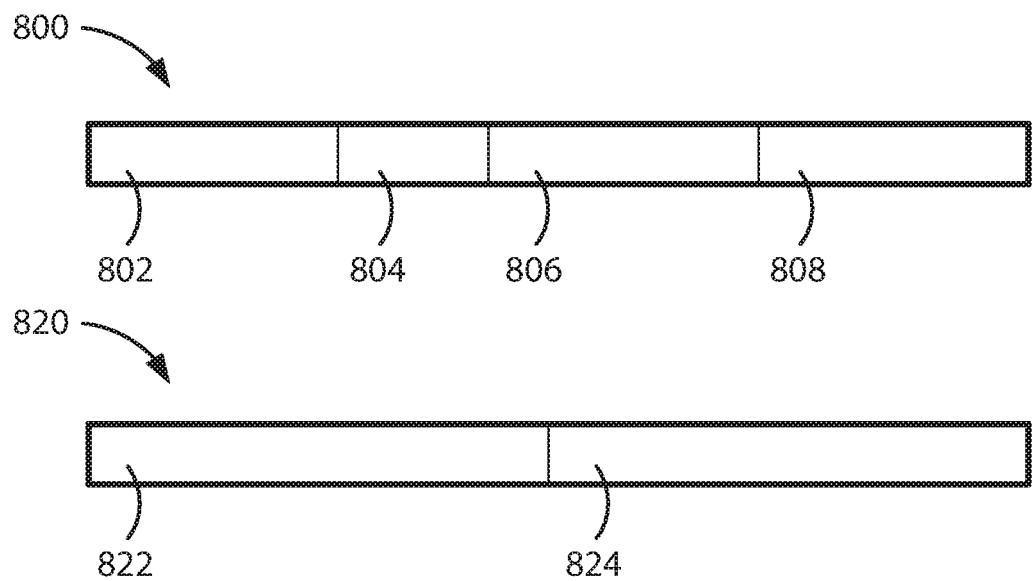
FIG. 8 are frame diagrams of video frames for calibration of pixels in a display.

The previous implementation of compensation systems uses a normal driving scheme, in which there was always a video frame shown on the panel and the OLED and TFT circuitries were constantly under electrical stress. Calibration of each pixel occurred during a video frame by changing the grayscale value of the active pixel to a desired value which caused a visual artifact of seeing the measured sub-pixel during the calibration. If the frame rate of the video is X, then in normal video driving, each video frame is shown on the pixel array 102 in FIG. 1 for 1/X of second and the panel is always running a video frame. In contrast, the relaxation video driving in the present example divides the frame time into four sub-frames as shown in FIG. 8. FIG. 8 is a timing diagram of a frame 800 that includes a video sub-frame 802, a dummy sub-frame 804, a relaxation sub-frame 806 and a replacement sub-frame 808.

The video sub-frame 802 is the first sub-frame which is the actual video frame. The video frame is generated the same way as normal video driving to program the entire pixel array 102 in FIG. 1 with the video data received from the programming inputs. The dummy sub-frame 804 is an empty sub-frame without any actual data being sent to the pixel array 102. The dummy sub-frame 804 functions to keep the same video frame displayed on the panel 102 for some time before applying the relaxation sub-frame 806. This increases the luminance of the panel.

The relaxation sub-frame 806 is the third sub-frame which is a black frame with zero gray scale value for all of the red green blue white (RGBW) sub-pixels in the pixel array 102. This makes the panel black and sets all of the pixels 104 to a predefined state ready for calibration and next video sub-frame insertion. The replacement sub-frame 808 is a short sub-frame generated solely for the purpose of calibration. When the relaxation sub-frame 806 is complete and the panel is black the data replacement phase starts for the next video frame. No video or blank data is sent to the pixel array 102 during this phase except for the rows with replacement data. For the non-replacement rows only the gate driver's clock is toggled to shift the token throughout the gate driver. This is done to speed up the scanning of the entire panel and also to be able to do more measurement per each frame.

Another technique is used to further alleviate the visual artifact of the measured sub-pixel during the replacement sub-frame 808. This has been done by re-programming the measured row with black as soon as the calibration is done. This returns the sub-pixel to the same state as it was during the relaxation sub-frame 806. However, there is still a small current going through the OLEDs in the pixels, which makes the pixel light up and become noticeable to the outside world. Therefore to re-direct the current going through the OLED, the controller 112 is programmed with a non-zero value to sink the current from the drive transistor of the pixel and keep the OLED off.

Having a replacement sub-frame 808 has a drawback of limiting the time of the measurement to a small portion of the entire frame. This limits the number of sub-pixel measurements per each frame. This limitation is acceptable during the working time of the pixel array 102. However, for a quick baseline measurement of the panel it would be a time-consuming task to measure the entire display because each pixel must be measured. To overcome this issue a baseline mode is added to the relaxation driving scheme. FIG. 8 also shows a baseline frame 820 for the driving scheme during the baseline measurement mode for the display. The baseline measurement frame 820 includes a video sub-frame 822 and a replacement sub-frame 824. If the system is switched to the baseline mode, the driving scheme changes such that there would only be two sub-frames in a baseline frame such as the frame 820. The video sub-frame 822 includes the normal programming data for the image. In this example, the replacement (measurement sub-frame) 824 has a longer duration than the normal replacement frame as shown in FIG. 8. The longer sub-frame drastically increases the total number of measurements per each frame and allows more accurate measurements of the panel because more pixels may be measured during the frame time.

The steep slope of the $\Delta V$ shift (electrical aging) at the early OLED stress time results in a curve of efficiency drop versus $\Delta V$ shift that behaves differently for the low value of $\Delta V$ compared to the high $\Delta V$ ranges. This may produce a highly non-linear $\Delta \eta$-$\Delta V$ curve that is very sensitive to initial electrical aging of the OLED or to the OLED pre-aging process. Moreover, the shape (the duration and slope) of the early $\Delta V$ shift drop can vary significantly from panel to panel due to process variations.

The use of a reference pixel and corresponding OLED is explained above. The use of such a reference pixel cancels the thermal effects on the ΔV measurements since the thermal effects affect both the active and reference pixels equally. However, instead of using an OLED that is not aging (zero stress) as a reference pixel such as the column reference pixels 130 in FIG. 1, a reference pixel with an OLED having a low level of stress may be used. The thermal impact on the voltage is similar to the non-aging OLED, therefore the low stress OLED may still be used to remove the measurement noise due to thermal effects. Meanwhile, due to the similar manufacturing condition with the rest of OLED based devices on the same panel the slightly stressed OLED may be as a good reference to cancel the effects of process variations on the Δη-ΔV curve for the active pixels in a column. The steep early ΔV shift will also be mitigated if such an OLED is used as a reference.

To use a stressed-OLED as a reference, the reference OLED is stressed with a constant low current (⅕ to ⅓ of full current) and its voltage (for a certain applied current) must be used to cancel the thermal and process issues of the pixel OLEDs as follows:

$$W = \frac{V_{pixelOLED} - V_{refOLED}}{V_{refOLED}}$$

Figure 9:
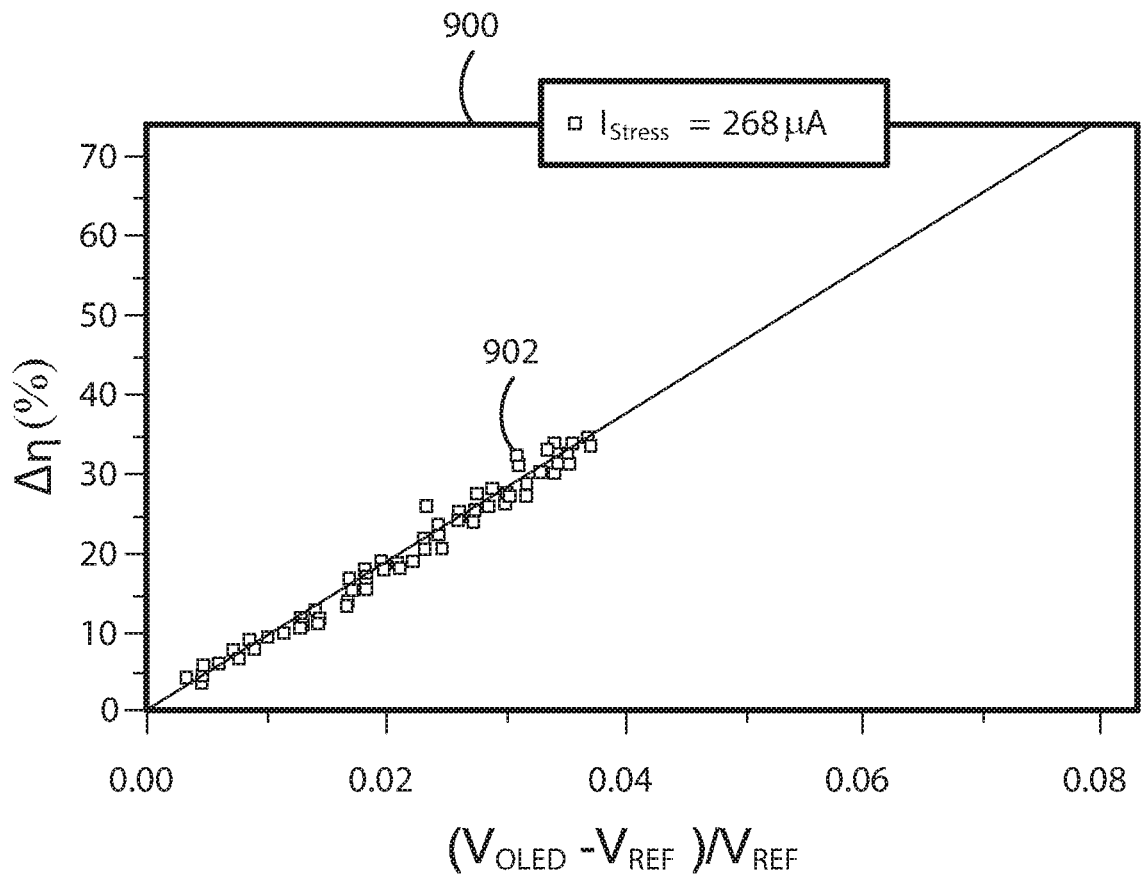
FIG. 9 is a graph showing the use of a small current applied to a reference pixel for more accurate aging compensation.

In this equation, W is the relative electrical aging based on the difference between the voltage of the active pixel OLED and the reference pixel OLED is divided by the voltage of the reference pixel OLED. FIG. 9 is a graph 900 that shows a plot 902 of points for a stress current of 268 uA based on the W value. As shown by the graph 900, the W value is a close-to-linear relation with the luminance drop for the pixel OLEDs as shown for a high stress OLED.

Figure 11:
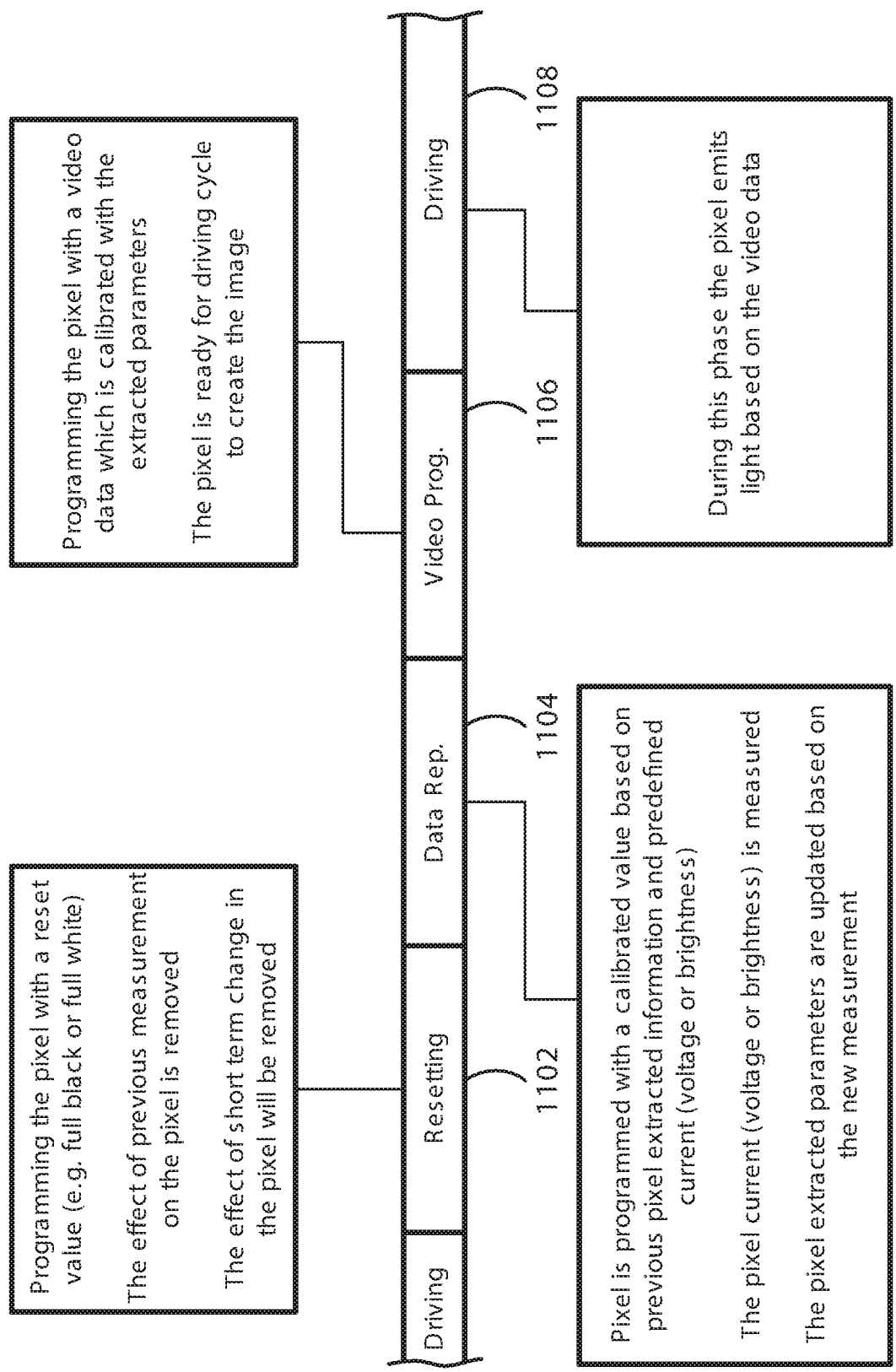
FIG. 11 is a timing diagram for aging compensation by applying a resetting cycle before programming during which the pixel is programmed with a reset value.

In FIG. 11 a timing diagram 1100 for pixel compensation that involves resetting the pixel circuit before programming. Depending on the process parameters, the pixel circuits after being driven can suffer from adverse artifacts such as charge trapping or fast light transitions. For example, amorphous or poly-silicon processes can lead to charge trapping in which the pixel circuit retains residual amounts of charge in the storage capacitor following the driving cycle. Metal oxide processes can cause the pixel circuits to be more susceptible to light transitions, during which the pixel changes rapidly, such as during fast video sequences. Before the pixel current is measured (to compensate for aging, process non-uniformities, or other effects), these artifacts can affect the calibration of the pixel circuits. To compensate for these artifacts, the timing sequence 1100 has a resetting cycle 1102. During the resetting cycle 1102, the pixel circuit to be measured is programmed with a reset voltage value corresponding to a maximum or a minimum voltage value, which is dependent upon the process used to fabricate the display array. For example, in a display array fabricated according to an amorphous or poly-silicon process, the reset voltage value can correspond to a full black value (a value that causes the pixel circuit to display black). For example, in a display fabricated using a metal oxide process, the reset voltage value can correspond to a full white value (a value that causes the pixel circuit to display white).

During the resetting cycle 1102, the effect of the previous measurement on the pixel circuit (e.g., remnant charge trapping in the pixel circuit) is removed as well as any effects due to short term changes in the pixel circuit (e.g., fast light transitions). Following the resetting cycle 1102, during a calibration cycle 1104, the pixel circuit is programmed with a calibration voltage based on previously extracted data or parameters for the pixel circuit. The calibration voltage can also be based on a predefined current, voltage, or brightness. During the calibration cycle 1104, the pixel current of the pixel circuit is then measured, and the extracted data or parameters for the pixel circuit is updated based on the measured current.

During a programming cycle 1106 following the calibration cycle 1104, the pixel circuit is programmed with a video data that is calibrated with the updated extracted data or parameters. Then, the pixel circuit is driven, during a driving cycle 1108 that follows the programming cycle 1106, to emit light based on the programmed video data.

Figure 12A:
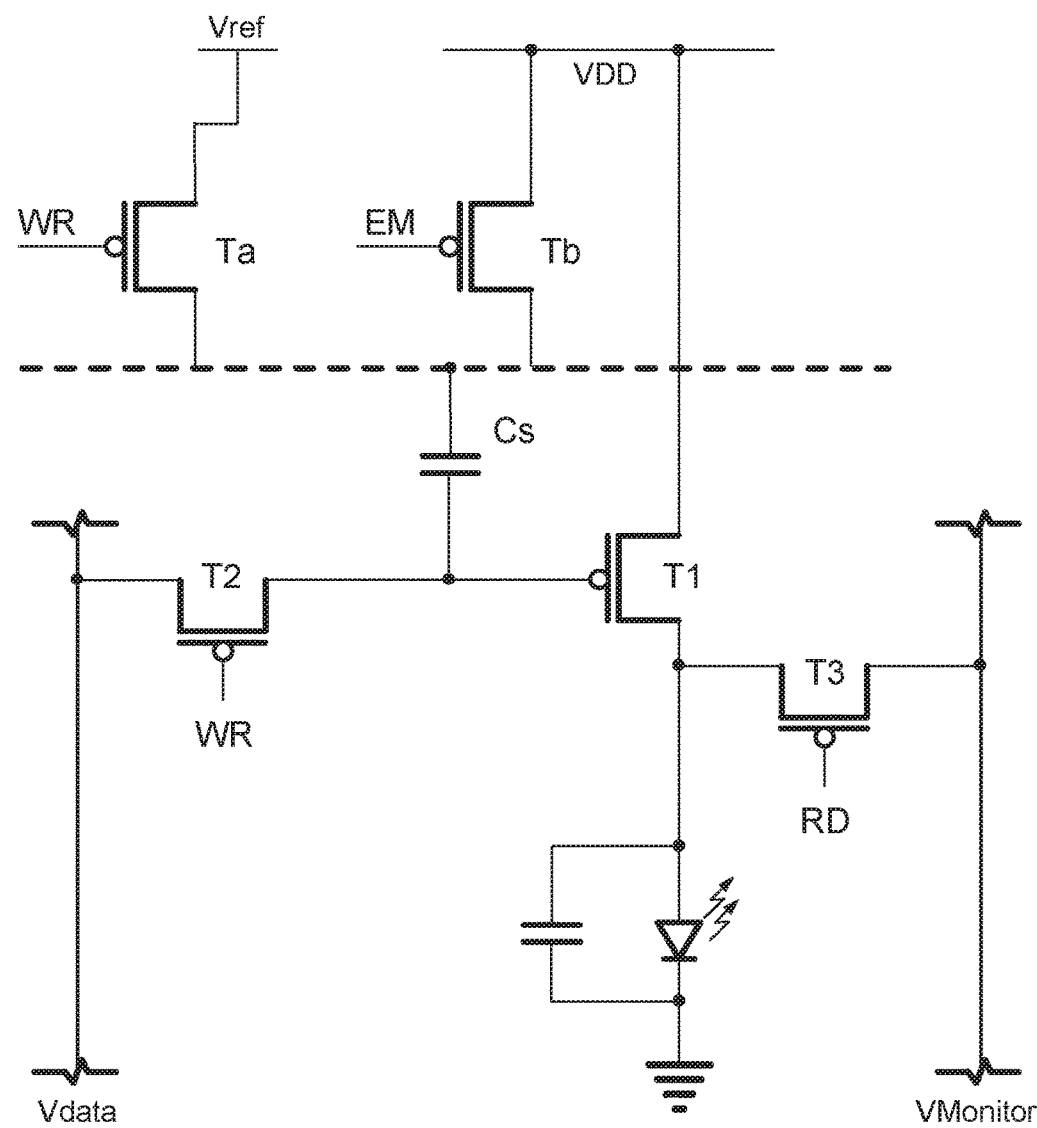
FIG. 12A is a circuit diagram of a pixel circuit with IR drop compensation.

FIG. 12A illustrates a pixel circuit with IR drop compensation. V monitor and $V_{data}$ can be the same line (or connected together) because $V_{monitor}$ has no role during programming and $V_{data}$ has no role during measurement cycle. Transistors Ta and Tb can be shared between rows and columns. Signal line EM (emission) can be shared between columns.

Figure 12B:
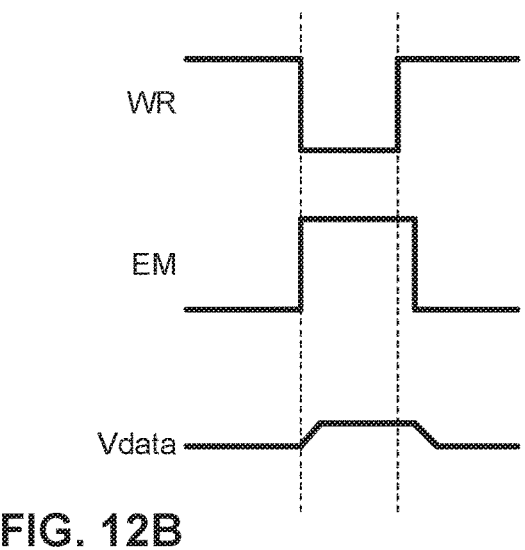
FIG. 12B is a timing diagram for normal operation of the pixel circuit of FIG. 12A.

FIG. 12B is a timing diagram illustrating normal operation of the pixel circuit shown in FIG. 12A. The signal WR is active and the programming data ($V_P$) is written into the capacitor $C_S$. At the same time, the signal line EM is off and so the other side of the capacitor $C_S$ is connected to a reference voltage, Vref. Thus the voltage stored in the capacitor $C_S$ is ($V_{ref}$-$V_P$). During the driving (emission) cycle, the signal line EM is active and WR is off. Thus, the gate-source voltage of becomes $V_{ref}$-$V_P$ and independent of $V_{DD}$.

Figure 12C:
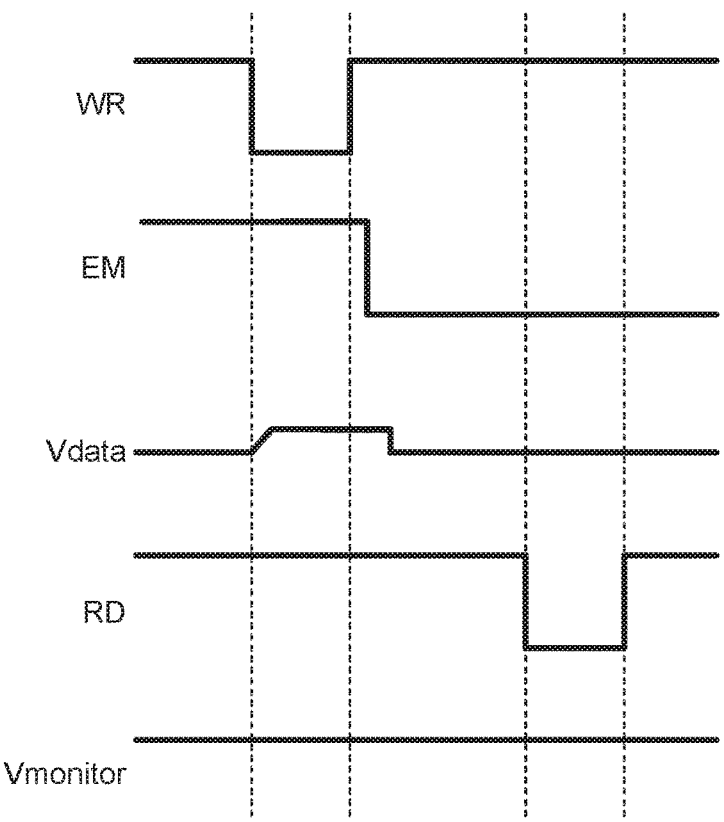
FIG. 12C is a timing diagram for a direct TFT readout from the pixel circuit of FIG. 12A.

FIG. 12C is a timing diagram for a direct TFT readout of the circuit of FIG. 12A. The pixel circuit is programmed with a calibrated voltage for a known target current. During the second cycle, RD is active and the pixel current is read through $V_{monitor}$ The $V_{monitor}$ voltage during the second cycle should be low enough that the OLED does not turn ON. The calibrated voltage is modified until the pixel current becomes the same as the target current. The modified calibrated voltage is used as a point in TFT current-voltage characteristics to extract its parameter. One can also apply a current to the pixel through $V_{monitor}$ while WR is active and the $V_{data}$ is set to a fixed voltage. At this point, the created voltage on $V_{monitor}$ is the TFT gate voltage for the corresponding current.

Figure 12D:
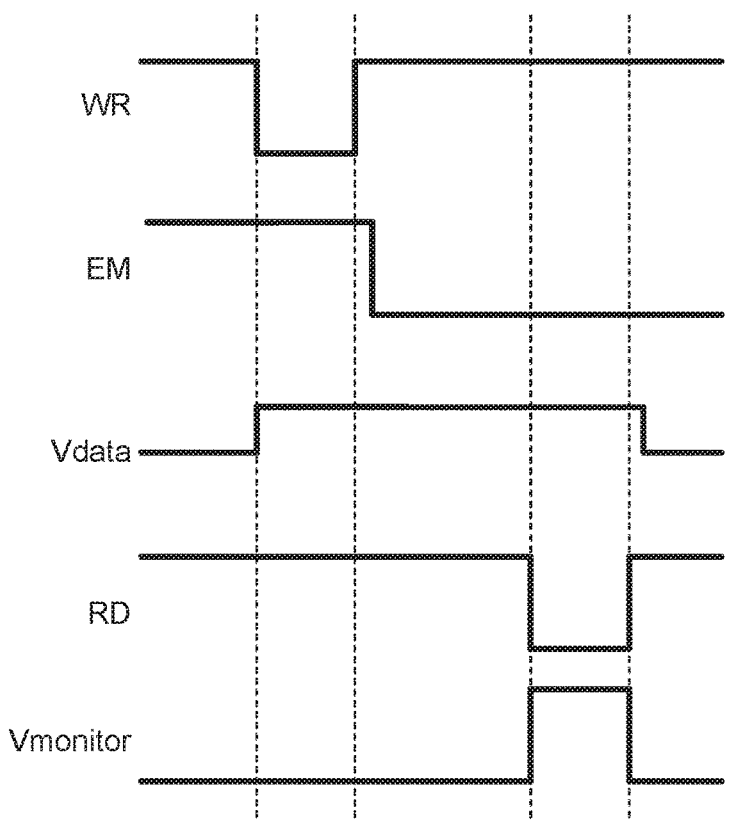
FIG. 12D is a timing diagram for a direct OLED readout from the pixel circuit of FIG. 12A.

FIG. 12D is a timing diagram for a direct OLED readout in the circuit of FIG. 12A. The pixel circuit is programmed with an off voltage so that TFT does not provide any current. During the second cycle, RD is active and the OLED current is read through $V_{monitor}$. The $V_{monitor}$ voltage during the second cycle is pre-calibrated based for a known target current. The $V_{monitor}$ voltage is modified until the OLED current becomes the same as the target current. The modified $V_{monitor}$ voltage is used as a point in the OLED current-voltage characteristic to extracts its parameter. One can extend the signal line EM off all the way to the end of the readout cycle while keeping the write line WR active. In this case, the remaining pixel operations for reading the OLED will be the same as the previous steps. One can also apply a current to the OLED through $V_{monitor}$ At this point the created voltage on $V_{monitor}$ is the TFT gate voltage for the corresponding current.

Figure 13A:
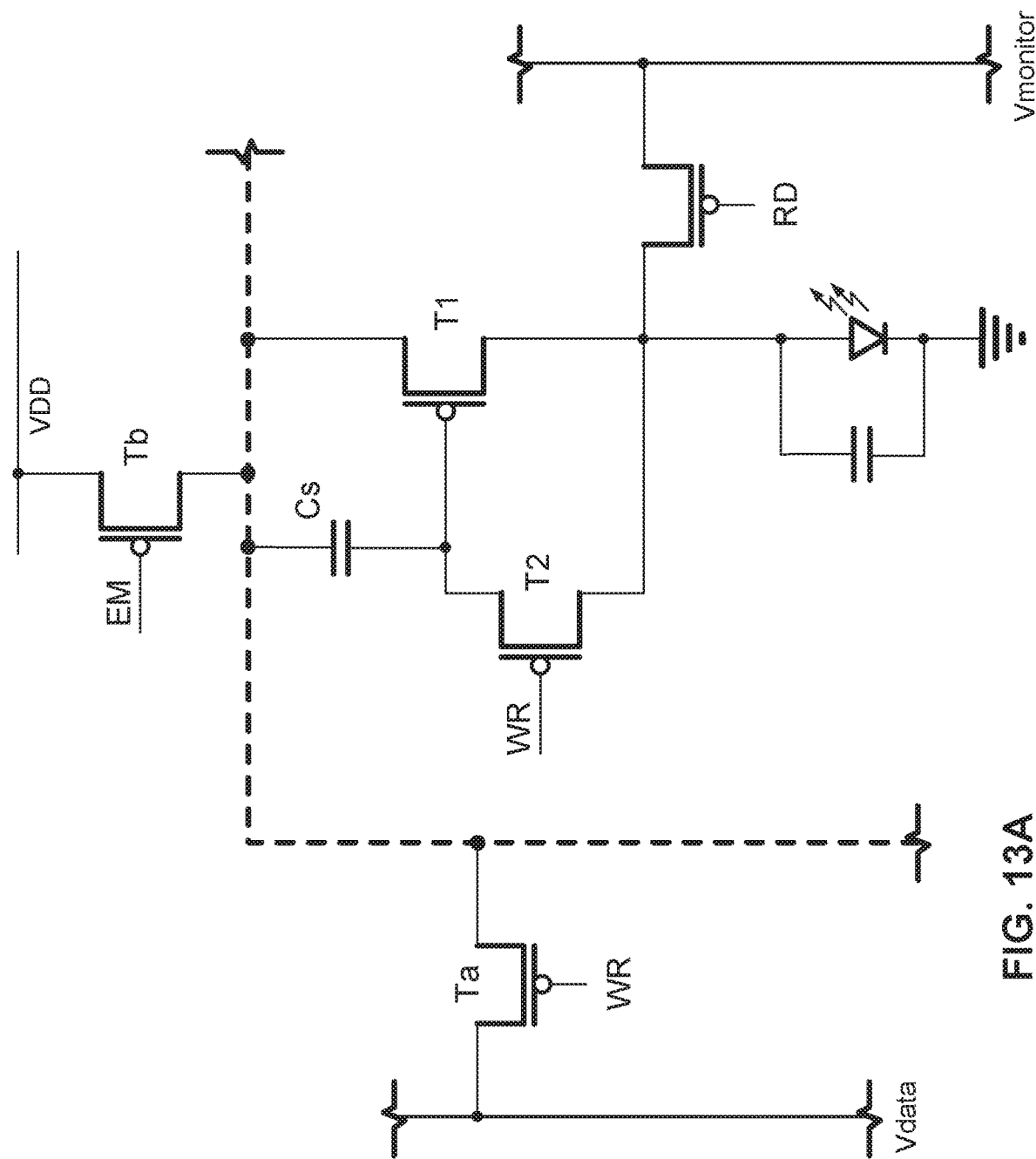
FIG. 13A is a circuit diagram of a pixel circuit with charge-based compensation.

FIG. 13A illustrates a pixel circuit with charge-based compensation. The $V_{monitor}$ readout line can be shared between adjacent columns, and the transistors Ta and Tb can be shared between rows. The $V_{monitor}$ line can be or connected to the same line as the $V_{data}$ line as well. In this case, the $V_{data}$ line can be a fixed voltage ($V_{ref}$).

Figure 13B:
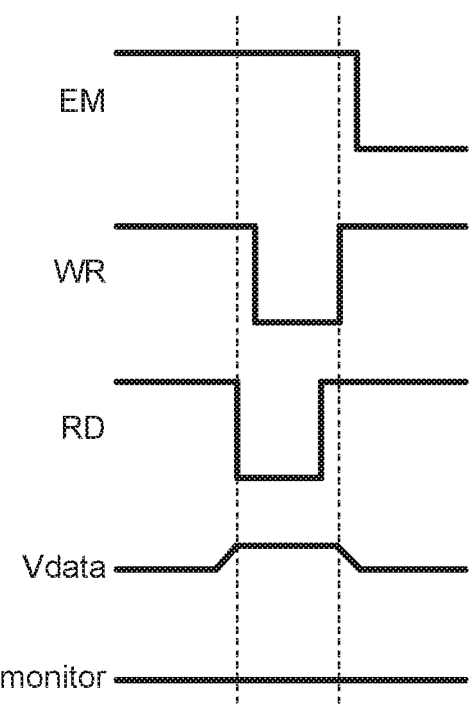
FIG. 13B is a timing diagram for normal operation of the pixel circuit of FIG. 13A.

FIG. 13B is a timing diagram illustrating a normal operation of the pixel circuit shown in FIG. 13A. While the WR (write) and RD (readout) lines are active, the programming voltage $V_P$ and the reference voltage $V_{ref}$ are applied to the pixel circuit through the $V_{data}$ lines and the $V_{monitor}$ line. The reference voltage $V_{ref}$ should be low enough so that OLED does not turn on. The readout line RD can turn off sooner than the write line WR. During this time gap, the transistor T1 will start to charge the $V_{OLED}$ and so compensate for part of the TFT variation because the charge generated will be a function of a TFT parameter. The pixel is also independent of IR drop because the source of the transistor T1 is disconnected from the power supply voltage $V_{dd}$ during the programming cycle.

Figure 13C:
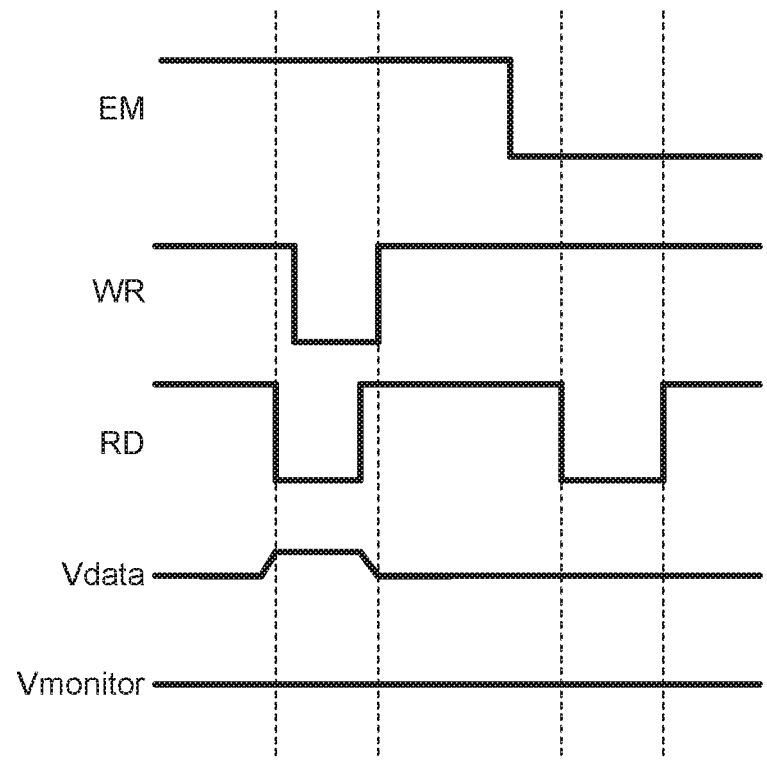
FIG. 13C is a timing diagram for a direct TFT readout from the pixel circuit of FIG. 13A.

A TFT direct readout is depicted in the timing diagram of FIG. 13C. The pixel circuit is programmed with a calibrated voltage for a known target current. During the second cycle, RD is active and the pixel current is read through the $V_{monitor}$ line. The $V_{monitor}$ voltage during the second cycle should be low enough that the OLED does not turn on. The calibrated voltage is modified until the pixel current becomes the same as the target current. The modified calibrated voltage is used as a point in the TFT current-voltage characteristics to extracts its parameter. One can also apply a current to the pixel through $V_{monitor}$ while the write line WR is active and the data line $V_{data}$ is set to a fixed voltage. At this point the created voltage on $V_{monitor}$ is the TFT gate voltage for the corresponding current.

Figure 13D:
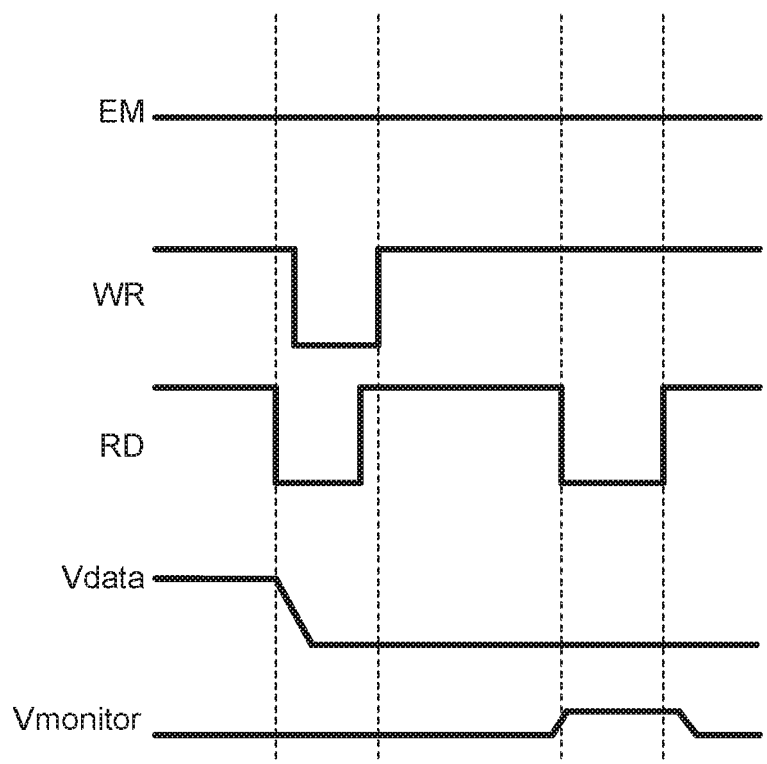
FIG. 13D is a timing diagram for a direct OLED readout from the pixel circuit of FIG. 13A.

A direct OLED readout cycle is depicted in the timing diagram of FIG. 13D. The pixel circuit is programmed with an off voltage so that TFT T1 does not provide any current. During the second cycle, the readout line RD is active and the OLED current is read through the $V_{monitor}$ line. The $V_{monitor}$ voltage during the second cycle is pre-calibrated for a known target current. The $V_{monitor}$ voltage is modified until the OLED current becomes the same as the target current. The modified $V_{monitor}$ voltage is used as a point in the OLED current-voltage characteristics to extracts its parameter. One can extend the emission line EM off all the way to the end of the readout cycle and keep the WR active. In this case, the remaining pixel operations for reading OLED will be the same as previous steps. One can also apply a current to the OLED through $V_{monitor}$. At this point the created voltage on $V_{monitor}$ is the TFT gate voltage for the corresponding current.

Figure 13E:
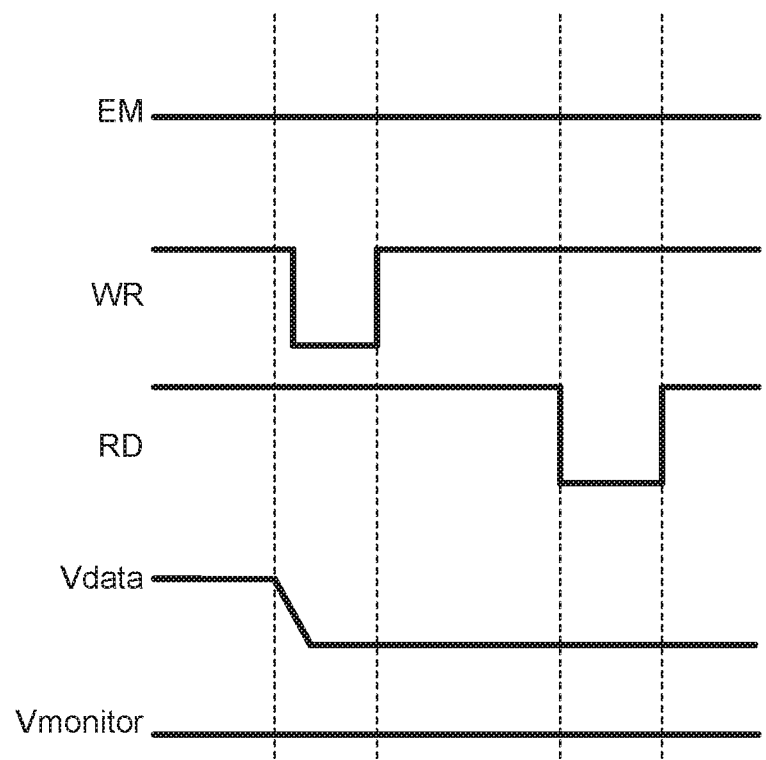
FIG. 13E is a timing diagram for an indirect OLED readout from the pixel circuit of FIG. 13A.

An indirect OLED readout is depicted in the timing diagram of FIG. 13E. Here the pixel current is read out in a manner similar to the operation depicted in FIG. 12. The only difference is that during the programming RD is off and so the gate voltage of the transistor T1 is set to the OLED voltage. Thus, the calibrated voltage needs to consider the effect of the OLED voltage and the TFT parameter to make the pixel current equal to the target current. One can use this calibrated voltage and the voltage extracted from the direct TFT readout to extract the OLED voltage. For example, subtracting the calibrated voltage extracted by this process from the calibrated voltage extracted by the TFT direct readout will result to the effect of OLED if the two target currents are the same.

Figure 14:
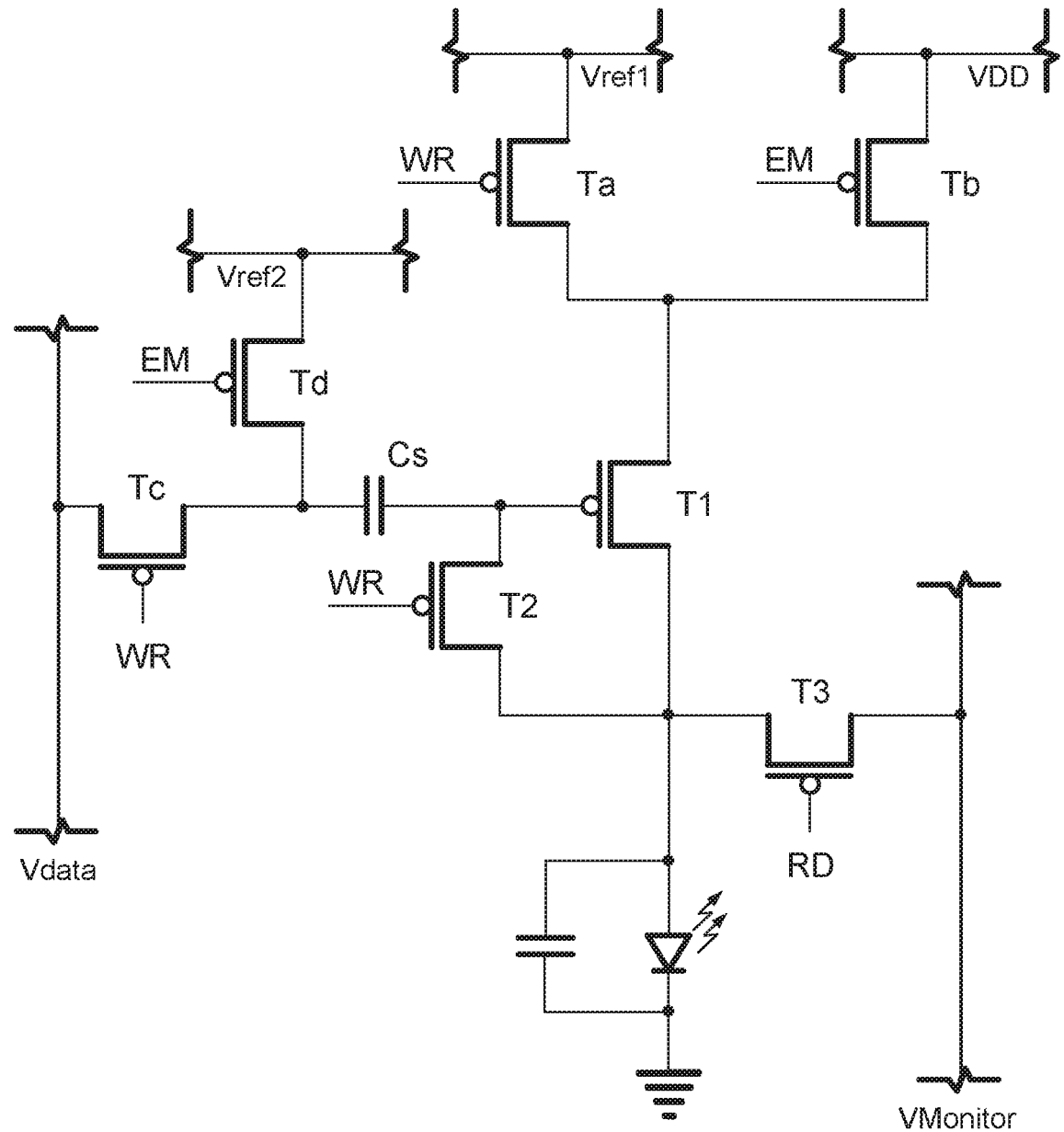
FIG. 14 is a circuit diagram of a biased pixel circuit.

FIG. 14 illustrates a biased pixel circuit in which a second reference voltage Vref2 can be the same as the power supply voltage $V_{dd}$, the transistors Ta and Tb can be shared with columns and rows, the transistors Td and Tc can be shared with rows, and the pixel monitor line V monitor can be shared with columns. In normal operation, the write line WR and the readout line RD are active and the emission line EM is disabled, the pixel voltage monitoring line V monitor is connected to a reference current Iref and the data line $V_{data}$ is connected to a programming voltage from the source driver. The gate of T1 is charged to a bias voltage related to the reference current and so that the voltage stored in the capacitor $C_S$ is a function of $V_P$ and a bias voltage.

One can use the systems described herein to analyze panels during different stage of fabrication to detect defects. The major detection steps can be carried out after backplane fabrication, after OLED fabrication, and/or after full assembly. At each stage the information provided by the systems described above can be used to identify the defects which can then be repaired with different methods, such as laser repair.

Figure 15B:
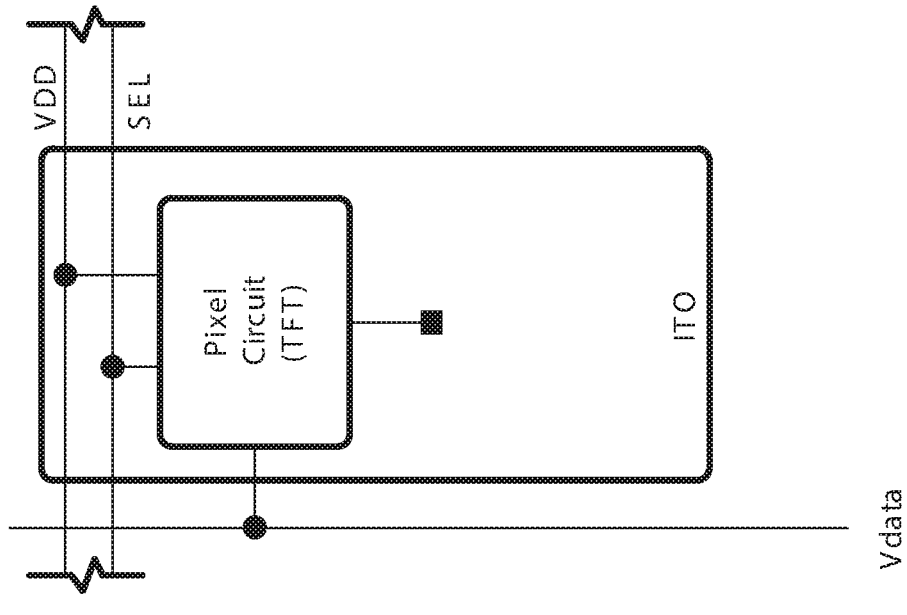
FIG. 15B is a circuit diagram of a pixel circuit with an ITO electrode patterned as a signal line.
Figure 15A:
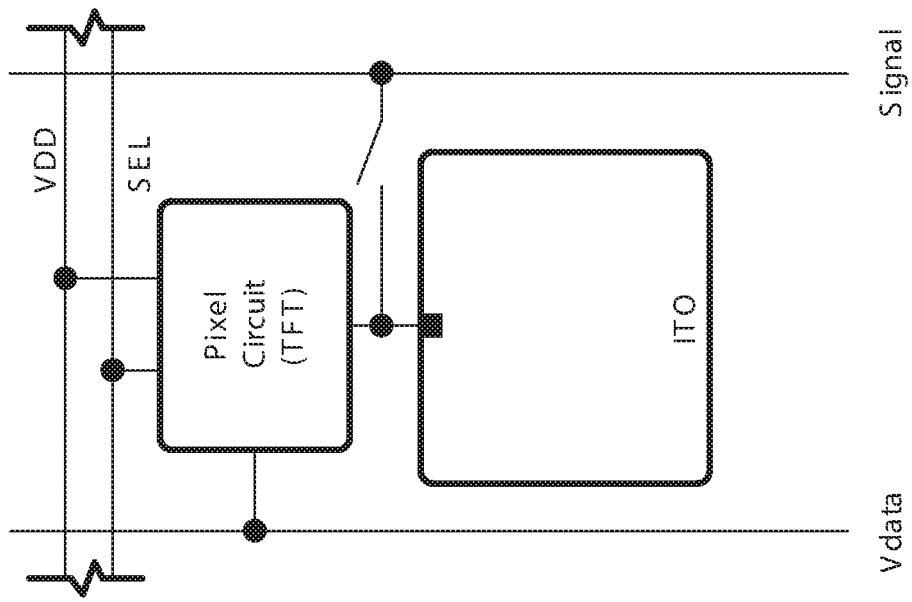
FIG. 15A is a circuit diagram of a pixel circuit with a signal line connected to an OLED and pixel circuit.

FIG. 15A illustrates a pixel circuit with a Signal line connected to the OLED and the TFT, and FIG. 15B illustrates a pixel circuit and an ITO electrode patterned as a signal line. To be able to measure the panel, there should be either a direct path to each pixel to measure the pixel current, as depicted in FIG. 15A, or one can use a partial electrode patterning for the measurement path. In the latter case, the electrode (e.g., ITO or any other material) is patterned to vertical lines first, as depicted in FIG. 15B, and then the electrode is patterned to pixels after the measurement is finished.

Figure 16:
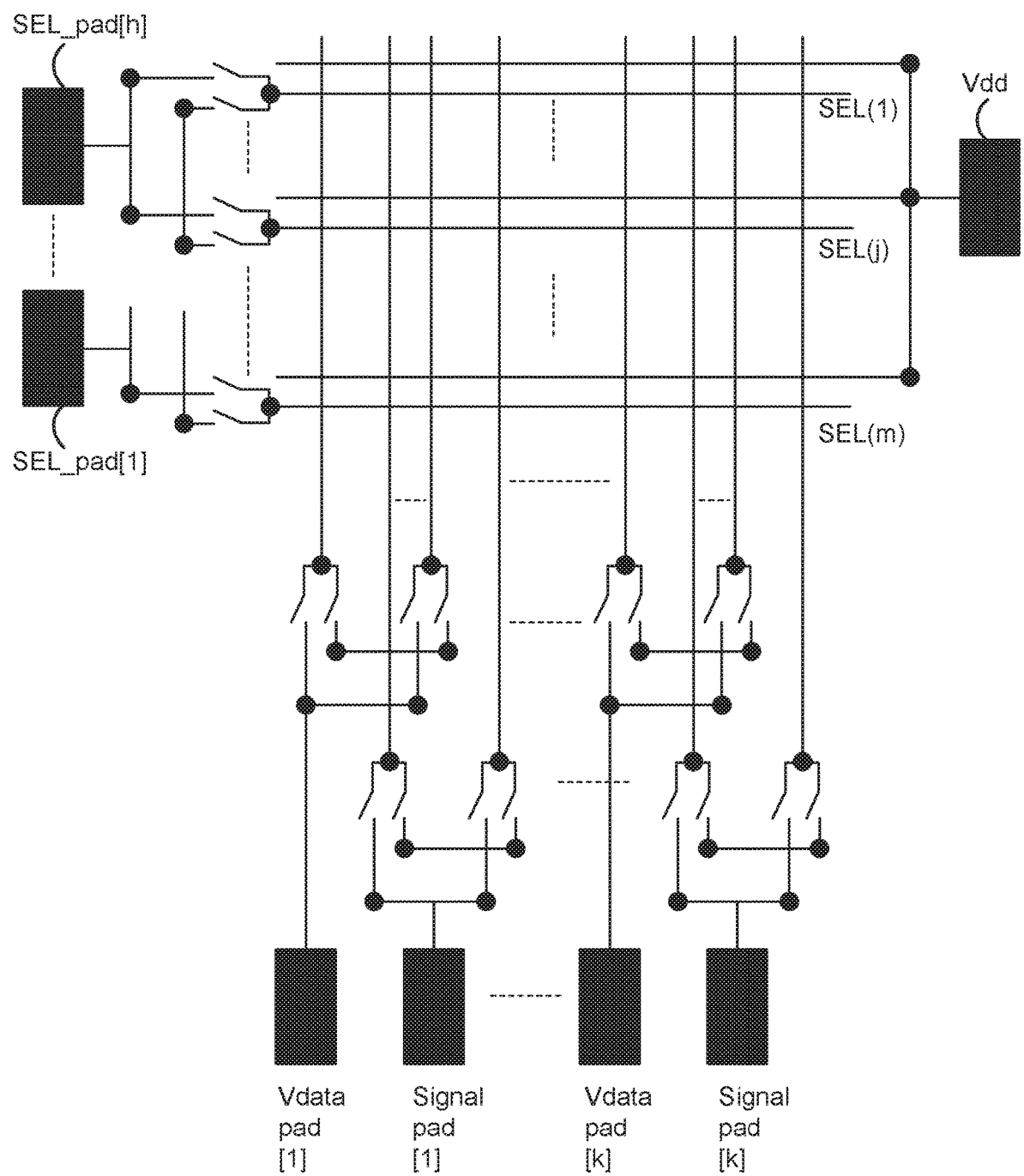
FIG. 16 is a schematic diagram of a pad arrangement for the probing of a panel.

FIG. 16 illustrates a typical arrangement for a panel and its signals during a test. Every other signal is connected to one pad through a multiplexer having a default stage that connects the signal to a default value. Every signal can be selected through the multiplexer to either program the panel or measure the current/voltage/charge from the pixel.

FIG. 17 illustrates a pixel circuit that can be used for a factory test to identify defects in the pixels after backplane fabrication. The following tests are defined based on the pixel circuit illustrated in FIG. 17, but similar tests can be conducted with different pixel circuits.

In a first test:
WR is high (Data=high and Data=low and Vdd=high).

|  | $I_{data\_high} < I_{th\_high}$ | $I_{data\_high} > I_{th\_high}$ |
|---|---|---|
| $I_{data\_low} > I_{th\_low}$ | NA | T1: short <br> \|\| B: stock at high <br> (if data current is high, <br> B is stuck at high) |
| $I_{data\_low} < I_{th\_low}$ | T1: open <br> \|\| T3: open | T1: OK <br> && T2: ? <br> && T3: OK |

Here, $I_{th\_low}$ is the lowest acceptable current allowed for the Data=low, and $I_{th\_high}$ is the highest acceptable current for Data=high.

In a second test:
Static: WR is high (Data=high and Data=low);
Dynamic: WR goes high and after programming it goes to low (Data=low to high and Data=high to low).

|  | $I_{static\_high} < I_{th\_high\_st}$ | $I_{static\_high} > I_{th\_high\_st}$ |
|---|---|---|
| $I_{dyn\_high} > I_{th\_high\_dyn}$ | ? | T2: OK |
| $I_{dyn\_high} < I_{th\_high\_dyn}$ | T2: open | T2: short |

$T_{th\_high\_dyn}$ is the highest acceptable current for data high with dynamic programming.

$I_{th\_high\_low}$ is the highest acceptable current for data high with static programming.

One can also use the following pattern:
Static: WR is high (Data=low and Data=high);
Dynamic: WR goes high and after programming it goes to low (Data=high to low).

FIG. 18 is an example pixel circuit that can be used for testing the full display. In a test of the full display:
T1 and OLED current are measured through the Vmonitor line;
Condition 1: T1 is OK from the backplane test.

|  | $I_{oled} > I_{oled\_high}$ | $I_{oled} < I_{oled\_low}$ | $I_{oled}$ is OK |
|---|---|---|---|
| $I_{tft} > I_{tft\_high}$ | x | x | x |
| $I_{tft} < I_{tft\_low}$ | OLED: short | OLED: open \|\| T3: open | OLED: open |
| $I_{tft}$ is OK | x | OLED: open | OLED: ok |

$I_{tft\_high}$ is the highest possible current for TFT current for a specific data value.

$I_{tft\_high}$ is the lowest possible current for TFT current for a specific data value.

Ioled_high is the highest possible current for OLED current for a specific OLED voltage.

Ioled_low is the lowest possible current for OLED current for a specific OLED voltage.

In another test:
Measuring T1 and OLED current through monitor;
Condition 2: T1 is open from the backplane test.

|  | $I_{oled} > I_{oled\_high}$ | $I_{oled} < I_{oled\_low}$ | $I_{oled}$ is OK |
|---|---|---|---|
| $I_{tft} > I_{tft\_high}$ | X | X | X |
| $I_{tft} < I_{tft\_low}$ | OLED: short | OLED: open \|\| T3: open | OLED: open |
| $I_{tft}$ is OK | x | x | x |

In a further test:
Measuring T1 and OLED current through monitor;
Condition 3: T1 is short from the backplane test.

|  | $I_{oled} > I_{oled\_high}$ | $I_{oled} < I_{oled\_low}$ | $I_{oled}$ is OK |
|---|---|---|---|
| $I_{tft} > I_{tft\_high}$ | X | X | X |
| $I_{tft} < I_{tft\_low}$ | OLED: short | OLED: open \|\| T3: open | OLED: open |
| $I_{tft}$ is OK | x | x | x |

Detected defects can be corrected by making compensating adjustments in the display. For defects that are darker than the sounding pixels, one can use surrounding pixels to provide the extra brightness required for the video/images. There are different methods to provide this extra brightness, such as:

(1) Using all immediate surrounding pixels, divide the extra brightness between each of them. The challenge with this method is that in most of the cases, the portion assigned to each pixel will not be generated by that pixel accurately. Since the error generated by each surrounding pixel will be added to the total error, the error will be very large, reducing the effectiveness of the correction.

(2) Using one or two of the surrounding pixels to generate the extra brightness required by defective pixel, one can switch the position of the active pixels in compensation to minimize the localized artifact.

During the lifetime of the display, some soft defect can create stuck-on (always bright) pixels, which tends to be very annoying for the user. The real-time measurement of the panel can identify the newly generated stuck-on pixel, and then extra voltage can be applied through the monitor line to kill the OLED, turning it to a dark pixel. Also, the compensation method described above can be used to reduce the visual effect of the dark pixels.

The above described methods of extracting baseline measurements of the pixels in the array may be performed by a processing device such as the 112 in FIG. 1 or another such device which may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the controllers described herein. Accordingly, principles and advantages of distributed processing, such as redundancy, replication, and the like, also can be implemented, as desired, to increase the robustness and performance of controllers described herein.

The operation of the example baseline data determination methods may be performed by machine readable instructions. In these examples, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the baseline data determination methods could be implemented by software, hardware, and/or firmware. Also, some or all of the machine readable instructions represented may be implemented manually.

Figure 19:
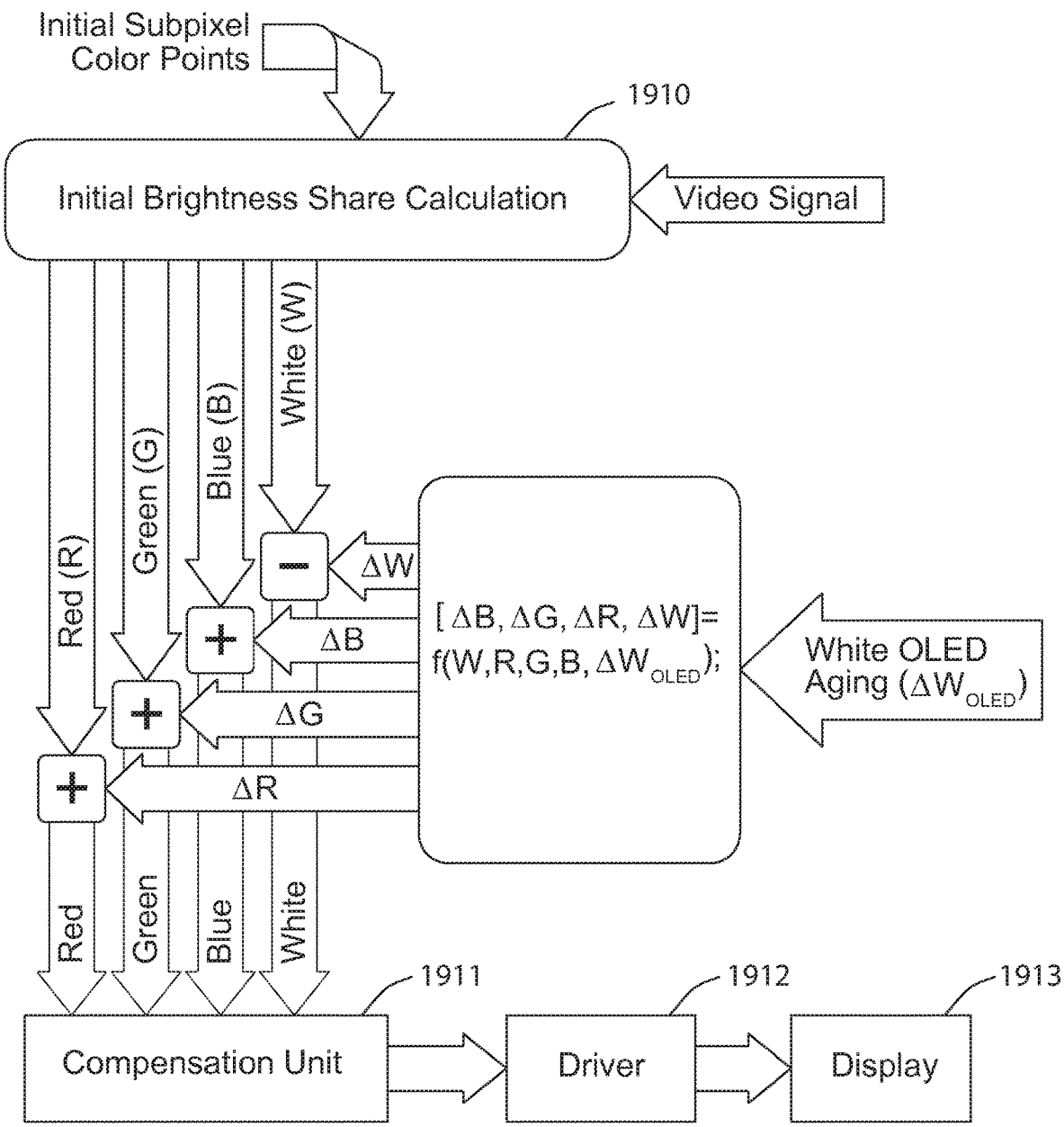
FIG. 19 is a functional block diagram of system for compensating for color shifts in the pixels of a color display using OLEDs.

FIG. 19 illustrates a system in which the brightness of each subpixel is adjusted, based on the aging of at latest one of the subpixels in each pixel, to maintain a substantially constant display white point over time, such as the operating life of a display, e.g., 75,000 hours. For example, in an RGBW display, if the white OLED in a pixel loses part of its blue color component, thus producing a warmer white than desired, the blue OLED in that same pixel may be turned on along with the white OLED in that same pixel, during a white display. Similarly, in an RGB display, the brightness shares of the red, green and blue OLEDs may be dynamically adjusted over time in response to each OLED's degradation behavior, to keep the white point of the display substantially constant. In either case, the amount of change required in the brightness of each subpixel can be extracted from the shift in the color coordinates of one or more of the subpixels. This can be implemented by a series of calculations or by use of a look-up table containing pre-calculated values, to determine the correlation between shifts in the voltage or current supplied to a subpixel and/or the brightness of the light-emitting material in that subpixel.

Fixed initial color points of the subpixels may be used to calculate the brightness shares of the subpixels in each subpixel. Then during operation of the display, a correction unit determines a correction factor for each subpixel, e.g., by use of a lookup table. In FIG. 19, the initial subpixel color points and the video input signal for the display are supplied to an initial brightness share calculation unit 1910, which determines the brightness shares for the red, green blue and white subpixels. These brightness shares are then adjusted by respective values $\Delta R$, $\Delta G$, $\Delta B$ and $\Delta W$ derived from a signal $\Delta W_{OLED}$ that represents the aging of the white subpixel. The adjusted brightness shares are sent to a compensation unit 1911, which adjusts the video signal according to the adjusted brightness shares and sends the adjusted video signals to a driver 1912 coupled to an OLED display 1913. The driver 1912 generates the signals that energize the various subpixels in the display 1913 to produce the desired luminance from each subpixel.

Figure 20:
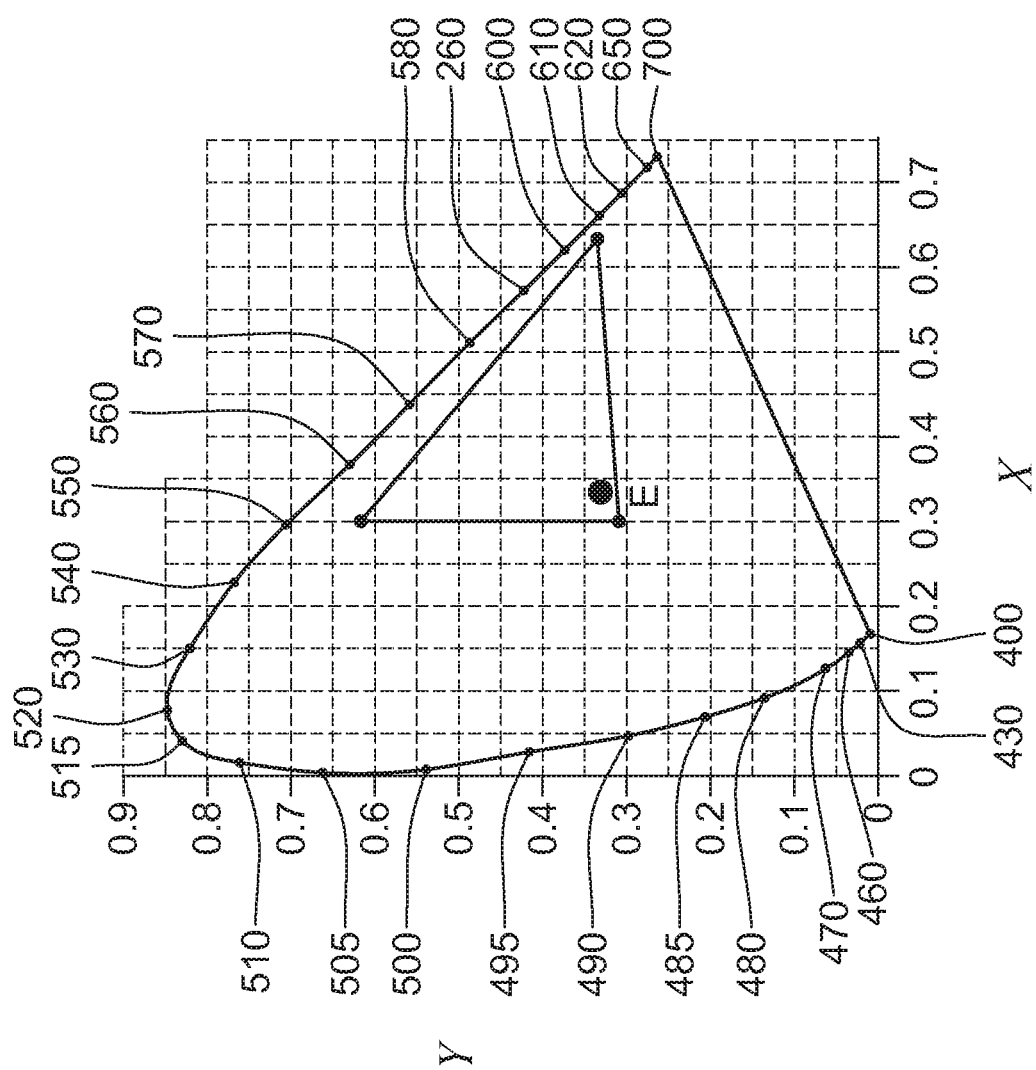
FIG. 20 is a CIE chromaticity diagram.

Different standards exist for characterizing colors. One example is the 1931 CIE standard, which characterizes colors by a luminance (brightness) parameter and two color coordinates x and y. The coordinates x and y specify a point on a CIE chromatacity diagram, as illustrated in FIG. 20, which represents the mapping of human color perception in terms of the two CIE parameters x and y. The colors that can be matched by combining a given set of three primary colors, such as red, green and blue, are represented in FIG. 20 by the triangle T that joins the coordinates for the three colors, within the CIE chromaticity diagram of FIG. 20.

Figure 21:
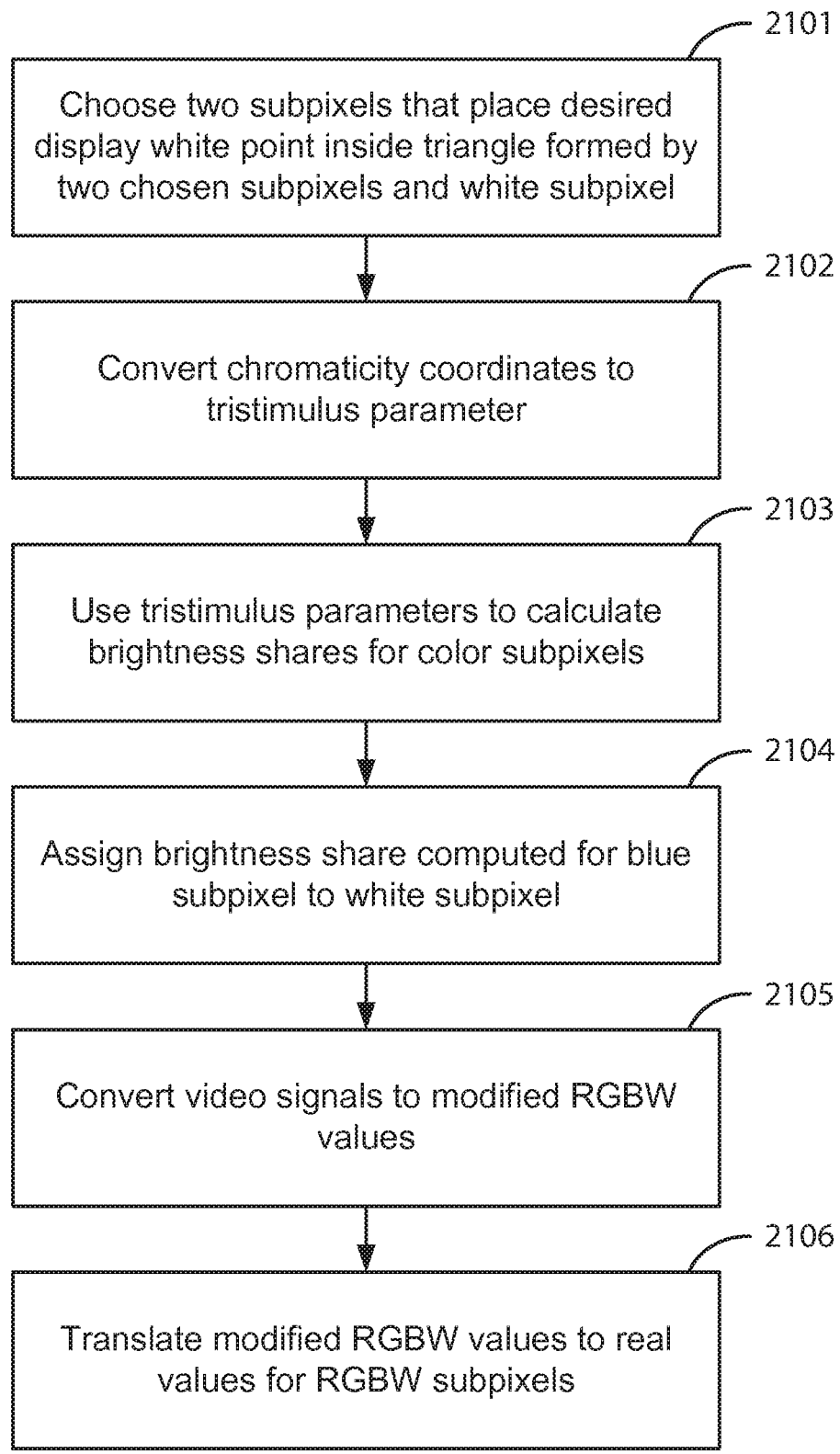
FIG. 21 is a flow chart of a procedure for compensating for color shifts in the system of FIG. 19.

FIG. 21 is a flow chart of a procedure for determining the brightness shares for the subpixels in an RGBW display from initial subpixel color points and the video input signal for the image to be displayed, which are the two inputs to the initial brightness share calculation unit 1910 in FIG. 19. The procedure of FIG. 21 begins at step 2101 by choosing two subpixels from the red, green and blue subpixels, such that the desired display white point is inside a triangle that can be formed with the color points of the two selected subpixels and the white subpixel. For example, the triangle T in FIG. 20 is defined by the red, green and white subpixel values from the following set of chromaticity coordinates of four RGBW subpixels and a display white point:

Blue subpixel=[0.154, 0.149]
Red subpixel=[0.67, 0.34]
Green subpixel=[0.29, 0.605]
White subpixel=[0.29, 0.31]
Display white point=[0.3138, 0.331]

After choosing two subpixels at step 2101, it is assumed that the white subpixel is the third primary color, and then at step 2102 the chromaticity coordinates of the red, green and blue subpixels (considering the blue and white subpixels to be the same at this stage) are converted to tristimulus parameters to facilitate calculation of the brightness shares of the red, green and blue subpixels to achieve the desired display white point. Any color on a CIE chromaticity diagram can be considered to be a mixture of three CIE primaries, which can be specified by three numbers X, Y and Z called tristimulus values. The tristimulus values X, Y and Z uniquely represent a perceivable hue, and different combinations of light wavelengths that give the same set of tristimulus values are indistinguishable to the human eye. Converting the chromaticity coordinates to tristimulus values permits the use of linear algebra to calculate a set of brightness shares for the red, green and blue subpixels to achieve the desired display white point.

Step 2103 uses the tristimulus values to calculate the brightness shares for the red, green and blue subpixels to achieve the desired display white point. For the exemplary set of chromaticity coordinates and desired display white point set forth above, the brightness shares of the red, green and blue subpixels are $B_{RW}$=6.43%, $B_{GW}$=11.85% and $B_{WW}$=81.72%, respectively. The same calculation can be used to calculate the brightness shares $B_R$, $B_G$ and $B_B$ for the red, green and blue subpixels in an RGB display.

Step 2104 assigns to the white subpixel the brightness share calculated for the blue subpixel, and these brightness shares will produce the desired display white point in an RGBW system. Video signals, however, are typically based on an RGB system, so step 2105 converts the video signals $R_{rgb}$, $G_{rgb}$ and $B_{rgb}$ to modified RGBW values $W_m$, $R_m$, $G_m$ and $B_m$ by setting $W_m$ equal to the minimum of $R_{rgb}$, $G_{rgb}$ and $B_{rgb}$ and subtracting the white portion of the red, green and blue pixels from the values of the signals $R_{rgb}$, $G_{rgb}$ and $B_{rgb}$, as follows:

$W_m$=minimum of $R_{rgb}$, $G_{rgb}$ and $B_{rgb}$
$R_m$=$R_{rgb}$−W
$G_m$=$G_{rgb}$−W
$B_m$=$B_{rgb}$−W Step 2106 then uses the calculated brightness shares for $B_{RW}$, $B_{GW}$ and $B_{WW}$ to translate the modified values $W_m$, $R_m$, $G_m$, and $B_m$ to actual values W, R, G and B for the four RGBW subpixels, as follows:

W=$W_m$*$B_{WW}$
R=$R_m$+$W_m$*$B_{RW}$/$B_R$
G=$G_m$+$W_m$*$B_{GW}$/$B_G$
B=$B_m$+$W_m$*$B_{BW}$/$B_B$

Step 2103 uses the tristimulus values to calculate the brightness shares for the red, green and blue subpixels to achieve the desired display white point. For the exemplary set of chromaticity coordinates and desired display white point set forth above, the brightness shares of the red, green and blue subpixels are $B_{RW}$=6.43%, $B_{GW}$=11.85% and $B_{WW}$=81.72%, respectively. The same calculation can be used to calculate the brightness shares $B_R$, $B_G$ and $B_B$ for the red, green and blue subpixels in an RGB display.

Figure 22A:
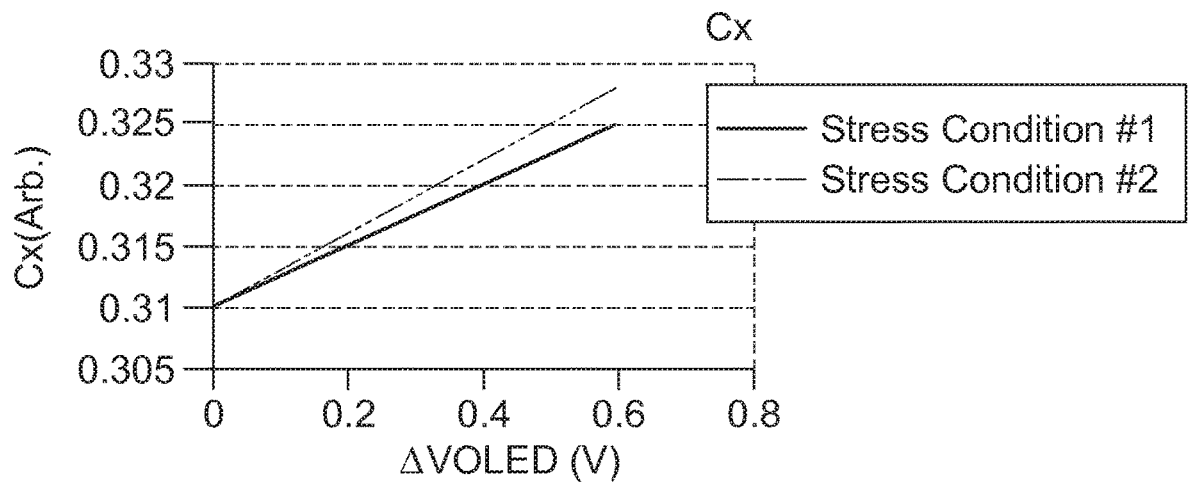
FIG. 22A is a pair of graph representing variations in the chromaticity coordinate Cx of the measured brightness values of two white OLEDs subjected to two different stress conditions, as a function of the difference between the measured OLED voltages and a non-aged reference OLED.
Figure 22B:
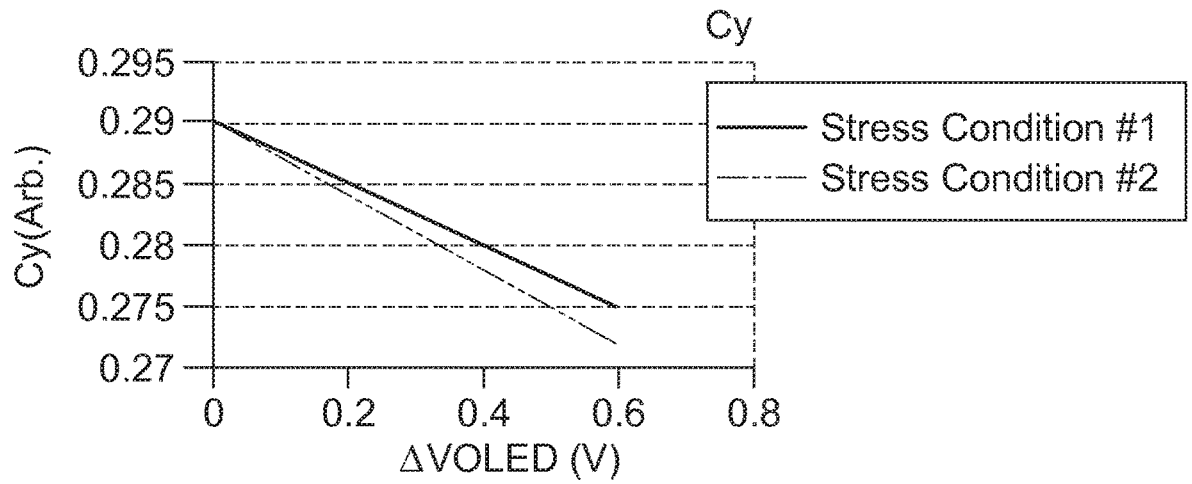
FIG. 22B is a pair of graph representing variations in the chromaticity coordinate Cy of the measured brightness values of two white OLEDs subjected to two different stress conditions, as a function of the difference between the measured OLED voltages and a non-aged reference OLED.

FIGS. 22A and 22B are graphs plotted from actual measurements of the brightness of two white OLEDs while being aged by passing constant currents through the OLEDs. The currents supplied to the two OLEDs were different, to simulate two different stress conditions #1 and #2, as indicated in FIGS. 22A and 22B, As the OLED material ages, the resistance of the OLED increases, and thus the voltage required to maintain a constant current through the OLED increases. For the curves of FIGS. 22A and 22B, the voltage applied to each aging OLED to maintain a constant current was measured at successive intervals and compared with the voltage measured across a non-aged reference OLED supplied with the same magnitude of current and subjected to the same ambient conditions as the aging OLED.

The numbers on the horizontal axes of FIGS. 22A and 22B represent $\Delta$VOLED, which is the difference between the voltages measured for the aging OLED and the corresponding reference LED. The numbers on the vertical axes of FIGS. 22A and 22B represent the respective chromaticity coordinates Cx and Cy of the measured brightness values of the aging white OLEDs.

In order to compensate for the brightness degradation of a white subpixel as the white subpixel ages, the brightness shares of the red, green and blue subpixels can be to be adjusted to $B_{RW}$=7.62%, $B_{GW}$=8.92% and $B_{WW}$=83.46%, respectively, at $\Delta$VOLED=0.2; to $B_{RW}$=8.82%, $B_{GW}$=5.95% and $B_{WW}$=85.23%, respectively, at $\Delta$VOLED=0.4; and to $B_{RW}$=10.03%, $B_{GW}$=2.96% and $B_{WW}$=87.01%, respectively, at ΔVOLED=0.6. These adjustments in the brightness shares of the subpixels are used in the compensation unit 1911 to provide compensated video signals to the driver 1912 that drives successive sets of subpixels in the display 1913.

Figure 24:
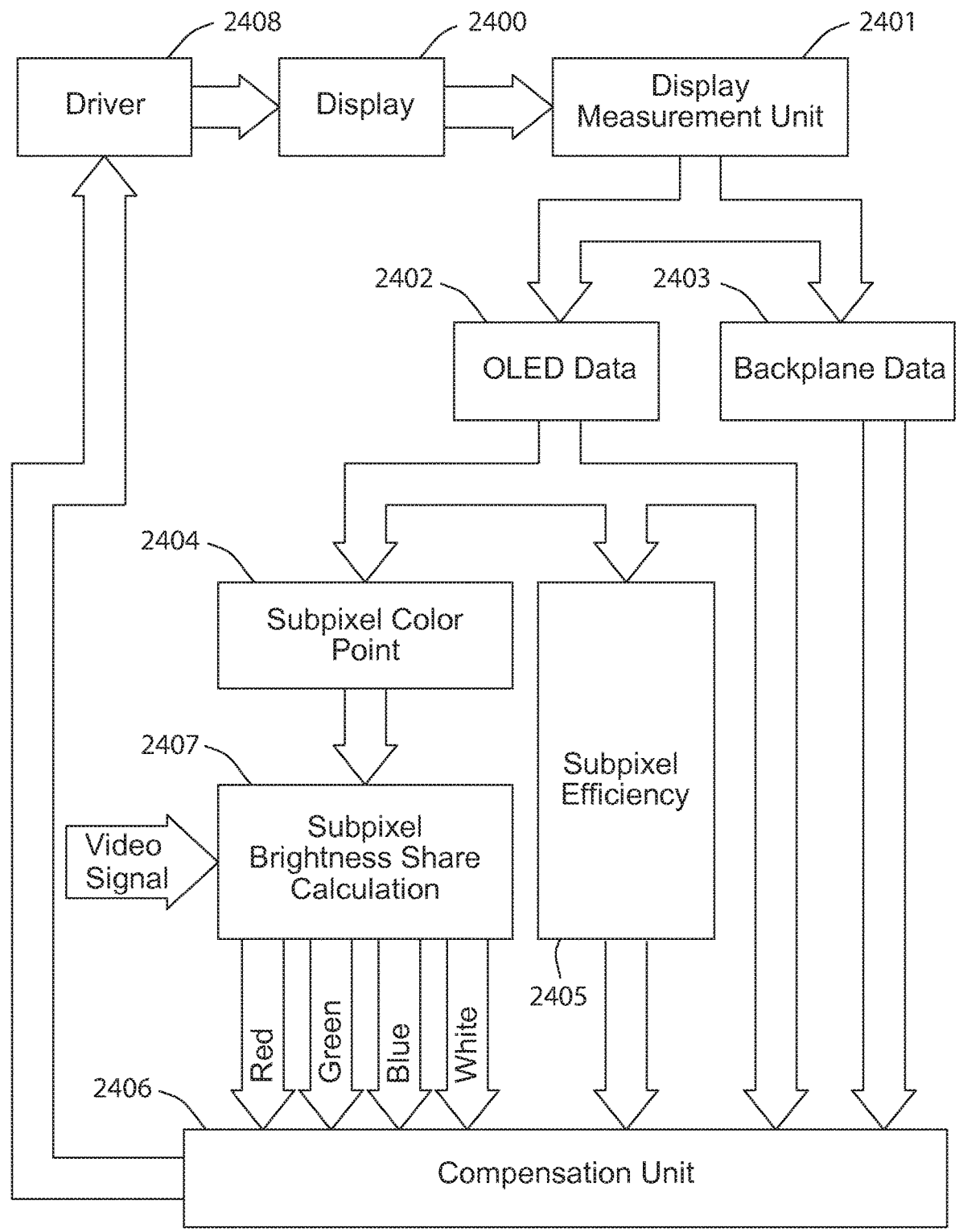
FIG. 24 is a functional block diagram of a modified system for compensating for color shifts in the pixels of a color display using OLEDs.

FIG. 24 illustrates a compensation system using OLED data extracted from a display 2400 (in the form of either OLED voltage, OLED current, or OLED luminance) and corrects for color shifts. This system can be used for dynamic brightness share calculations in which the chromaticity coordinates of the subpixels do not remain fixed, but rather are adjusted from time to time to compensate for changes in the color point of each subpixel over time. These calculations can be done in advance and put into a lookup table.

FIG. 24 illustrates a system in which OLED data, such as OLED voltage, OLED current or OLED luminance, is extracted from an OLED display 2400 and used to compensate for color shifts as the OLEDs age, to maintain a substantially constant display white point over time. A display measurement unit 2401 measures both OLED data 2402 and backplane data 2403, and the backplane data 2403 is sent to a compensation unit 2406 for use in compensating for aging of backplane components such as drive transistors. The OLED data 2402 is sent to a subpixel color point unit 2404, a subpixel efficiency unit 2405 and a compensation unit 2406. The subpixel color point unit determines new color points for the individual subpixels based on the OLED data (e.g., by using a lookup table), and the new color points are sent to a subpixel brightness share calculation unit 2407, which also receives the video input signal for the display. The brightness shares may be calculated in the same manner, described above, and are then used in the compensation unit 2406 to make compensating adjustments in the signals supplied to the four subpixels in each pixel. Lookup tables can be used for a simpler implementation, and lookup tables for the color points and the color shares can even be merged into a single lookup table.

To compensate for the optical aging of the individual subpixels, the gray scales may be adjusted using the following value $\Delta N_{CL\_W}$ as the compensating adjustment for the white pixels:

$$\Delta V_{CL\_W} = G_{mW}(W) \cdot K_{CL\_W}$$

where $$G_{mW}(W) = \frac{d}{dv} 1_{pixel\_w}(W)$$

Figure 23:
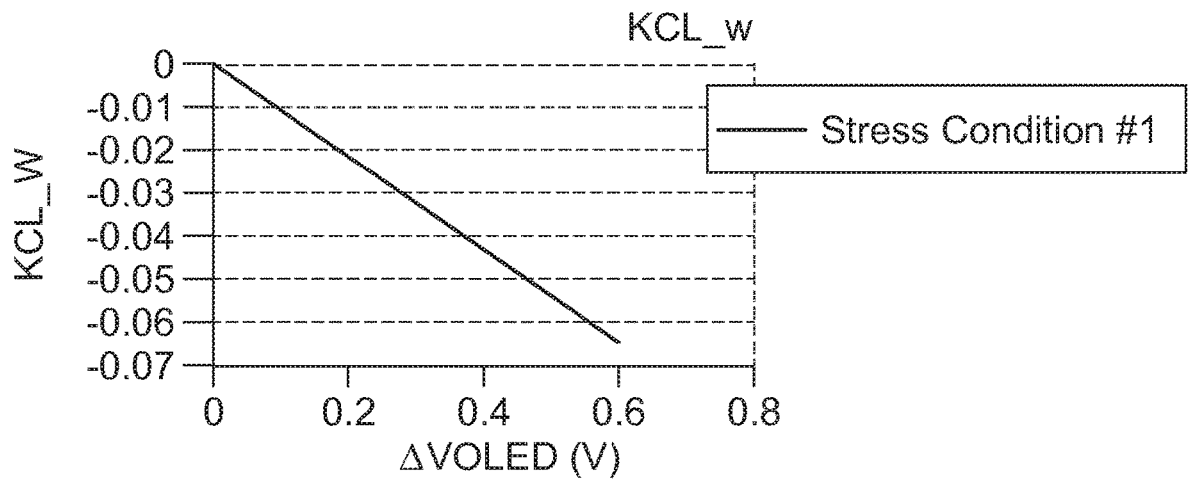
FIG. 23 is a graph representing variations in a brightness correction factor as a function of the OLED voltage a white OLED subjected to one of stress conditions depicted in FIG. 4.

$K_{CL\_W}$ is a brightness correction factor for the white subpixels and may be determined from the empirically derived interdependency curves shown in FIGS. 22A and 22B that relate OLED color shift to ΔVOLED. That measured data can be used to generate the graph of FIG. 23, which plots the brightness correction factor $K_{CL\_W}$ as a function of ΔVOLED for a white pixel. Then assuming that any color shifts in the red, green and blue OLEDs are negligible, brightness correction factors $K_b$, $K_r$ and $K_g$ are computed from the $K_{CL\_W}$ curve, using the same brightness shares for red, green and blue described above. The compensating adjustments for the red, green and blue OLEDs can then be calculated as follows:

$\Delta R = K_r(R) * \Delta N_{CL\_W}$
$\Delta G = K_g(G) * \Delta V_{CL\_W}$
$\Delta B = K_b(B) * \Delta N_{CL\_W}$ The final adjusted values of the gray scales for the red, green and blue OLEDs are calculated by adding the above values ΔR, ΔG and ΔB to the values derived from the original gray-scale values.

Figure 25:
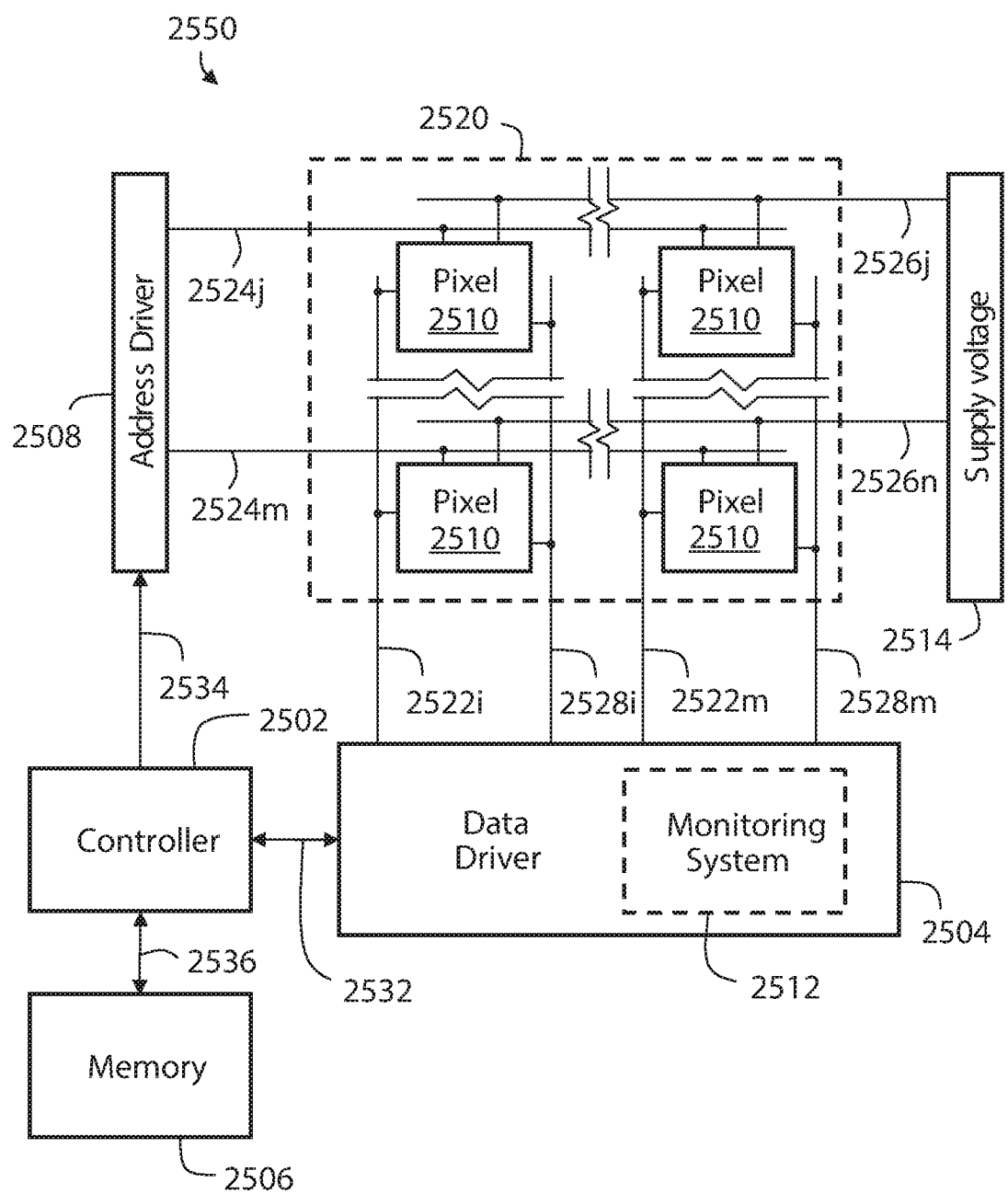
FIG. 25 illustrates an exemplary configuration of a system for monitoring a degradation in a pixel and providing compensation therefore.

FIG. 25 is a diagram of an exemplary display system 2550. The display system 2550 includes an address driver 2508, a data driver 2504, a controller 2502, a memory storage 2506, and display panel 2520. The display panel 2520 includes an array of pixels 2510 arranged in rows and columns. Each of the pixels 2510 is individually programmable to emit light with individually programmable luminance values. The controller 2502 receives digital data indicative of information to be displayed on the display panel 2520. The controller 2502 sends signals 2532 to the data driver 2504 and scheduling signals 2534 to the address driver 2508 to drive the pixels 2510 in the display panel 2520 to display the information indicated. The plurality of pixels 2510 associated with the display panel 2520 thus comprise a display array ("display screen") adapted to dynamically display information according to the input digital data received by the controller 2502. The display screen can display, for example, video information from a stream of video data received by the controller 2502. The supply voltage 2514 can provide a fixed voltage or can be an adjustable voltage supply that is controlled by signals from the controller 2502. The display system 2550 can also incorporate features from a current source or sink (not shown) to provide biasing currents to the pixels 2510 in the display panel 2520 to thereby decrease programming time for the pixels 2510.

For illustrative purposes, the display system 2550 in FIG. 25 is illustrated with only four pixels 2510 in the display panel 2520. It is understood that the display system 2550 can be implemented with a display screen that includes an array of similar pixels, such as the pixels 2510, and that the display screen is not limited to a particular number of rows and columns of pixels. For example, the display system 2550 can be implemented with a display screen with a number of rows and columns of pixels commonly available in displays for mobile devices, televisions, digital cameras, or other monitor-based devices, and/or projection-devices.

The pixel 2510 is operated by a driving circuit ("pixel circuit") that generally includes a driving transistor and a light emitting device. Hereinafter the pixel 2510 may refer to the pixel circuit. The light emitting device can optionally be an organic light emitting diode, but implementations of the present disclosure apply to pixel circuits having other electroluminescence devices, including current-driven light emitting devices. The driving transistor in the pixel 2510 can optionally be an n-type or p-type amorphous or poly-silicon thin-film transistor, but implementations of the present disclosure are not limited to pixel circuits having a particular polarity of transistor or only to pixel circuits having thin-film transistors. The pixel circuit 2510 can also include a storage capacitor for storing programming information and allowing the pixel circuit 2510 to drive the light emitting device after being addressed. Thus, the display panel 2520 can be an active matrix display array.

As illustrated in FIG. 25, the pixel 2510 illustrated as the top-left pixel in the display panel 520 is coupled to a select line 2524j, a supply line 2526j, a data line 2522i, and a monitor line 2528i. In an implementation, the supply voltage 2514 can also provide a second supply line to the pixel 2510. For example, each pixel can be coupled to a first supply line charged with Vdd and a second supply line coupled with Vss, and the pixel circuits 2510 can be situated between the first and second supply lines to facilitate driving current between the two supply lines during an emission phase of the pixel circuit. The top-left pixel 2510 in the display panel 2520 can correspond to a pixel in the display panel in a "jth" row and "ith" column of the display panel 2520. Similarly, the top-right pixel 2510 in the display panel 2520 represents a "jth" row and "mth" column; the bottom-left pixel 2510 represents an "nth" row and "ith" column; and the bottom-right pixel 10 represents an "nth" row and "ith" column. Each of the pixels 2510 is coupled to appropriate select lines (e.g., the select lines 2524j and 2524n), supply lines (e.g., the supply lines 2526j and 2526n), data lines (e.g., the data lines 2522i and 2522m), and monitor lines (e.g., the monitor lines 2528i and 2528m). It is noted that aspects of the present disclosure apply to pixels having additional connections, such as connections to additional select lines, and to pixels having fewer connections, such as pixels lacking a connection to a monitoring line.

With reference to the top-left pixel 2510 shown in the display panel 2520, the select line 2524j is provided by the address driver 2508, and can be utilized to enable, for example, a programming operation of the pixel 2510 by activating a switch or transistor to allow the data line 2522i to program the pixel 2510. The data line 2522i conveys programming information from the data driver 2504 to the pixel 2510. For example, the data line 2522i can be utilized to apply a programming voltage or a programming current to the pixel 2510 in order to program the pixel 2510 to emit a desired amount of luminance. The programming voltage (or programming current) supplied by the data driver 2504 via the data line 2522i is a voltage (or current) appropriate to cause the pixel 2510 to emit light with a desired amount of luminance according to the digital data received by the controller 2502. The programming voltage (or programming current) can be applied to the pixel 2510 during a programming operation of the pixel 2510 so as to charge a storage device within the pixel 2510, such as a storage capacitor, thereby enabling the pixel 2510 to emit light with the desired amount of luminance during an emission operation following the programming operation. For example, the storage device in the pixel 2510 can be charged during a programming operation to apply a voltage to one or more of a gate or a source terminal of the driving transistor during the emission operation, thereby causing the driving transistor to convey the driving current through the light emitting device according to the voltage stored on the storage device.

Generally, in the pixel 2510, the driving current that is conveyed through the light emitting device by the driving transistor during the emission operation of the pixel 2510 is a current that is supplied by the first supply line 2526j and is drained to a second supply line (not shown). The first supply line 2522j and the second supply line are coupled to the voltage supply 2514. The first supply line 2526j can provide a positive supply voltage (e.g., the voltage commonly referred to in circuit design as "Vdd") and the second supply line can provide a negative supply voltage (e.g., the voltage commonly referred to in circuit design as "Vss"). Implementations of the present disclosure can be realized where one or the other of the supply lines (e.g., the supply line 2526j) are fixed at a ground voltage or at another reference voltage.

The display system 2550 also includes a monitoring system 2512 that receives monitored or measured or extracted information about individual pixels a via a respective monitor line 2528. With reference again to the top left pixel 2510 in the display panel 2520, the monitor line 2528i connects the pixel 2510 to the monitoring system 2512. The monitoring system 2512 can be integrated with the data driver 2504, or can be a separate stand-alone system. In particular, the monitoring system 2512 can optionally be implemented by monitoring the current and/or voltage of the data line 2522i during a monitoring operation of the pixel 2510, and the monitor line 2528i can be entirely omitted. Additionally, the display system 2550 can be implemented without the monitoring system 2512 or the monitor line 2528i. The monitor line 2528i allows the monitoring system 2512 to measure a current or voltage associated with the pixel 2510 and thereby extract information indicative of a degradation of the pixel 2510. For example, the monitoring system 2512 can extract, via the monitor line 2528i, a current flowing through the driving transistor within the pixel 2510 and thereby determine, based on the measured current and based on the voltages applied to the driving transistor during the measurement, a threshold voltage of the driving transistor or a shift thereof.

The monitoring system 2512 can also extract an operating voltage of the light emitting device (e.g., a voltage drop across the light emitting device while the light emitting device is operating to emit light). The monitoring system 2512 can then communicate the signals 2532 to the controller 2502 and/or the memory 2506 to allow the display system 5250 to store the extracted degradation information in the memory 2506. During subsequent programming and/or emission operations of the pixel 2510, the degradation information is retrieved from the memory 2506 by the controller 2502 via the memory signals 2536, and the controller 2502 then compensates for the extracted degradation information in subsequent programming and/or emission operations of the pixel 2510. For example, once the degradation information is extracted, the programming information conveyed to the pixel 2510 via the data line 2522i can be appropriately adjusted during a subsequent programming operation of the pixel 2510 such that the pixel 2510 emits light with a desired amount of luminance that is independent of the degradation of the pixel 2510. In an example, an increase in the threshold voltage of the driving transistor within the pixel 2510 can be compensated for by appropriately increasing the programming voltage applied to the pixel 2510. The compensation is determined as described below and illustrated in reference to FIGS. 26-28.

Integrated Datapath

According to an aspect of the present disclosure, a method is directed to compensating for multiple degradation phenomena simultaneously, where the degradation phenomena adversely affect a luminance performance of current-driven pixels (e.g., pixels 2510 of FIG. 25), in an active matrix display (e.g., display panel 2520). Each of the pixel circuits includes a light emitting device (such as an organic light-emitting diode or OLED) driven by a driving transistor. Degradation phenomena include a non-uniformity phenomenon (caused by process non-uniformities), a temperature phenomenon, a hysteresis phenomenon, a time-depending aging phenomenon, and a dynamic effect phenomenon, which can be caused by a shift in a threshold voltage of a driving transistor of a pixel circuit. Sometimes, these phenomena can also be referred to as pixel "parameters" in the OLED art.

Using a generic compensation equation for the pixel current, one can identify the effect of each phenomenon (e.g., OLED and TFT aging, non-uniformity, and so on) on each parameter. As a result, when a phenomenon is being measured, all the parameters being affected by this phenomenon are updated.

One example of this implementation is based on $$I_p(i,j)=k'(i,j)\cdot(V_g(i,j)-V_T(i,j(i,j)))^{\alpha'(i,j)} \quad (1)$$

$I_p$ is the pixel current drawn by a given row and column (i,j) of the active matrix display. $V_T(i,j)=V_{T0}(i,j)-\Delta V_{T0}(i,j)-K_{dyn}V_{OLED}(i,j))$ and $k'(i,j)=k_{comp}(i,j)\cdot\beta(i,j)$. Here, $V_{T0}(i,j)$ is an initial non-uniformity offset, $\Delta V_{T0}(i,j)$ is an aging offset, $K_{dyn}$ is a dynamic effect of $V_{OLED}$ on the offset, $k_{comp}(i,j)$ is an effect of OLED efficiency degradation on the scaling factor, and $\beta(i,j)$ is the effect of pixel non-uniformity on the scaling factor. For example, if the OLED efficiency degrades by 10%, the pixel current is increased by 10% to compensate for the loss of efficiency, which means $K_{comp}$ will be 1.1. The letters i and j refer to the column and row, respectively, of the pixel being measured.

Calculating $V_g(i,j)$ from (1) gives $$V_g(i,j)=k(i,j)I_P(i,j)^{\alpha(i,j)}+V_T(i,j) \quad (2)$$

In Equation (2), $k(i,j)=(1/k'(i,j))1/\alpha'(i,j)$, $\alpha(i,j)=1/\alpha'(i,j)$.

Figure 26:
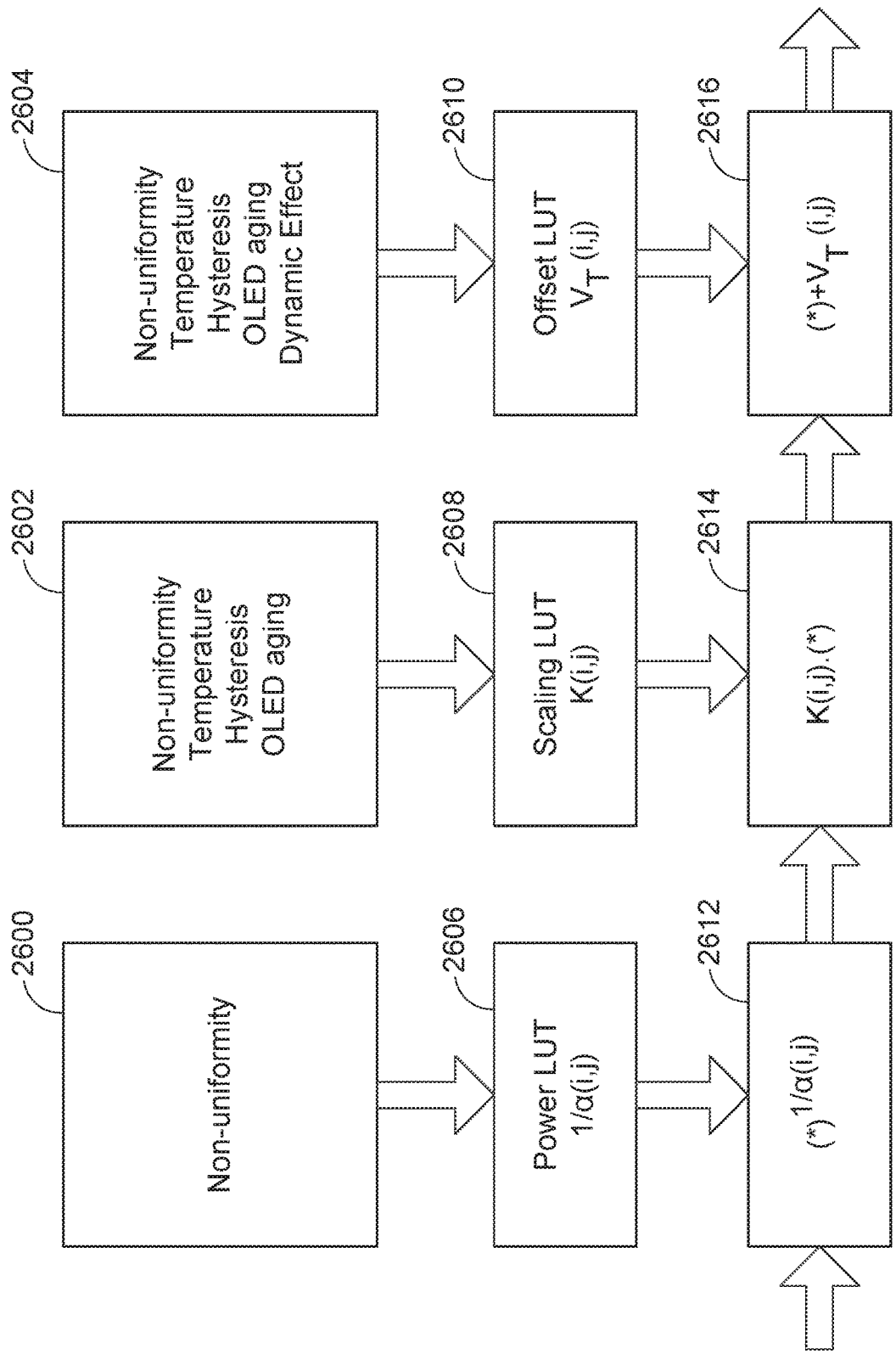
FIG. 26 is a flow diagram of an integrated compensation datapath according to an aspect of the present disclosure.

In FIG. 26, the Power LUT 2606 (lookup table) refers to a power factor table, which stores power factors to compensate for a non-uniformity phenomenon 2600 relating to process non-uniformities in the fabrication of the active matrix display. The Scaling LUT 2608 refers to a scaling factor table that stores multiple scaling factors to compensate for a time-dependent aging phenomenon 102 of the light emitting device and/or the driving transistor of a pixel circuit of the active matrix display. The Offset LUT 2610 refers to an offset factor table that stores multiple offset factors to compensate for a dynamic effect phenomenon 2604 caused at least by a shift in the threshold voltage, $V_T$, of the driving transistor of a pixel circuit of the active matrix display. The measurement of a current and/or voltage, for example, is illustrated in blocks 2612, 2614, 2616. In FIG. 26, the asterisk (*) refers to a representation of the measured/extracted signal (e.g., voltage, current, or charge) from one of the monitor lines 2528 that has been affected by one or more phenomena described herein.

A characteristic of a selected one of the pixel circuits that is affected by one or more of the degradation phenomena is measured. This characteristic can be, for example, a current consumed by the driving transistor or a voltage across the driving transistor, a current consumed by the light emitting device or a voltage across the light emitting device, a threshold voltage of the driving transistor. Some degradation monitoring schemes are disclosed in U.S. Patent Application Publication No. 2012/0299978, and in U.S. patent application Ser. No. 13/291,486, filed Nov. 8, 2011, both of which are incorporated herein in their respective entireties.

Using the equations above, the measured characteristic is used to determine a new value to produce an adjusted value that produces a new power factor, scaling factor, and/or offset factor. Whichever factor is adjusted, the other two factors are adjusted automatically and simultaneously using the equations above. The adjusted factors are stored in the respective power, scaling, and offset factor tables. The compensated pixel is driven according to a current that is based on the adjusted values and a programming current or voltage.

Alternatively and/or optionally, the order of the measured phenomena in determining the new value can vary such that any order combination of the factors determined based on the Power LUT 2606, the Scaling LUT 2608, and the Offset LUT 2610 is possible. By way of example, the new scaling factor based on the Scaling LUT 2608 is determined first, the new power factor based on the Power LUT 2606 second, and the new offset factor based on the Offset LUT 2610 third. In another example, the new offset factor is determined first, the new power factor is determined second, and the new scaling factor is determined third.

According to another alternative and/or optional feature, the source of changing each parameter can include other parameters in addition or instead of those illustrated in FIG. 26. By way of example, any one or more sources of non-uniformity, temperature, hysteresis, OLED aging, and dynamic effect, can be included in determining any of the factors determined in accordance with the Power LUT 2606, the Scaling LUT 2608, and/or the Offset LUT 2610. For example, in addition to or instead of the non-uniformity phenomenon, one or more of the temperature, hysteresis, OLED aging, and dynamic effect phenomena are used to determine the new power factor for the Power LUT 2606.

According to yet another alternative and/or optional feature, each parameter stage is divided in multiple stages. For example, the stage for determining the new scaling factor for the Scaling LUT 2606 includes two or more sub-stages having multiple new scaling factors. Accordingly, by way of a specific example, a first scaling sub-stage determines a first new scaling factor based on non-uniformity, a second scaling sub-stage determines a second new scaling factor based on temperature, a third scaling sub-stage determines a third new scaling factor based on hysteresis, etc. Alternatively, referring to the above specific example, the new scaling factors are determined in order. For example, the third new scaling factor based on hysteresis is determined first, and the first new scaling factor based on non-uniformity is determined second.

According to yet another alternative and/or optional features, additional stages are included in addition to or instead of the stages illustrated in FIG. 26. For example, in addition to or instead of the stages for determining the new power, scaling, and offset factors, one or more stages are included for determining a brightness control factor, a contrast control factor, etc.

Gamma Adjustment

Figure 27:
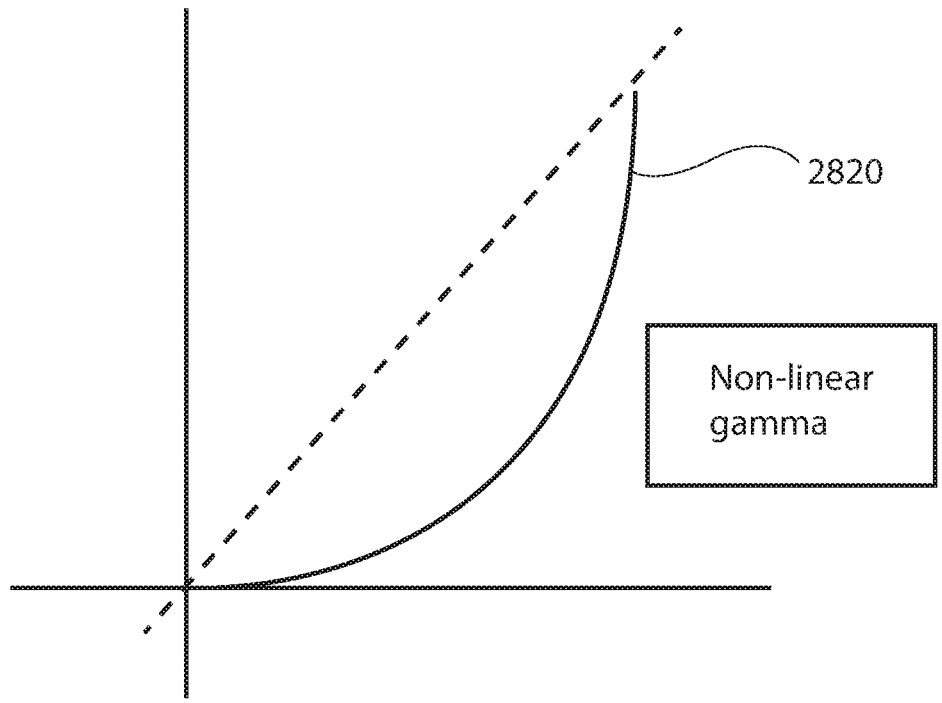
FIG. 27 illustrates a non-linear gamma curve for increasing the resolution at low gray levels.

Both for measurement and compensation, a higher resolution is desired at low gray scales. While using a non-linear gamma curve is traditional in driving liquid crystal display (LCD) panels, it is not normally needed for OLED due to the non-linear pixel behavior. As a result, OLED displays provide a unique opportunity to avoid non-linear gamma, which makes the system simpler. However, a non-linear gamma 2820 is a contemplated method to increase the resolution at the low gray levels, as illustrated in FIG. 27.

In external compensation, greater headroom in the source drive voltage is needed by design. While at the beginning of the panel (i.e., active matrix display) aging, a smaller peak voltage is needed to obtain a target luminance, and as the panel ages the peak voltage needs to increase but at the same time the maximum voltage for target black increases due to the offset shift.

Therefore, a compressed range of the source driver voltage is used that is smaller than the source driver voltage. This range can be shifted up or down depending on the panel status, as illustrated in FIG. 28 and described by way of example below.

Figure 28:
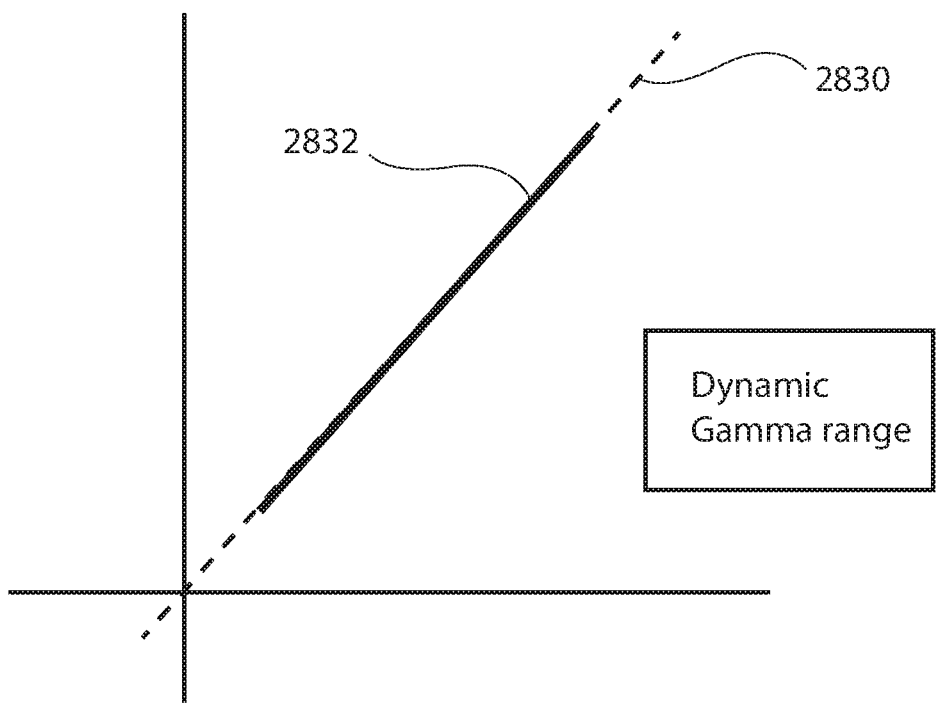
FIG. 28 illustrates a compressed-linear gamma curve using a bit allocation.

Referring to FIG. 28, a compressed-linear gamma curve uses a bit allocation. The dashed line 2830 represents the available range of the source driver from GND (ground) to the VDD (power supply) of the source driver (SDVDD). The bold line 2832 represents the range set by configuring the reference voltages of the source driver such that a 10-bit scale applies to the range in bold. Optionally, the non-linear gamma 2820 method of FIG. 27 and the compressed-linear gamma method of FIG. 28 are merged to provide a combination in which at least some of the bit allocation is in accordance with the non-linear gamma curve 2820 and at least a portion is in accordance with the compressed-linear gamma curve 2830, 2832.

Some or all of the blocks shown in FIGS. 26-28, described by way of example herein, represent one or more algorithms that correspond to at least some instructions executed by one or more controllers to perform the functions or steps disclosed. Any of the methods or algorithms or functions described herein can include machine or computer-readable instructions for execution by: one or more processors or controllers, and/or any other suitable processing device. Any algorithm, software, or method disclosed herein can be embodied as a computer program product having one or more non-transitory tangible medium or media, such as, for example, a flash memory, a CD-ROM, a floppy disk, a hard drive, a digital versatile disk (DVD), or other memory devices (e.g., memory 2506 of FIG. 25), but persons of ordinary skill in the art will readily appreciate that the entire algorithm and/or parts thereof can alternatively be executed by a device other than a controller and/or embodied in firmware or dedicated hardware (e.g., it can be implemented by an application specific integrated circuit (ASIC), a programmable logic device (PLD), a field programmable logic device (FPLD), discrete logic, etc.). By way of example, the methods, algorithms, and/or functions can include machine or computer-readable instructions for execution by the controller 2502 and/or the monitoring system 2512 illustrated and described above in reference to FIG. 25.

Figure 29:
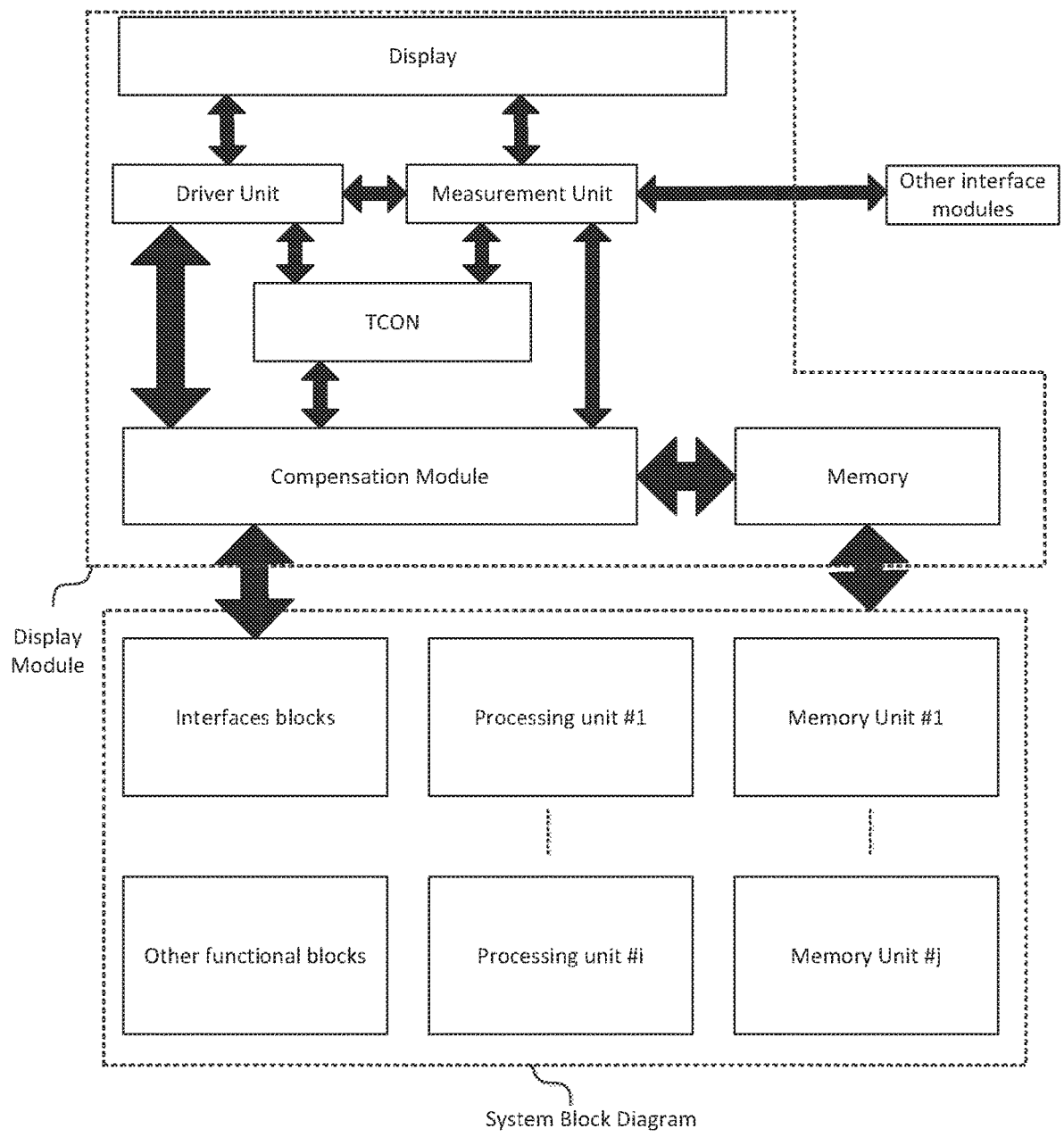
FIG. 29 is a diagrammatic illustrating integration of a MaxLife™ display into portable devices.

Referring generally to FIG. 29, a display system is generally directed to portable devices, such as mobile phones and tablets that already have a graphics processing unit (GPU) and a processing unit. At least some of the functions (e.g., compensation, measurement, etc.) that are typically performed by components on the periphery of a substrate (e.g., for a television set), are, instead, performed by the processing unit of the portable device (e.g., processing unit of a mobile phone). By way of example only, a mobile phone includes a GPU that performs some of the compensation, measurement, and/or other functions. In other examples, the processing unit performs some of the compensation, measurement, and/or other functions.

According to one feature of the display system, a system level simplification includes a plurality of possible modifications and simplifications, as illustrated in the following table by way of example:

|  | Comments |
| --- | --- |
| TCON | Only focused on driving or measurement at time No correction is needed to eliminate the effect of measurement on driving and vice versa. |
| Measurement Scheduler | Everything can happen sequential and so switching between different measurement methods is very simple. |
| Calculation module | System resources can be used to calculate part of (or all of) the new compensation value during offline modes. |
| Driver Circuitry | Drivers do not need to support different timing at the same time. |
| Memory interface | System memory can be used for calculation and so only storage memory will be needed. |

While the display can have dedicated blocks for all the functions such as calculating the compensation values, and controlling the measurement scheduler, some of the blocks can be shared with system level resources to simplify the overall integrated system. In reference to FIG. 29, a system configuration is illustrated in connection with displays. According to the example of FIG. 29, a typical system includes multiple processing units such as generic processors, graphic processors, etc. Additionally, multiple memory blocks are used in a typical system. The data can be sent from the system through interface blocks to one or more displays. Additional exemplary interface modules are illustrated and described above in reference to the pixel circuits of FIGS. 15A and 15B.

The display can include a compensation block, a timing controller, a memory unit, and a measurement unit that can be shared with other interface modules, such as a touch screen. By way of example, the compensation block and/or the central processing unit can be include or be included at least in the compensation module 608 illustrated and described above in reference to FIG. 6, in the control system 700 illustrated and described above in reference to FIG. 7, and or in the compensation feature illustrated and described above in reference to FIG. 26. In another example, the measurement unit can include or be included in at least a voltage comparator circuit 408 as illustrated and described above in reference to FIG. 4A. In yet another example, the timing controller performs at least one function of the programming illustrated and described above in reference to the timing diagram 100 of FIG. 11.

During offline operation of the device, the system processing and memory units can be used to perform display measurements and to calculate new compensation parameters. Additionally, at least one or more of the measurements can be done during inline operation of the device, using system resources or display resources.

The interface between system block diagram and display memory for updating some of the parameters can be achieved through the main memory bus or through the display video interface. When the display is in compensation mode, the main video interface can be used to transfer the parameters to the display memory or to receive the measurement values from the display. Additionally, some of these interfaces can be shared with other blocks, such as a touch screen.

To reduce the power consumption during display calibration, only resources that are required for calibration stay ON, with the reset going to power saving mode (where the applicable resources work at lower operating frequency or lower operating voltage) or shutting down completely.

In addition, the available resources, such as battery range, can be a factor to enable the display calibration. For example, if the battery charge is less than a threshold, the display calibration can be put on hold until the battery is charged or the respective device is being charged. According to another example, a multi-tiered compensation system depends on available resources that include having a battery lower priority compensation (or calibration), which can be postponed.

The compensation/calibration can be prioritized based on one or more parameters, area, color, or last calibration time. For example, in reference to emissive displays, blue OLED ages faster than other sub-pixels, and, as such, blue OLED can have a higher priority than other sub-pixels (which are assigned respective lower priorities).

According to another feature, priority is assigned based on static images. For example, some areas in a display have static images most of the time. These areas can have higher priority for calibration (compensation) purposes.

Implementation A1

A method of maintaining a substantially constant display white point over an extended period of operation of a color display formed by an array of multiple pixels, each of said pixels including multiple subpixels having different colors and each of said subpixels including a light emissive device, said method comprising:

generating a display by energizing the subpixels of successively selected pixels, controlling the color of each selected pixel by controlling the relative levels of energization of the subpixels in the selected pixel, determining the degradation behavior of the subpixels in each pixel, and adjusting the relative levels of energization of the subpixels in each pixel to adjust the brightness shares of said subpixels to compensate for said degradation of said subpixels, said brightness shares being adjusted to maintain a substantially constant display white point.

Implementation A2

The method of implementation A1 in which said degradation behavior is a shift in the chromaticity coordinates of the subpixels of a selected pixel.

Implementation A3

The method of implementation A2 in which said selected pixel is a white pixel.

Implementation A4

The method of implementation A1 in which said light emissive device is an OLED.

Implementation A5

The method of implementation A1 in which said display is an RGBW display.

Implementation A6

The method of implementation A1 in which said extended period of operation is at least 75,000 hours.

Implementation A7

The method of implementation A1 in which said degradation behavior is detected by measuring the voltage across said light emissive device.

Implementation B

A method of maintaining a substantially constant display white point over an extended period of operation of a color OLED display formed by an array of multiple pixels, each of said pixels including red, green, blue and white subpixels, said method comprising:

generating a display by energizing the subpixels of successively selected pixels, controlling the color of each selected pixel by controlling the relative levels of energization of the subpixels in the selected pixel, determining the shift in the chromaticity coordinates of the subpixels in each pixel as said subpixels age, and adjusting the relative levels of energization of the subpixels in each pixel to adjust the brightness shares of said subpixels to compensate for the shift in the chromaticity coordinates of said subpixels, said brightness shares being adjusted to maintain a substantially constant display white point.

Implementation C1

A system for maintaining a substantially constant display white point over an extended period of operation of a color display, said system comprising:

a color display formed by an array of multiple pixels, each of said pixels including multiple subpixels having different colors and each of said subpixels including a light emissive device, drive circuitry for energizing the subpixels of successively selected pixels and controlling the color of each selected pixel by controlling the relative levels of energization of the subpixels in the selected pixel, and a controller monitoring the degradation behavior of the subpixels in each pixel and adjusting the relative levels of energization of the subpixels in each pixel to adjust the brightness shares of said subpixels to compensate for said degradation of said subpixels, said brightness shares being adjusted to maintain a substantially constant display white point.

Implementation C2

The method of implementation C1 in which said degradation behavior is a shift in the chromaticity coordinates of the subpixels of a selected pixel.

Implementation C3

The method of implementation C2 in which said selected pixel is a white pixel.

Implementation C4

The method of implementation C1 in which said light emissive device is an OLED.

Implementation C5

The method of implementation C1 in which said display is an RGBW display.

Implementation C6

The method of implementation C1 in which said extended period of operation is at least 75,000 hours.

Implementation C7

The method of implementation C1 in which said degradation behavior is detected by measuring the voltage across said light emissive device.

Implementation D1

A method of compensating for a plurality of degradation phenomena adversely affecting luminance performance of current-driven pixel circuits in an active matrix display, each of the pixel circuits including a light emitting device driven by a driving transistor, the method comprising:

storing, using one or more controllers, in a first table a plurality of first factors to compensate for a first phenomenon of the degradation phenomena;

storing, using at least one of the controllers, in a second table a plurality of second factors to compensate a second phenomenon of the degradation phenomena;

measuring, using at least one of the controllers, a characteristic of a selected one of the pixel circuits affected by a detected one of the first phenomenon and the second phenomenon;

responsive to the measuring, determining, using at least one of the controllers, a new value for a corresponding first factor and second factor for the detected phenomenon to produce a first adjusted value;

responsive to determining the new value, automatically calculating, using at least one of the controllers, the other one of the first factor and the second factor to produce a second adjusted value;

storing, using at least one of the controllers, the first adjusted value and the second adjusted value in corresponding ones of the first table and the second table; and responsive to the storing the first adjusted value and the second adjusted value, subsequently driving, using at least one of the controllers, the selected pixel circuit according to a pixel circuit characteristic that is based on the first adjusted value and the second adjusted value.

Implementation D2

The method of implementation D1, wherein the pixel circuit characteristic includes one or more of a current consumed by the driving transistor, a voltage across the driving transistor, a threshold voltage of the driving transistor, a current consumed by the light emitting device, and a voltage across the light emitting device.

Implementation D3

The method of implementation D1, wherein the degradation phenomena includes a non-uniformity phenomenon, a time-dependent aging phenomenon, a dynamic effect phenomenon, a temperature phenomenon, and a temperature phenomenon.

Implementation D4

The method of implementation D1, wherein the first table and the second table are selected from a group consisting of a power factor table, a scaling factor table, and an offset factor table.

Implementation D5

The method of implementation D4, further comprising storing, using at least one of the controllers, power factors in the power factor table for compensating a non-uniformity phenomenon relating to process non-uniformities in fabrication of the active matrix display.

Implementation D6

The method of implementation D4, further comprising storing, using at least one of the controllers, scaling factors in the scaling factor table for compensating for a time-dependent aging phenomenon of at least one of the light emitting device and the driving transistor.

Implementation D7

The method of implementation D4, further comprising storing, using at least one of the controllers, offset factors in the offset factor table for a dynamic effect phenomenon caused at least by a shift in a threshold voltage of the driving transistor.

Implementation D8

The method of implementation D1, further comprising increasing, using at least one of the controllers, a resolution in accordance with a non-linear gamma curve.

Implementation D9

The method of implementation D1, further comprising selecting, using at least one of the controllers, a compressed range of a source driver voltage, the compressed range being along a compressed-linear gamma curve.

Implementation D10

The method of implementation D1, further comprising configuring, using at least one of the controllers, reference voltages of a source driver to achieve a bit allocation along a portion of one or more of a non-linear gamma curve and a compressed-linear gamma curve.

Implementation E1

A method of compensating for a plurality of degradation phenomena adversely affecting luminance performance of current-driven pixel circuits in an active matrix display, each of the pixel circuits including a light emitting device driven by a driving transistor, the method comprising:

storing, using one or more controllers, in a power factor table a plurality of power factors to compensate for a non-uniformity phenomenon of the degradation phenomena at each of the pixel circuits, the non-uniformity phenomenon relating to process non-uniformities in fabrication of the active matrix display;

storing, using at least one of the controllers, in a scaling factor table a plurality of scaling factors to compensate for at least a time-dependent aging phenomenon of the degradation phenomena of one or more of each of the light emitting device or the driving transistor of the pixel circuits;

storing, using at least one of the controllers, in an offset factor table a plurality of offset factors to compensate for at least a dynamic effect phenomenon of the degradation phenomena caused by at least a shift in a threshold voltage of the driving transistor of each of the pixel circuits;

measuring, using at least one of the controllers, a characteristic of a selected one of the pixel circuits affected by a detected one of the non-uniformity phenomenon, the aging phenomenon, or the dynamic effect phenomenon;

responsive to the measuring, determining, using at least one of the controllers, a new value for a corresponding power factor, scaling factor, or offset factor for the detected phenomenon to produce a first adjusted value;

responsive to determining the new value, automatically calculating, using at least one of the controllers, the other two of the power factor, the scaling factor, and the offset factor to produce a second adjusted value and a third adjusted value;

storing, using at least one of the controllers, the first, second, and third adjusted values in corresponding ones of the power factor table, the scaling factor table, and the offset factor table; and responsive to the storing the first, second, and third adjusted values, subsequently driving, using at least one of the controllers, the selected pixel circuit according to a current that is based on the first, second, and third adjusted values.

Implementation E2

The method of implementation E1, wherein the current is at least one of a current consumed by the driving transistor and a current consumed by the light emitting device.

Implementation E2

The method of implementation E1, further comprising, responsive to the storing of the first, second, and third adjusted values, driving, using at least one of the controllers, the selected pixel circuit according to one or more pixel circuit characteristics selected from a group consisting of a current consumed by the driving transistor, a voltage across the driving transistor, a threshold voltage of the driving transistor, a current consumed by the light emitting device, and a voltage across the light emitting device.

Implementation E3

The method of implementation E1, further comprising increasing, using at least one of the controllers, a resolution in accordance with a non-linear gamma curve.

Implementation E4

The method of implementation E1, further comprising selecting, using at least one of the controllers, a compressed range of a source driver voltage, the compressed range being along a compressed-linear gamma curve.

Implementation E5

The method of implementation E1, further comprising configuring, using at least one of the controllers, reference voltages of a source driver to achieve a bit allocation along a portion of one or more of a non-linear gamma curve and a compressed-linear gamma curve.

Implementation F1

A display system for compensating degradation phenomena adversely affecting luminance performance, the system including:

an active matrix with current-driven pixel circuits, each of the pixel circuit including a light emitting device driven by a driving transistor;

a processor; and a memory device with stored instructions that, when executed by the processor, cause the system to:

store in a first table a plurality of first factors to compensate for a first phenomenon of the degradation phenomena;

store in a second table a plurality of second factors to compensate a second phenomenon of the degradation phenomena;

measure a characteristic of a selected one of the pixel circuits affected by a detected one of the first phenomenon and the second phenomenon;

responsive to the measuring, determine a new value for a corresponding first factor and second factor for the detected phenomenon to produce a first adjusted value;

responsive to determining the new value, automatically calculate the other one of the first factor and the second factor to produce a second adjusted value;

store the first adjusted value and the second adjusted value in corresponding ones of the first table and the second table; and responsive to the storing the first adjusted value and the second adjusted value, subsequently drive the selected pixel circuit according to a pixel circuit characteristic that is based on the first adjusted value and the second adjusted value.

Implementation F2

The system of implementation F1, wherein the pixel circuit characteristic includes one or more of a current consumed by the driving transistor, a voltage across the driving transistor, a threshold voltage of the driving transistor, a current consumed by the light emitting device, and a voltage across the light emitting device.

Implementation F3

The system of implementation F1, wherein the degradation phenomena includes a non-uniformity phenomenon, a time-dependent aging phenomenon, a dynamic effect phenomenon, a temperature phenomenon, and a temperature phenomenon.

Implementation F4

The system of implementation F1, wherein the first table and the second table are selected from a group consisting of a power factor table, a scaling factor table, and an offset factor table.

Implementation E

A system comprising:

a display module integrated in a portable device and having a display communicatively coupled to one or more of a driver unit, a measurement unit, a timing controller, a compensation sub-module, and a display memory unit; and a system module communicatively coupled to the display module and having one or more interface modules, one or more processing units, and one or more system memory units, at least one of the processing units and the system memory units being programmable to calculate new compensation parameters for the display module during an offline operation.

Implementation F

A method of compensating for IR drop in a pixel circuit, comprising:

activating a write line to cause a programming voltage to be stored in a storage capacitor in the pixel circuit;

simultaneously with the activating, connecting the storage capacitor to a reference voltage such that a voltage stored in the storage capacitor is a function of the reference voltage and the programming voltage; and driving the pixel circuit by activating a drive transistor such that its gate-source voltage corresponds to the voltage stored in the storage capacitor and is independent of a power supply voltage to which the drive transistor is connected.

Implementation G

A method of directly reading a parameter of a drive transistor in a pixel circuit, comprising:

programming the pixel circuit with a calibrated voltage for a predetermined target current;

reading the pixel current flowing through the drive transistor through a monitoring line without turning on a light emitting device of the pixel circuit;

modifying a calibration voltage on the monitoring line until the pixel current equals the predetermined target current; and extracting a parameter of the drive transistor's current-voltage characteristics using the modified calibration voltage.

Implementation H

A method of directly reading a characteristic of a light emitting device in a pixel circuit, comprising:

turning a drive transistor in the pixel circuit off;

reading a current flowing through the light emitting device through a monitoring line by applying a pre-calibrated voltage based on a predetermined target current to the monitoring line;

modifying the voltage on the monitoring line until the current through the light emitting device equals the target current; and extracting a parameter of the drive transistor's current-voltage characteristics using the modified voltage on the monitoring line.

Implementation I

A method of charge-based compensation of a pixel circuit, comprising:

during a programming cycle, simultaneously applying a reference voltage from a monitoring line to a storage capacitor in the pixel circuit by activating a readout transistor while also applying a programming voltage to the storage capacitor from a data line by activating a write transistor, wherein the reference voltage is selected so that a light emitting element of the pixel circuit does not turn on during the programming cycle; and deactivating the application of the reference voltage during the programming cycle prior to deactivating the application of the programming voltage to allow the drive transistor time to begin charging a voltage across the light emitting device in accordance with a current-voltage characteristic parameter of the drive transistor, wherein a source of the drive transistor is disconnected from a power supply voltage during the programming cycle.

Implementation J

A method of directly reading a parameter of a drive transistor in a pixel circuit, comprising:

programming the pixel circuit with a programming voltage that is calibrated for a predetermined target current;

during a monitoring cycle, activating a readout transistor to read a pixel current flowing through the drive transistor, via a monitoring line having a monitoring voltage that does not cause a light emitting device of the pixel circuit to turn on;

calibrating the monitoring voltage until the pixel current equals the target current; and extracting a parameter of the drive transistor's current-voltage characteristics using the calibrated monitoring voltage corresponding to the target current.

Implementation K

A method of directly reading a parameter of a light emitting device of a pixel circuit, comprising:

disabling a drive transistor of the pixel circuit so that no current is supplied through the drive transistor;

responsive to the disabling, during a readout cycle, reading a current flowing through the light emitting device by applying an initially precalibrated monitoring voltage to a monitoring line coupled to the light emitting device, the precalibrated monitoring voltage corresponding to a predetermined target current for the light emitting device;

calibrating the monitoring voltage during the readout cycle until a pixel current through the light emitting device equals the target current; and extracting a parameter of the light emitting device's current-voltage characteristics using the calibrated monitoring voltage corresponding to the target current.

Implementation L

A method of indirectly reading a parameter of a light emitting device of a pixel circuit, comprising:

programming the pixel circuit with a programming voltage that is calibrated for a predetermined target current and such that a gate voltage of a drive transistor of the pixel circuit is set to a voltage across the light emitting device;

during a monitoring cycle, activating a readout transistor to read a pixel current flowing through the drive transistor, via a monitoring line having a monitoring voltage that does not cause a light emitting device of the pixel circuit to turn on;

calibrating the monitoring voltage until the pixel current equals the target current; and extracting a parameter of the drive transistor's current-voltage characteristics using at least the calibrated monitoring voltage corresponding to the target current.

Implementation M

A method of biasing a pixel circuit, comprising:

connecting a voltage monitoring line to a reference current and a voltage data line to a programming voltage; and charging a gate of a drive transistor of the pixel circuit to a bias voltage related to the reference current so that a voltage stored in a storage capacitor of the pixel circuit is a function of the programming voltage and the bias voltage.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of driving a pixel circuit in a video display having an array of pixel circuits, the pixel circuit including an organic light emitting device, the method comprising:
    defining a compressed range of source driver voltage for the pixel circuit, the compressed range of source driver voltage a subset of an available voltage range of a source driver for driving the pixel circuit;
    adjusting the compressed range of source driver voltage for the pixel circuit based on an aging of the pixel circuit; and
    driving the pixel circuit according to a target luminance using the compressed range of source driver voltage.

2. The method of claim 1, wherein driving the pixel circuit comprises using a non-linear gamma over the compressed range of source driver voltage to drive the pixel circuit according to the target luminance.

3. The method of claim 1, wherein driving the pixel circuit comprises using a non-linear gamma over part of the compressed range of source driver voltage to drive the pixel circuit according to the target luminance and using a linear gamma over a different part of the compressed range of source driver voltage to drive the pixel circuit according to the target luminance.

4. The method of claim 1, wherein adjusting the compressed range of source driver voltage comprises shifting the compressed range of source driver voltage up or down.

5. The method of claim 4, wherein the compressed range of source driver voltage is shifted up or down to obtain a desired black level after said aging.

6. The method of claim 4, wherein the compressed range of source driver voltage is shifted up or down to obtain a desired peak brightness after said aging.

7. The method of claim 1, further comprising configuring reference voltages of the source driver such that a scale of bits applies to the compressed range of source driver voltage.

8. A display system comprising:
    an array of pixel circuits arranged on a panel, each of the pixel circuits including an organic light emitting device, and
    a source driver for driving each of the pixel circuits according to a target luminance using a compressed range of source driver voltage for the pixel circuit defined as a subset of an available voltage range of the source driver for driving the pixel circuit, wherein the compressed range of source driver voltage for the pixel circuit is adjusted based on an aging of the display.

9. The display of claim 8, wherein the source driver drives the pixel circuit according a non-linear gamma over the compressed range of source driver voltage to drive the pixel circuit according to the target luminance.

10. The display of claim 8, wherein the source driver drives the pixel circuit according a non-linear gamma over part of the compressed range of source driver voltage to drive the pixel circuit according to the target luminance and according to a linear gamma over a different part of the compressed range of source driver voltage to drive the pixel circuit according to the target luminance.

11. The display of claim 8, wherein the compressed range of source driver voltage is adjusted by shifting the compressed range of source driver voltage up or down.

12. The display of claim 11, wherein the compressed range of source driver voltage is shifted up or down to obtain a desired black level after said aging.

13. The display of claim 11, wherein the compressed range of source driver voltage is shifted up or down to obtain a desired peak brightness after said aging.

14. The display of claim 8, wherein reference voltages of the source driver are configured such that a scale of bits applies to the compressed range of source driver voltage.

* * * * *